US012784288B2

(12) United States Patent
Yoon et al.

(10) Patent No.: US 12,784,288 B2
(45) Date of Patent: Nov. 3, 2026

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG ELECTRONICS INC., Seoul (KR)

(72) Inventors: Yeojin Yoon, Seoul (KR); Hanje Park, Seoul (KR); Sejin Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 561 days.

(21) Appl. No.: 18/022,900

(22) PCT Filed: Aug. 30, 2021

(86) PCT No.: PCT/KR2021/011600
§ 371 (c)(1),
(2) Date: Feb. 23, 2023

(87) PCT Pub. No.: WO2022/055165
PCT Pub. Date: Mar. 17, 2022

(65) Prior Publication Data

US 2023/0419557 A1 Dec. 28, 2023

(30) Foreign Application Priority Data

Sep. 11, 2020 (KR) ........................ 10-2020-0117182
Sep. 29, 2020 (KR) ........................ 10-2020-0127235

(51) Int. Cl.
*G06T 9/40* (2006.01)
*G06T 7/70* (2017.01)
(Continued)

(52) U.S. Cl.
CPC .................. *G06T 9/40* (2013.01); *G06T 7/70* (2017.01); *G06T 17/00* (2013.01); *G06T 17/205* (2013.01); *H04N 19/124* (2014.11); *H04N 19/13* (2014.11); *H04N 19/18* (2014.11); *H04N 19/597* (2014.11); *H04N 19/96* (2014.11); *G06T 2207/10028* (2013.01)

(58) Field of Classification Search
CPC ....................... G06T 7/70; G06T 17/00; G06T 2207/10028
See application file for complete search history.

(56) References Cited

U.S. PATENT DOCUMENTS

2019/0087979 A1* 3/2019 Mammou ............ H04N 19/597
2020/0153885 A1* 5/2020 Lee ........................ G06T 15/005
2020/0382764 A1* 12/2020 Oyman ............. H04N 21/4728

FOREIGN PATENT DOCUMENTS

KR 20200005438 1/2020
KR 20200038170 4/2020
(Continued)

*Primary Examiner* — Peter K Huntsinger
(74) *Attorney, Agent, or Firm* — Bryan Cave Leighton Paisner LLP

(57) ABSTRACT

A point cloud data transmission method according to embodiments may comprise the steps of: encoding point cloud data; and transmitting the point cloud data. A point cloud data reception method according to embodiments may comprise the steps of: receiving point cloud data; decoding the point cloud data; and rendering the point cloud data.

15 Claims, 49 Drawing Sheets

(51) Int. Cl.

| | |
|---|---|
| ***G06T 17/00*** | (2006.01) |
| ***G06T 17/20*** | (2006.01) |
| ***H04N 19/124*** | (2014.01) |
| ***H04N 19/13*** | (2014.01) |
| ***H04N 19/18*** | (2014.01) |
| ***H04N 19/597*** | (2014.01) |
| ***H04N 19/96*** | (2014.01) |

(56) References Cited

FOREIGN PATENT DOCUMENTS

| | | |
|---|---|---|
| KR | 20200038534 | 4/2020 |
| KR | 20200065076 | 6/2020 |
| WO | 2019135024 | 7/2019 |

* cited by examiner

FIG. 27

| v3c_parameter_set( numBytesInV3CPayload ) { | Descriptor |
|---|---|
| profile_tier_level( ) | |
| vps_v3c_parameter_set_id | u(4) |
| vps_reserved_zero_8bits | u(8) |
| vps_atlas_count_minus1 | u(6) |
| for(k = 0; k < vps_atlas_count_minus1 + 1; k++ ) { | |
| vps_atlas_id[ k ] | u(6) |
| j = vps_atlas_id[ k ] | |
| vps_frame_width[ j ] | ue(v) |
| vps_frame_height[ j ] | ue(v) |
| vps_map_count_minus1[ j ] | u(4) |
| if( vps_map_count_minus1[ j ] > 0 ) | |
| vps_multiple_map_streams_present_flag[ j ] | u(1) |
| vps_map_absolute_coding_enabled_flag[ j ][ 0 ] = 1 | |
| vps_map_predictor_index_diff[ j ][ 0 ] = 0 | |
| for( i = 1; i <= vps_map_count_minus1[ j ]; i++ ) { | |
| if( vps_multiple_map_streams_present_flag[ j ] ) | |
| vps_map_absolute_coding_enabled_flag[ j ][ i ] | u(1) |
| else | |
| vps_map_absolute_coding_enabled_flag[ j ][ i ] = 1 | |
| if( vps_map_absolute_coding_enabled_flag[ j ][ i ] == 0 ) { | |
| vps_map_predictor_index_diff[ j ][ i ] | ue(v) |
| } | |
| } | |
| vps_auxiliary_video_present_flag[ j ] | u(1) |

FIG. 28

| | |
|---|---|
| vps_occupancy_video_present_flag[ j ] | u(1) |
| vps_geometry_video_present_flag[ j ] | u(1) |
| vps_attribute_video_present_flag[ j ] | u(1) |
| if( vps_occupancy_video_present_flag[ j ] ) | |
| occupancy_information( j ) | |
| if( vps_geometry_video_present_flag[ j ] ) | |
| geometry_information( j ) | |
| if(vps_attribute_video_present_flag[ j ] ) | |
| attribute_information( j ) | |
| } | |
| vps_extension_present_flag | u(1) |
| if( vps_extension_present_flag ) | |
| vps_extension_8bits | u(8) |
| if( vps_extension_8bits ) { | |
| vps_extension_length_minus1 | ue(v) |
| for( j = 0; j < vps_extension_length_minus1 + 1; j++ ) { | |
| vps_extension_data_byte | u(8) |
| } | |
| } | |
| byte_alignment( ) | |

FIG. 29

| attribute_information( atlasID ) { | Descriptor |
|---|---|
| ai_attribute_count[ atlasID ] | u(7) |
| ai_attribute_slf_cameraview_selection_type[ atlasID ] | u(2) |
| for( i = 0; i < ai_attribute_count[ atlasID ]; i++ ) { | |
| ai_attribute_type_id[ atlasID ][ i ] | u(4) |
| ai_attribute_merged_video_flag[ atlasID ][ i ]<br>if( ai_attribute_merged_video_flag[ atlasID ][ i ] ) { | u(1) |
| ai_attribute_number_of_merged_attributes_in_column[ atlasID ][ i ] | ue(v) |
| ai_attribute_number_of_merged_attributes_in_row[ atlasID ][ i ] | ue(v) |
| } | |
| ai_attribute_codec_id[ atlasID ][ i ] | u(8) |
| if( vps_auxiliary_video_present_flag[ atlasID ] ) | |
| ai_auxiliary_attribute_codec_id[ atlasID ][ i ] | u(8) |
| if( vps_map_count_minus1[ atlasID ] > 0 ) | |
| ai_attribute_map_absolute_coding_persistence_flag[ atlasID ][ i ] | u(1) |
| ai_attribute_dimension_minus1[ atlasID ][ i ] | u(6) |
| if( ai_attribute_dimension_minus1[ atlasID ][ i ] > 0 ) { | |
| ai_attribute_dimension_partitions_minus1[ atlasID ][ i ] | u(6) |
| remainingDimensions = ai_attribute_dimension_minus1[ atlasID ][ i ] | |
| k = ai_attribute_dimension_partitions_minus1[ atlasID ][ i ] | |
| for( j = 0; j < k; j++ ) { | |
| if( k – j == remainingDimensions ) | |
| ai_attribute_partition_channels_minus1[ atlasID ][ i ][ j ] = 0 | |
| else | |
| ai_attribute_partition_channels_minus1[ atlasID ][ i ][ j ] | ue(v) |
| remainingDimensions –= ai_attribute_partition_channels_minus1<br>[ atlasID ][ i ][ j ] + 1 | |
| } | |
| ai_attribute_partition_channels_minus1[ atlasID ][ i ][ k ]<br>= remainingDimensions | |
| } | |
| ai_attribute_2d_bit_depth_minus1[ atlasID ][ i ] | u(5) |
| ai_attribute_MSB_align_flag[ atlasID ][ i ] | u(1) |
| } | |
| } | |

FIG. 31

| atlas_sequence_parameter_set_rbsp( ) { | Descriptor |
|---|---|
| asps_atlas_scqucncc_paramctcr_sct_id | ue(v) |
| asps_frame_width | ue(v) |
| asps_frame_height | ue(v) |
| asps_geometry_3d_bit_depth_minus1 | u(5) |
| asps_geometry_2d_bit_depth_minus1 | u(5) |
| asps_attribute_use_fixed_number_of_cameraview_flag | u(1) |
| if( asps_attribute_use_fixed_number_of_cameraview_flag ) | |
| asps_attribute_selected_cameraview_count | ue(v) |
| asps_log2_max_atlas_frame_order_cnt_lsb_minus4 | ue(v) |
| asps_max_dec_atlas_frame_buffering_minus1 | ue(v) |
| asps_long_term_ref_atlas_frames_flag | u(1) |
| asps_num_ref_atlas_frame_lists_in_asps | ue(v) |
| for( i = 0; i < asps_num_ref_atlas_frame_lists_in_asps; i++ ) | |
| ref_list_struct( i ) | |
| asps_use_eight_orientations_flag | u(1) |
| asps_extended_projection_enabled_flag | u(1) |
| if( asps_extended_projection_enabled_flag ) | |
| asps_max_number_projections_minus1 | ue(v) |

FIG. 32

| | |
|---|---|
| asps_normal_axis_limits_quantization_enabled_flag | u(1) |
| asps_normal_axis_max_delta_value_enabled_flag | u(1) |
| asps_patch_precedence_order_flag | u(1) |
| asps_log2_patch_packing_block_size | u(3) |
| asps_patch_size_quantizer_present_flag | u(1) |
| asps_map_count_minus1 | u(4) |
| asps_pixel_deinterleaving_enabled_flag | u(1) |
| if( asps_pixel_deinterleaving_enabled_flag ) | |
| for( j = 0; j <= asps_map_count_minus1; j++ ) | u(1) |
| asps_map_pixel_deinterleaving_flag[ j ] | u(1) |
| asps_raw_patch_enabled_flag | u(1) |
| asps_eom_patch_enabled_flag | |
| if( asps_eom_patch_enabled_flag && asps_map_count_minus1 == 0 ) | u(4) |
| asps_eom_fix_bit_count_minus1 | |
| if( asps_raw_patch_enabled_flag \|\| asps_eom_patch_enabled_flag ) | u(1) |
| asps_auxiliary_video_enabled_flag | u(1) |
| asps_plr_enabled_flag | |
| if( asps_plr_enabled_flag ) | |
| asps_plr_information( asps_map_count_minus1 ) | u(1) |
| asps_vui_parameters_present_flag | |
| if( asps_vui_parameters_present_flag ) | |
| vui_parameters( ) | u(1) |
| asps_extension_present_flag | |
| if( asps_extension_present_flag ) { | u(1) |
| asps_vpcc_extension_present_flag | u(7) |
| asps_extension_7bits | |
| } | |
| if( asps_vpcc_extension_present_flag ) | |
| asps_vpcc_extension( ) /* Specified in Annex H*/ | |
| if( asps_extension_7bits )<br>while( more_rbsp_data( ) ) | |
| asps_extension_data_flag | u(1) |
| rbsp_trailing_bits( ) | |
| } | |

FIG. 33

| atlas_frame_parameter_set_rbsp( ) { | Descriptor |
|---|---|
| afps_atlas_framc_paramctcr_sct_id | ue(v) |
| afps_atlas_sequence_parameter_set_id | ue(v) |
| afps_attribute_use_fixed_number_of_cameraview_flag | u(1) |
| if( afps_attribute_use_fixed_number_of_cameraview_flag ) | |
| afps_attribute_selected_cameraview_count | ue(v) |
| atlas_frame_tile_information( ) | |
| afps_output_flag_present_flag | u(1) |
| afps_num_ref_idx_default_active_minus1 | ue(v) |
| afps_additional_lt_afoc_lsb_len | ue(v) |
| afps_lod_mode_enabled_flag | u(1) |
| afps_raw_3d_offset_bit_count_explicit_mode_flag | u(1) |
| afps_extension_present_flag | u(1) |
| if( afps_extension_present_flag ) | |
| afps_extension_8bits | u(8) |
| if( afps_extension_8bits ) | |
| while( more_rbsp_data( ) ) | |
| afps_extension_data_flag | u(1) |
| rbsp_trailing_bits( ) | |
| } | |

FIG. 34

| atlas_frame_tile_information( ) { | Descriptor |
|---|---|
| afti_singlc_tilc_in_atlas_framc_flag | u(1) |
| if( !afti_single_tile_in_atlas_frame_flag ) { | |
| afti_uniform_partition_spacing_flag | u(1) |
| if( afti_uniform_partition_spacing_flag ) { | |
| afti_partition_cols_width_minus1 | ue(v) |
| afti_partition_rows_height_minus1 | ue(v) |
| } else { | |
| afti_num_partition_columns_minus1 | ue(v) |
| afti_num_partition_rows_minus1 | ue(v) |
| for( i = 0; i < afti_num_partition_columns_minus1; i++ ) | |
| afti_partition_column_width_minus1[ i ] | ue(v) |
| for( i = 0; i < afti_num_partition_rows_minus1; i++ ) | |
| afti_partition_row_height_minus1[ i ] | ue(v) |
| } | |
| afti_single_partition_per_tile_flag | u(1) |
| if( !afti_single_partition_per_tile_flag ) { | |
| afti_num_tiles_in_atlas_frame_minus1 | ue(v) |
| for( i = 0; i < afti_num_tilcs_in_atlas_framc_minus1 + 1; i++ ) { | |
| afti_top_left_partition_idx[ i ] | u(v) |
| afti_bottom_right_partition_column_offset[ i ] | ue(v) |
| afti_bottom_right_partition_row_offset[ i ] | ue(v) |
| } | |
| } | |
| else | |
| afti_num_tiles_in_atlas_frame_minus1 = NumPartitionsInAtlasFrame − 1 | |

FIG. 35

| | |
|---|---|
| afti_attribute_use_fixed_number_of_cameraview_flag | u(1) |
| if( afti_attribute_use_fixed_number_of_cameraview_flag ) { | |
| for( i = 0; i < afti_num_tiles_in_atlas_frame_minus1 + 1; i++ ) { | |
| afti_attribute_selected_cameraview_count[ i ] | ue(v) |
| } | |
| } | |
| } | |
| else | |
| afti_num_tiles_in_atlas_frame_minus1 = 0 | |
| if( asps_auxiliary_video_enabled_flag ) { | ue(v) |
| afti_auxiliary_video_tile_row_width_minus1 | |
| for( i = 0; i < afti_num_tiles_in_atlas_frame_minus1 + 1; i++ ) | ue(v) |
| afti_auxiliary_video_tile_row_height[ i ] | |
| } | u(1) |
| afti_signalled_tile_id_flag | |
| if( afti_signalled_tile_id_flag ) { | u(v) |
| afti_signalled_tile_id_length_minus1 | |
| for( i = 0; i < afti_num_tiles_in_atlas_frame_minus1 + 1; i++ ) { | |
| afti_tile_id[ i ] | |
| TileIDToIndex[ afti_tile_id[ i ] ] = i | |
| TileIndexToID[ i ] = afti_tile_id[ i ] | |
| } | |
| } | |
| else | |
| for( i = 0; i < afti_num_tiles_in_atlas_frame_minus1 + 1; i++ ) { | |
| afti_tile_id[ i ] = i | |
| TileIDToIndex[ i ] = i | |
| TileIndexToID[ i ] = i | |
| } | |
| } | |

FIG. 36

| atlas_adaptation_parameter_set_rbsp( ) { | Descriptor |
|---|---|
| aaps_atlas_adaptation_paramctcr_sct_id | ue(v) |
| aaps_attribute_use_fixed_number_of_camerview_flag | u(1) |
| if( aaps_attribute_use_fixed_number_of_camerview_flag ) | |
| aaps_attribute_selected_camerview_count | ue(v) |
| aaps_log2_max_afoc_present_flag | u(1) |
| if( aaps_log2_max_afoc_present_flag ) | |
| aaps_log2_max_atlas_frame_order_cnt_lsb_minus4 | ue(v) |
| aaps_extension_present_flag | u(1) |
| if( aaps_extension_present_flag ) { | |
| aaps_vpcc_extension_present_flag | u(1) |
| aaps_extension_7bits | u(7) |
| } | |
| if( aaps_vpcc_extension_present_flag ) | |
| aaps_vpcc_extension( ) /* Specified in Annex H*/ | |
| if( aaps_extension_7bits ) | |
| while( more_rbsp_data( ) ) | |
| aaps_extension_data_flag | u(1) |
| rbsp_trailing_bits( ) | |
| } | |

FIG. 37

| patch_information_data( tileID, patchIdx, patchMode ) { | Descriptor |
|---|---|
| if( ath_typc == P_TILE ) { | |
| if( patchMode == P_SKIP ) | |
| skip_patch_data_unit( ) | |
| else if( patchMode == P_MERGE ) | |
| merge_patch_data_unit( tileID, patchIdx ) | |
| else if( patchMode == P_INTRA ) | |
| patch_data_unit( tileID, patchIdx ) | |
| else if( patchMode == P_INTER ) | |
| inter_patch_data_unit( tileID, patchIdx ) | |
| clsc if( patchModc == P_RAW ) | |
| raw_patch_data_unit( tileID, patchIdx ) | |
| else if( patchMode == P_EOM ) | |
| eom_patch_data_unit( tileID, patchIdx ) | |
| } | |
| else if( ath_type == I_TILE ) { | |
| if( patchMode == I_INTRA ) | |
| patch_data_unit( tileID, patchIdx ) | |
| clsc if( patchModc == I_RAW ) | |
| raw_patch_data_unit( tileID, patchIdx ) | |
| else if( patchMode == I_EOM ) | |
| eom_patch_data_unit( tileID, patchIdx ) | |
| } | |
| } | |

FIG. 38

| patch_data_unit( tileID, patchIdx ) { | Descriptor |
|---|---|
| pdu_2d_pos_x[ tilcID ][ patchIdx ] | uc(v) |
| pdu_2d_pos_y[ tileID ][ patchIdx ] | ue(v) |
| pdu_2d_size_x_minus1[ tileID ][ patchIdx ] | ue(v) |
| pdu_2d_size_y_minus1[ tileID ][ patchIdx ] | ue(v) |
| pdu_3d_offset_u[ tileID ][ patchIdx ] | u(v) |
| pdu_3d_offset_v[ tileID ][ patchIdx ] | u(v) |
| pdu_3d_offset_d[ tileID ][ patchIdx ] | u(v) |
| if( asps_normal_axis_max_delta_value_enabled_flag ) | |
| pdu_2d_pos_x[ tileID ][ patchIdx ] | u(v) |
| pdu_projection_id[ tileID ][ patchIdx ] | u(v) |
| pdu_orientation_index[ tileID ][ patchIdx ] | u(v) |

FIG. 39

| | |
|---|---|
| if( !asps_attribute_use_fixed_number_of_cameraview_flag | |
| && ! afps_attribute_use_fixed_number_of_cameraview_flag | |
| && ! aaps_attribute_use_fixed_number_of_cameraview_flag | |
| && ! afti_attribute_use_fixed_number_of_cameraview_flag ) { | |
| pdu_attribute_selected_cameraview_count[ tileID ][ patchIdx ] | uc(v) |
| for(j = 0; j < pdu_attribute_selected_cameraview_count[ tileID ]<br>[ patchIdx ]; j++) { | |
| pdu_attr_selected_cameraview [ j ]<br>} | ue(v) |
| } | |
| else { | |
| if( asps_attribute_use_fixed_number_of_cameraview_flag )<br>pdu_attribute_selected_cameraview_count = asps_attribute_<br>selected_cameraview_count | |
| else if( afps_attribute_use_fixed_number_of_cameraview_flag ) | |
| pdu_attribute_selected_cameraview_count = afps_attribute_<br>selected_cameraview_count | |
| clsc if( aaps_attributc_usc_fixcd_numbcr_of_camcravicw_flag ) | |
| pdu_attribute_selected_cameraview_count = aaps_attribute_<br>selected_cameraview_count | |
| else if( afti_attribute_use_fixed_number_of_cameraview_flag ) | |
| pdu_attribute_selected_cameraview_count = afti_attribute_<br>selected_cameraview_count[ tileID ] | |
| for(j = 0; j < pdu_attribute_selected_cameraview_count; j++) { | |
| pdu_attr_selected_cameraview [ j ] | |
| } | ue(v) |
| } | |
| if( afps_lod_mode_enabled_flag ) { | |
| pdu_lod_enabled_flag[ tileID ][ patchIndex ] | u(1) |
| if( pdu_lod_enabled_flag[ tileID ][ patchIndex ] > 0 ) { | |
| pdu_lod_scale_x_minus1[ tileID ][ patchIndex ] | ue(v) |
| pdu_lod_scale_y_idc[ tileID ][ patchIndex ] | ue(v) |
| } | |
| } | |
| if( asps_plr_cnabled_flag ) | |
| plr_data( tileID, patchIdx ) | |
| } | |

(13 cameras capturing the content from different viewpoints)

FIG. 42

| scene_object_information( payloadSize ) { | Descriptor |
|---|---|
| soi_pcrsistcncc_flag | u(1) |
| soi_reset_flag | u(1) |
| soi_num_object_updates | ue(v) |
| if ( soi_num_object_updates > 0 ) { | |
| soi_simple_objects_flag | u(1) |
| if ( soi_simple_objects_flag == 0) { | |
| soi_object_label_present_flag | u(1) |
| soi_priority_present_flag | u(1) |
| soi_object_hidden_present_flag | u(1) |
| soi_object_dependency_present_flag | u(1) |
| soi_visibility_cones_present_flag | u(1) |
| soi_3d_bounding_box_present_flag | u(1) |
| soi_collision_shape_present_flag | u(1) |
| soi_point_style_present_flag | u(1) |
| soi_material_id_present_flag | u(1) |
| soi_extension_present_flag | u(1) |
| soi_object_cameraview_present_flag | u(1) |
| } | |
| else { | |

FIG. 43

| | |
|---|---|
| soi_object_label_present_flag = 0 | |
| soi_priority_present_flag = 0 | |
| soi_object_hidden_present_flag = 0 | |
| soi_object_dependency_present_flag = 0 | |
| soi_visibility_cones_present_flag = 0 | |
| soi_3d_bounding_box_present_flag = 0 | |
| soi_collision_shape_present_flag = 0 | |
| soi_point_style_present_flag = 0 | |
| soi_material_id_present_flag = 0 | |
| soi_extension_present_flag = 0 | |
| soi_objcct_camcravicw_prcscnt_flag = 0 | |
| } | |
| if( soi_3d_bounding_box_present_flag ) { | |
| soi_3d_bounding_box_scale_log2 | u(5) |
| soi_3d_bounding_box_prccision_minus8 | u(5) |
| } | |
| soi_log2_max_object_idx_updated_minus1 | u(5) |
| if( soi_object_dependency_present_flag ) | |
| soi_log2_max_object_dependency_idx | u(5) |

FIG. 44

| | |
|---|---|
| for( i = 0; i <= soi_num_object_updates; i++ ) { | |
| soi_object_idx[ i ] | u(v) |
| k = soi_object_idx[ i ] | |
| soi_object_cancel_flag[ k ] | u(1) |
| ObjectTracked[ k ] = !soi_object_cancel_flag[ k ] | |
| if ( !soi_object_cancel_flag[ k ] ) { | |
| if( soi_object_label_present_flag ) { | |
| soi_object_label_update_flag[ k ] | u(1) |
| if( soi_object_label_update_flag[ k ] ) | |
| soi_object_label_idx[ k ] | ue(v) |
| } | |
| if( soi_priority_present_flag ) { | |
| soi_priority_update_flag[ k ] | u(1) |
| if( soi_priority_update_flag[ k ] ) | |
| soi_priority_value[ k ] | u(4) |
| } | |
| if( soi_object_hidden_present_flag ) | |
| soi_object_hidden_flag[ k ] | u(1) |

FIG. 45

| | |
|---|---|
| if( soi_object_dependency_present_flag ) { | |
| soi_object_dependency_update_flag[ k ] | u(1) |
| if (soi_object_dependency_update_flag[ k ]) { | |
| soi_object_num_dependencies[ k ] | u(4) |
| for( j = 0; j < soi_object_num_dependencies[ k ]; j++ ) | |
| soi_object_dependency_idx[ k ][ j ] | u(v) |
| } | |
| } | |
| if( soi_visibility_cones_present_flag ) { | |
| soi_visibility_cones _update_flag[ k ] | u(1) |
| if( soi_visibility_cones_update_flag[ k ]) { | |
| soi_direction_x[ k ] | fl(32) |
| soi_direction_y[ k ] | fl(32) |
| soi_direction_z[ k ] | fl(32) |
| soi_angle[ k ] | fl(16) |
| } | |
| } | |
| if( soi_3d_bounding_box_present_flag ) { | |
| soi_3d_bounding_box_update_flag[ k ] | u(1) |
| if( soi_3d_bounding_box_update_flag[ k ]) { | |

FIG. 46

| | |
|---|---|
| soi_3d_bounding_box_x[ k ] | u(v) |
| soi_3d_bounding_box_y[ k ] | u(v) |
| soi_3d_bounding_box_z[ k ] | u(v) |
| soi_3d_bounding_box_delta_x[ k ] | u(v) |
| soi_3d_bounding_box_delta_y[ k ] | u(v) |
| soi_3d_bounding_box_delta_z[ k ] | u(v) |
| } | |
| } | |
| if( soi_collision_shape_present_flag ) { | |
| soi_collision_shape_update_flag[ k ] | u(1) |
| if (soi_collision_shape_update_flag[ k] ]) | |
| soi_collision_shape_id[ k ] | u(16) |
| } | |
| if( soi_point_style_present_flag ) { | |
| soi_point_style_update_flag[ k ] | u(1) |
| if (soi_point_style_update_flag[ k] ]) { | |
| soi_point_shape_id[ k ] | u(8) |
| soi_point_size[ k ] | u(16) |
| } | |
| } | |
| if( soi_material_id_present_flag ) { | |
| soi_material_id_update_flag[ k ] | u(1) |
| if (soi_material_id_update_flag[ k] ]) | |
| soi_material_id[ k ] | u(16) |
| } | |

FIG. 47

| | |
|---|---|
| if( soi_object_cameraview_present_flag ) { | |
| soi_objcct_camcravicw_updatc_flag[ k ] | u(1) |
| if(soi_object_cameraview_update_flag[ k ]) { | |
| soi_object_num_cameraviews[ k ] | |
| for( j = 0; j < soi_object_num_cameraviews[ k ]; j++) | u(v) |
| soi_object_cameraview_idx[ k ][ j ] | |
| } | ue(v) |
| } | |
| } | |
| } | |
| } | |
| } | |

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

CROSS-REFERENCE TO RELATED APPLICATION

This application is the National Stage filing under 35 U.S.C. 371 of International Application No. PCT/KR2021/011600, filed on Aug. 30, 2021, which claims the benefit of earlier filing date and right of priority to Korean Patent Application Nos. 10-2020-0117182, filed on Sep. 11, 2020 and 10-2020-0127235, filed on Sep. 29, 2020, the contents of which are all incorporated by reference herein in their entireties.

TECHNICAL FIELD

Embodiments provide a method for providing point cloud content to provide a user with various services such as virtual reality (VR), augmented reality (AR), mixed reality (MR), and self-driving services.

BACKGROUND ART

A point cloud is a set of points in a three-dimensional (3D) space. It is difficult to generate point cloud data because the number of points in the 3D space is large.

A large throughput is required to transmit and receive data of a point cloud.

DISCLOSURE

Technical Problem

An object of the present disclosure is to provide a point cloud data transmission device, a point cloud data transmission method, a point cloud data reception device, and a point cloud data reception method for efficiently transmitting and receiving a point cloud.

Another object of the present disclosure is to provide a point cloud data transmission device, a point cloud data transmission method, a point cloud data reception device, and a point cloud data reception method for addressing latency and encoding/decoding complexity.

Embodiments are not limited to the above-described objects, and the scope of the embodiments may be extended to other objects that can be inferred by those skilled in the art based on the entire contents of the present disclosure.

Technical Solution

The above objects and other objects of the present disclosure can be achieved by providing a method of transmitting point cloud data. The method may include encoding point cloud data, and transmitting the point cloud data.

A method of receiving point cloud data according to embodiments may include receiving point cloud data, decoding the point cloud data, and rendering the point cloud data.

Advantageous Effects

The point cloud data transmission method, the point cloud data transmission apparatus, the point cloud data reception method, and the point cloud data reception apparatus according to the embodiments may provide a good-quality point cloud service.

The point cloud data transmission method, the point cloud data transmission apparatus, the point cloud data reception method, and the point cloud data reception apparatus according to the embodiments may achieve various video codec methods.

The point cloud data transmission method, the point cloud data transmission apparatus, the point cloud data reception method, and the point cloud data reception apparatus according to the embodiments may provide universal point cloud content such as a self-driving service.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIGS. 27 and 28 show a general V3C parameter set according to embodiments;

FIG. 29 illustrates attribute information according to embodiments;

FIGS. 31 and 32 show an atlas sequence parameter set according to embodiments;

FIG. 33 shows another atlas frame parameter set according to embodiments;

FIGS. 34 and 35 show atlas frame tile information according to embodiments;

FIG. 36 shows an atlas adaptation parameter according to embodiments;

FIG. 37 shows patch information data according to embodiments;

FIGS. 38 and 39 show a patch data unit according to embodiments;

FIGS. 42 to 47 show a scene object information SEI message syntax included in a volumetric annotation SEI message family syntax according to embodiments;

BEST MODE

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that can be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
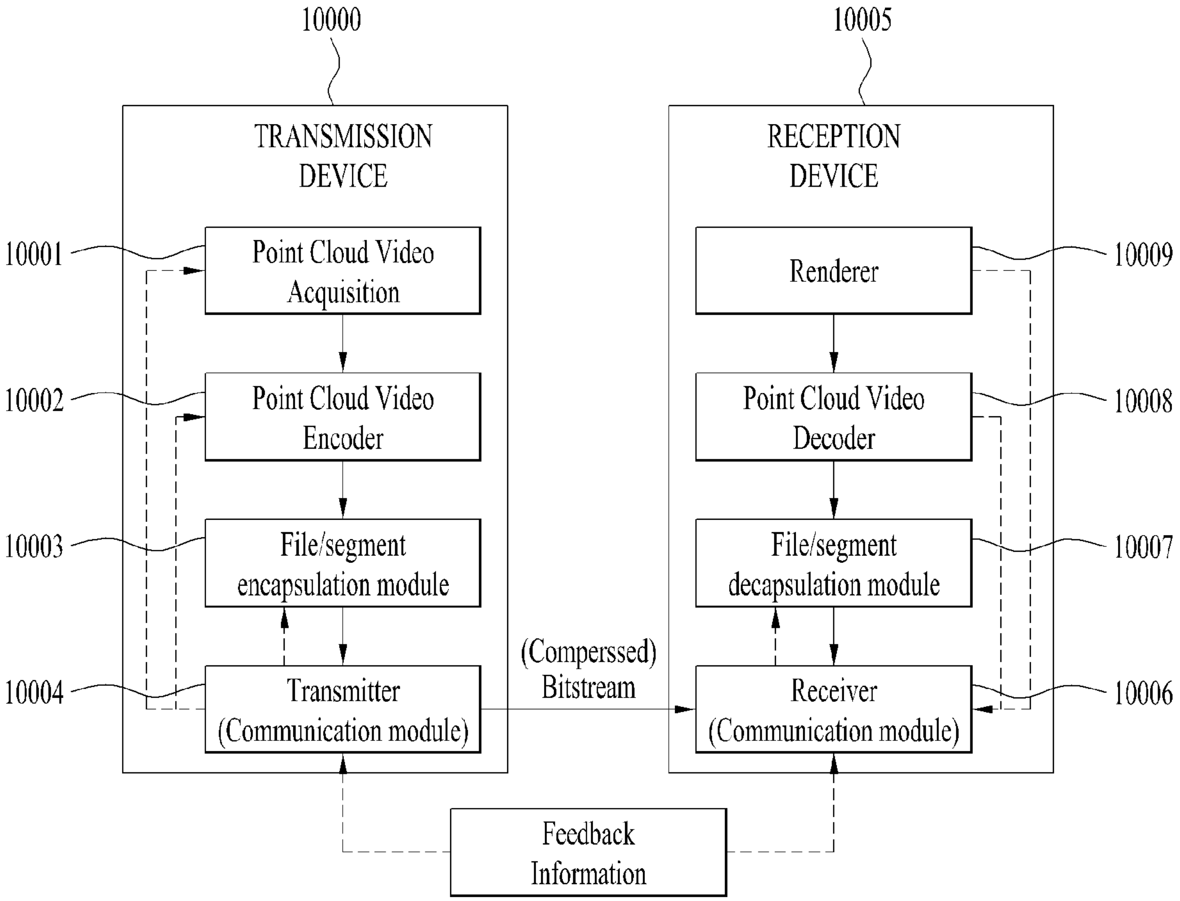
FIG. 1 illustrates an exemplary structure of a transmission/reception system for providing point cloud content according to embodiments.

FIG. 1 illustrates an exemplary structure of a transmission/reception system for providing point cloud content according to embodiments.

The present disclosure provides a method of providing point cloud content to provide a user with various services such as virtual reality (VR), augmented reality (AR), mixed reality (MR), and self-driving. The point cloud content according to the embodiments represent data representing objects as points, and may be referred to as a point cloud, point cloud data, point cloud video data, point cloud image data, or the like.

A point cloud data transmission device 10000 according to embodiment may include a point cloud video acquirer 10001, a point cloud video encoder 10002, a file/segment encapsulation module 10003, and/or a transmitter (or communication module) 10004. The transmission device according to the embodiments may secure and process point cloud video (or point cloud content) and transmit the same. According to embodiments, the transmission device may include a fixed station, a base transceiver system (BTS), a network, an artificial intelligence (AI) device and/or system, a robot, and an AR/VR/XR device and/or a server. According to embodiments, the transmission device 10000 may include a device robot, a vehicle, AR/VR/XR devices, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The point cloud video acquirer 10001 according to the embodiments acquires a point cloud video through a process of capturing, synthesizing, or generating a point cloud video.

The point cloud video encoder 10002 according to the embodiments encodes the point cloud video data. According to embodiments, the point cloud video encoder 10002 may be referred to as a point cloud encoder, a point cloud data encoder, an encoder, or the like. The point cloud compression coding (encoding) according to the embodiments is not limited to the above-described embodiment. The point cloud video encoder may output a bitstream containing the encoded point cloud video data. The bitstream may not only include encoded point cloud video data, but also include signaling information related to encoding of the point cloud video data.

The encoder according to the embodiments may support both the geometry-based point cloud compression (G-PCC) encoding scheme and/or the video-based point cloud compression (V-PCC) encoding scheme. In addition, the encoder may encode a point cloud (referring to either point cloud data or points) and/or signaling data related to the point cloud. The specific operation of encoding according to embodiments will be described below.

As used herein, the term V-PCC may stand for Video-based Point Cloud Compression (V-PCC). The term V-PCC may be the same as Visual Volumetric Video-based Coding (V3C). These terms may be complementarily used.

The file/segment encapsulation module 10003 according to the embodiments encapsulates the point cloud data in the form of a file and/or segment form. The point cloud data transmission method/device according to the embodiments may transmit the point cloud data in a file and/or segment form.

The transmitter (or communication module) 10004 according to the embodiments transmits the encoded point cloud video data in the form of a bitstream. According to embodiments, the file or segment may be transmitted to a reception device over a network, or stored in a digital storage medium (e.g., USB, SD, CD, DVD, Blu-ray, HDD, SSD, etc.). The transmitter according to the embodiments is capable of wired/wireless communication with the reception device (or the receiver) over a network of 4G, 5G, 6G, etc. In addition, the transmitter may perform necessary data processing operation according to the network system (e.g., a 4G, 5G or 6G communication network system). The transmission device may transmit the encapsulated data in an on-demand manner.

A point cloud data reception device 10005 according to the embodiments may include a receiver 10006, a file/segment decapsulation module 10007, a point cloud video decoder 10008, and/or a renderer 10009. According to embodiments, the reception device may include a device robot, a vehicle, AR/VR/XR devices, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The receiver 10006 according to the embodiments receives a bitstream containing point cloud video data. According to embodiments, the receiver 10006 may transmit feedback information to the point cloud data transmission device 10000.

The file/segment decapsulation module 10007 decapsulates a file and/or a segment containing point cloud data. The decapsulation module according to the embodiments may perform a reverse process of the encapsulation process according to the embodiments.

The point cloud video decoder 10007 decodes the received point cloud video data. The decoder according to the embodiments may perform a reverse process of encoding according to the embodiments.

The renderer 10009 renders the decoded point cloud video data. According to embodiments, the renderer 10009 may transmit the feedback information obtained at the reception side to the point cloud video decoder 10008. The point cloud video data according to the embodiments may carry feedback information to the receiver. According to embodiments, the feedback information received by the point cloud transmission device may be provided to the point cloud video encoder.

The arrows indicated by dotted lines in the drawing represent a transmission path of feedback information acquired by the reception device 10005. The feedback information is information for reflecting interactivity with a user who consumes point cloud content, and includes user information (e.g., head orientation information), viewport information, and the like). In particular, when the point cloud content is content for a service (e.g., self-driving service, etc.) that requires interaction with a user, the feedback information may be provided to the content transmitting side (e.g., the transmission device 10000) and/or the service provider. According to embodiments, the feedback information may be used in the reception device 10005 as well as the transmission device 10000, and may not be provided.

The head orientation information according to embodiments is information about a user's head position, orientation, angle, motion, and the like. The reception device 10005 according to the embodiments may calculate viewport information based on the head orientation information. The viewport information may be information about a region of the point cloud video that the user is viewing. A viewpoint is a point where a user is viewing a point cloud video, and may refer to a center point of the viewport region. That is, the viewport is a region centered on the viewpoint, and the size and shape of the region may be determined by a field of view (FOV). Accordingly, the reception device 10005 may extract the viewport information based on a vertical or horizontal FOV supported by the device in addition to the head orientation information. In addition, the reception device 10005 performs gaze analysis to check how the user consumes a point cloud, a region that the user gazes at in the point cloud video, a gaze time, and the like. According to embodiments, the reception device 10005 may transmit feedback information including the result of the gaze analysis to the transmission device 10000. The feedback information according to the embodiments may be acquired in the rendering and/or display process. The feedback information according to the embodiments may be secured by one or more sensors included in the reception device 10005. In addition, according to embodiments, the feedback information may be secured by the renderer 10009 or a separate external element (or device, component, etc.). The dotted lines in FIG. 1 represent a process of transmitting the feedback information secured by the renderer 10009. The point cloud content providing system may process (encode/decode) point cloud data based on the feedback information. Accordingly, the point cloud video data decoder 10008 may perform a decoding operation based on the feedback information. The reception device 10005 may transmit the feedback information to the transmission device. The transmission device (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) all point cloud data, and provide point cloud content to the user.

According to embodiments, the transmission device 10000 may be called an encoder, a transmission device, a transmitter, or the like, and the reception device 10004 may be called a decoder, a reception device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to point cloud data.

The elements of the point cloud content providing system illustrated in FIG. 1 may be implemented by hardware, software, a processor, and/or combinations thereof.

Embodiments may provide a method of providing point cloud content to provide a user with various services such as virtual reality (VR), augmented reality (AR), mixed reality (MR), and self-driving.

In order to provide a point cloud content service, a point cloud video may be acquired first. The acquired point cloud video may be transmitted through a series of processes, and the reception side may process the received data back into the original point cloud video and render the processed point cloud video. Thereby, the point cloud video may be provided to the user. Embodiments provide a method of effectively performing this series of processes.

The entire processes for providing a point cloud content service (the point cloud data transmission method and/or point cloud data reception method) may include an acquisition process, an encoding process, a transmission process, a decoding process, a rendering process, and/or a feedback process.

According to embodiments, the process of providing point cloud content (or point cloud data) may be referred to as a point cloud compression process. According to embodiments, the point cloud compression process may represent a geometry-based point cloud compression process.

Each element of the point cloud data transmission device and the point cloud data reception device according to the embodiments may be hardware, software, a processor, and/or a combination thereof.

In order to provide a point cloud content service, a point cloud video may be acquired. The acquired point cloud video is transmitted through a series of processes, and the reception side may process the received data back into the original point cloud video and render the processed point cloud video. Thereby, the point cloud video may be provided to the user. Embodiments provide a method of effectively performing this series of processes.

The entire processes for providing a point cloud content service may include an acquisition process, an encoding process, a transmission process, a decoding process, a rendering process, and/or a feedback process.

The point cloud compression system may include a transmission device and a reception device. The transmission device may output a bitstream by encoding a point cloud video, and deliver the same to the reception device through a digital storage medium or a network in the form of a file or a stream (streaming segment). The digital storage medium may include various storage media such as a USB, SD, CD, DVD, Blu-ray, HDD, and SSD.

The transmission device may include a point cloud video acquirer, a point cloud video encoder, a file/segment encapsulator, and a transmitter. The reception device may include a receiver, a file/segment decapsulator, a point cloud video decoder, and a renderer. The encoder may be referred to as a point cloud video/picture/picture/frame encoder, and the decoder may be referred to as a point cloud video/picture/picture/frame decoding device. The transmitter may be included in the point cloud video encoder. The receiver may be included in the point cloud video decoder. The renderer may include a display. The renderer and/or the display may be configured as separate devices or external components. The transmission device and the reception device may further include a separate internal or external module/unit/component for the feedback process.

According to embodiments, the operation of the reception device may be the reverse process of the operation of the transmission device.

The point cloud video acquirer may perform the process of acquiring point cloud video through a process of capturing, composing, or generating point cloud video. In the acquisition process, data of 3D positions (x, y, z)/attributes (color, reflectance, transparency, etc.) of multiple points, for example, a polygon file format (PLY) (or the Stanford Triangle format) file may be generated. For a video having multiple frames, one or more files may be acquired. During the capture process, point cloud related metadata (e.g., capture related metadata) may be generated.

A point cloud data transmission device according to embodiments may include an encoder configured to encode point cloud data, and a transmitter configured to transmit the point cloud data. The data may be transmitted in the form of a bitstream containing a point cloud.

A point cloud data reception device according to embodiments may include a receiver configured to receive point cloud data, a decoder configured to decode the point cloud data, and a renderer configured to render the point cloud data.

The method/device according to the embodiments represents the point cloud data transmission device and/or the point cloud data reception device.

Figure 2:
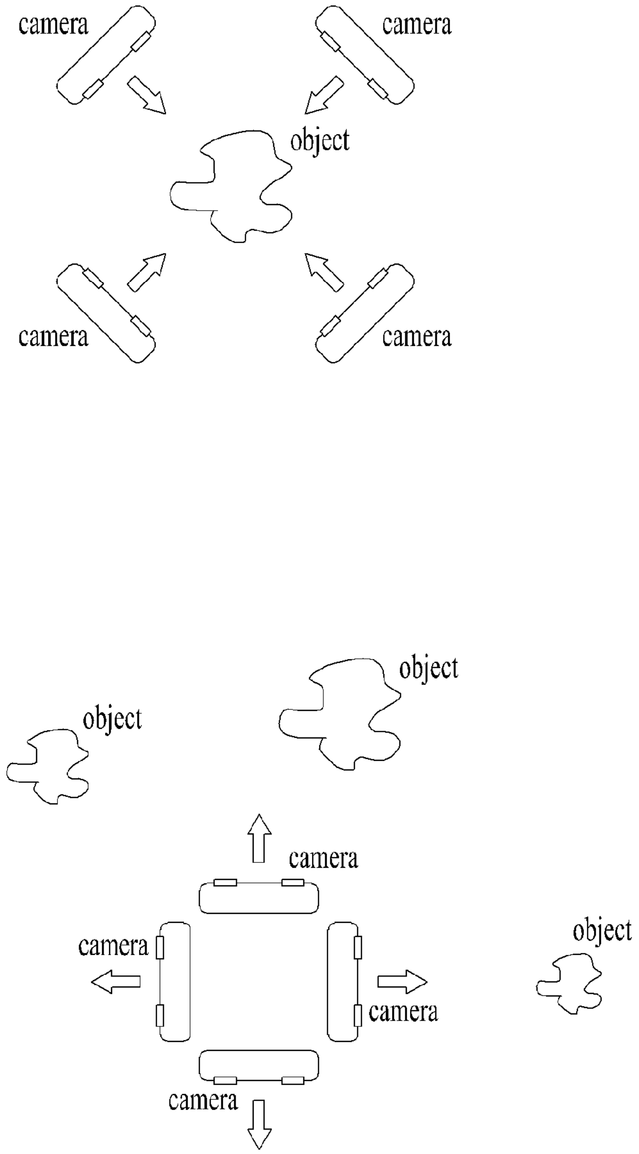
FIG. 2 illustrates capture of point cloud data according to embodiments.

FIG. 2 illustrates capture of point cloud data according to embodiments.

Point cloud data according to embodiments may be acquired by a camera or the like. A capturing technique according to embodiments may include, for example, inward-facing and/or outward-facing.

In the inward-facing according to the embodiments, one or more cameras inwardly facing an object of point cloud data may photograph the object from the outside of the object.

In the outward-facing according to the embodiments, one or more cameras outwardly facing an object of point cloud data may photograph the object. For example, according to embodiments, there may be four cameras.

The point cloud data or the point cloud content according to the embodiments may be a video or a still image of an object/environment represented in various types of 3D spaces. According to embodiments, the point cloud content may include video/audio/an image of an object.

For capture of point cloud content, a combination of camera equipment (a combination of an infrared pattern projector and an infrared camera) capable of acquiring depth and RGB cameras capable of extracting color information corresponding to the depth information may be configured. Alternatively, the depth information may be extracted through LiDAR, which uses a radar system that measures the location coordinates of a reflector by emitting a laser pulse and measuring the return time. A shape of the geometry consisting of points in a 3D space may be extracted from the depth information, and an attribute representing the color/reflectance of each point may be extracted from the RGB information. The point cloud content may include information about the positions (x, y, and color (YCbCr or RGB) or reflectance (r) of the points. For the point cloud content, the outward-facing technique of capturing an external environment and the inward-facing technique of capturing a central object may be used. In the VR/AR environment, when an object (e.g., a core object such as a character, a player, a thing, or an actor) is configured into point cloud content that may be viewed by the user in any direction (360 degrees), the configuration of the capture camera may be based on the inward-facing technique. When the current surrounding environment is configured into point cloud content in a mode of a vehicle, such as self-driving, the configuration of the capture camera may be based on the outward-facing technique. Because the point cloud content may be captured by multiple cameras, a camera calibration process may need to be performed before the content is captured to configure a global coordinate system for the cameras.

The point cloud content may be a video or still image of an object/environment presented in various types of 3D spaces.

Additionally, in the point cloud content acquisition method, any point cloud video may be composed based on the captured point cloud video. Alternatively, when a point cloud video for a computer-generated virtual space is to be provided, capturing with an actual camera may not be performed. In this case, the capture process may be replaced simply by a process of generating related data.

Post-processing may be needed for the captured point cloud video to improve the quality of the content. In the video capture process, the maximum/minimum depth may be adjusted within a range provided by the camera equipment. Even after the adjustment, point data of an unwanted area may still be present. Accordingly, post-processing of removing the unwanted area (e.g., the background) or recognizing a connected space and filling the spatial holes may be performed. In addition, point clouds extracted from the cameras sharing a spatial coordinate system may be integrated into one piece of content through the process of transforming each point into a global coordinate system based on the coordinates of the location of each camera acquired through a calibration process. Thereby, one piece of point cloud content having a wide range may be generated, or point cloud content with a high density of points may be acquired.

The point cloud video encoder may encode the input point cloud video into one or more video streams. One video may include a plurality of frames, each of which may correspond to a still image/picture. In this specification, a point cloud video may include a point cloud image/frame/picture/video/audio. In addition, the term "point cloud video" may be used interchangeably with a point cloud image/frame/picture. The point cloud video encoder may perform a video-based point cloud compression (V-PCC) procedure. The point cloud video encoder may perform a series of procedures such as prediction, transformation, quantization, and entropy coding for compression and encoding efficiency. The encoded data (encoded video/image information) may be output in the form of a bitstream. Based on the V-PCC procedure, the point cloud video encoder may encode point cloud video by dividing the same into a geometry video, an attribute video, an occupancy map video, and auxiliary information, which will be described later. The geometry video may include a geometry image, the attribute video may include an attribute image, and the occupancy map video may include an occupancy map image. The auxiliary information may include auxiliary patch information. The attribute video/image may include a texture video/image.

The encapsulation processor (file/segment encapsulation module) 1003 may encapsulate the encoded point cloud video data and/or metadata related to the point cloud video in the form of, for example, a file. Here, the metadata related to the point cloud video may be received from the metadata processor. The metadata processor may be included in the point cloud video encoder or may be configured as a separate component/module. The encapsulation processor may encapsulate the data in a file format such as IS OBMFF or process the same in the form of a DASH segment or the like. According to an embodiment, the encapsulation processor may include the point cloud video-related metadata in the file format. The point cloud video metadata may be included, for example, in boxes at various levels on the ISOBMFF file format or as data in a separate track within the file. According to an embodiment, the encapsulation processor may encapsulate the point cloud video-related metadata into a file. The transmission processor may perform processing for transmission on the point cloud video data encapsulated according to the file format. The transmission processor may be included in the transmitter or may be configured as a separate component/module. The transmission processor may process the point cloud video data according to a transmission protocol. The processing for transmission may include processing for delivery over a broadcast network and processing for delivery through a broadband. According to an embodiment, the transmission processor may receive point cloud video-related metadata from the metadata processor along with the point cloud video data, and perform processing of the point cloud video data for transmission.

The transmitter 1004 may transmit the encoded video/image information or data that is output in the form of a bitstream to the receiver of the reception device through a digital storage medium or a network in the form of a file or streaming. The digital storage medium may include various storage media such as USB, SD, CD, DVD, Blu-ray, HDD, and SSD. The transmitter may include an element for generating a media file in a predetermined file format, and may include an element for transmission over a broadcast/communication network. The receiver may extract the bitstream and transmit the extracted bitstream to the decoding device.

The receiver 1003 may receive point cloud video data transmitted by the point cloud video transmission device according to the present disclosure. Depending on the transmission channel, the receiver may receive the point cloud video data over a broadcast network or through a broadband. Alternatively, the point cloud video data may be received through a digital storage medium.

The reception processor may process the received point cloud video data according to the transmission protocol. The reception processor may be included in the receiver or may be configured as a separate component/module. The reception processor may reversely perform the above-described process of the transmission processor such that the processing corresponds to the processing for transmission performed at the transmission side. The reception processor may deliver the acquired point cloud video data to the decapsulation processor, and the acquired point cloud video-related metadata to the metadata parser. The point cloud video-related metadata acquired by the reception processor may take the form of a signaling table.

The decapsulation processor (file/segment decapsulation module) 10007 may decapsulate the point cloud video data received in the form of a file from the reception processor. The decapsulation processor may decapsulate the files according to ISOBMFF or the like, and may acquire a point cloud video bitstream or point cloud video-related metadata (a metadata bitstream). The acquired point cloud video bitstream may be delivered to the point cloud video decoder, and the acquired point cloud video-related metadata (metadata bitstream) may be delivered to the metadata processor. The point cloud video bitstream may include the metadata (metadata bitstream). The metadata processor may be included in the point cloud video decoder or may be configured as a separate component/module. The point cloud video-related metadata acquired by the decapsulation processor may take the form of a box or a track in the file format. The decapsulation processor may receive metadata necessary for decapsulation from the metadata processor, when necessary. The point cloud video-related metadata may be delivered to the point cloud video decoder and used in a point cloud video decoding procedure, or may be transferred to the renderer and used in a point cloud video rendering procedure.

The point cloud video decoder may receive the bitstream and decode the video/image by performing an operation corresponding to the operation of the point cloud video encoder. In this case, the point cloud video decoder may decode the point cloud video by dividing the same into a geometry video, an attribute video, an occupancy map video, and auxiliary information as described below. The geometry video may include a geometry image, and the attribute video may include an attribute image. The occupancy map video may include an occupancy map image. The auxiliary information may include auxiliary patch information. The attribute video/image may include a texture video/image.

The 3D geometry may be reconstructed based on the decoded geometry image, the occupancy map, and auxiliary patch information, and then may be subjected to a smoothing process. A color point cloud image/picture may be reconstructed by assigning color values to the smoothed 3D geometry based on the texture image. The renderer may render the reconstructed geometry and the color point cloud image/picture. The rendered video/image may be displayed through the display. The user may view all or part of the rendered result through a VR/AR display or a typical display.

The feedback process may include transferring various kinds of feedback information that may be acquired in the rendering/displaying process to the transmission side or to the decoder of the reception side. Interactivity may be provided through the feedback process in consuming point cloud video. According to an embodiment, head orientation information, viewport information indicating a region currently viewed by a user, and the like may be delivered to the transmission side in the feedback process. According to an embodiment, the user may interact with things implemented in the VR/AR/MR/self-driving environment. In this case, information related to the interaction may be delivered to the transmission side or a service provider during the feedback process. According to an embodiment, the feedback process may be skipped.

The head orientation information may represent information about the location, angle and motion of a user's head. On the basis of this information, information about a region of the point cloud video currently viewed by the user, that is, viewport information may be calculated.

The viewport information may be information about a region of the point cloud video currently viewed by the user. Gaze analysis may be performed using the viewport information to check the way the user consumes the point cloud video, a region of the point cloud video at which the user gazes, and how long the user gazes at the region. The gaze analysis may be performed at the reception side and the result of the analysis may be delivered to the transmission side on a feedback channel. A device such as a VR/AR/MR display may extract a viewport region based on the location/direction of the user's head, vertical or horizontal FOV supported by the device, and the like.

According to an embodiment, the aforementioned feedback information may not only be delivered to the transmission side, but also be consumed at the reception side. That is, decoding and rendering processes at the reception side may be performed based on the aforementioned feedback information. For example, only the point cloud video for the region currently viewed by the user may be preferentially decoded and rendered based on the head orientation information and/or the viewport information.

Here, the viewport or viewport region may represent a region of the point cloud video currently viewed by the user. A viewpoint is a point which is viewed by the user in the point cloud video and may represent a center point of the viewport region. That is, a viewport is a region around a viewpoint, and the size and form of the region may be determined by the field of view (FOY).

The present disclosure relates to point cloud video compression as described above. For example, the methods/embodiments disclosed in the present disclosure may be applied to the point cloud compression or point cloud coding (PCC) standard of the moving picture experts group (MPEG) or the next generation video/image coding standard.

As used herein, a picture/frame may generally represent a unit representing one image in a specific time interval.

A pixel or a pel may be the smallest unit constituting one picture (or image). Also, "sample" may be used as a term corresponding to a pixel. A sample may generally represent a pixel or a pixel value. It may represent only a pixel/pixel value of a luma component, only a pixel/pixel value of a chroma component, or only a pixel/pixel value of a depth component.

A unit may represent a basic unit of image processing. The unit may include at least one of a specific region of the picture and information related to the region. The unit may be used interchangeably with term such as block or area in some cases. In a general case, an M×N block may include samples (or a sample array) or a set (or array) of transform coefficients configured in M columns and N rows.

Figure 3:
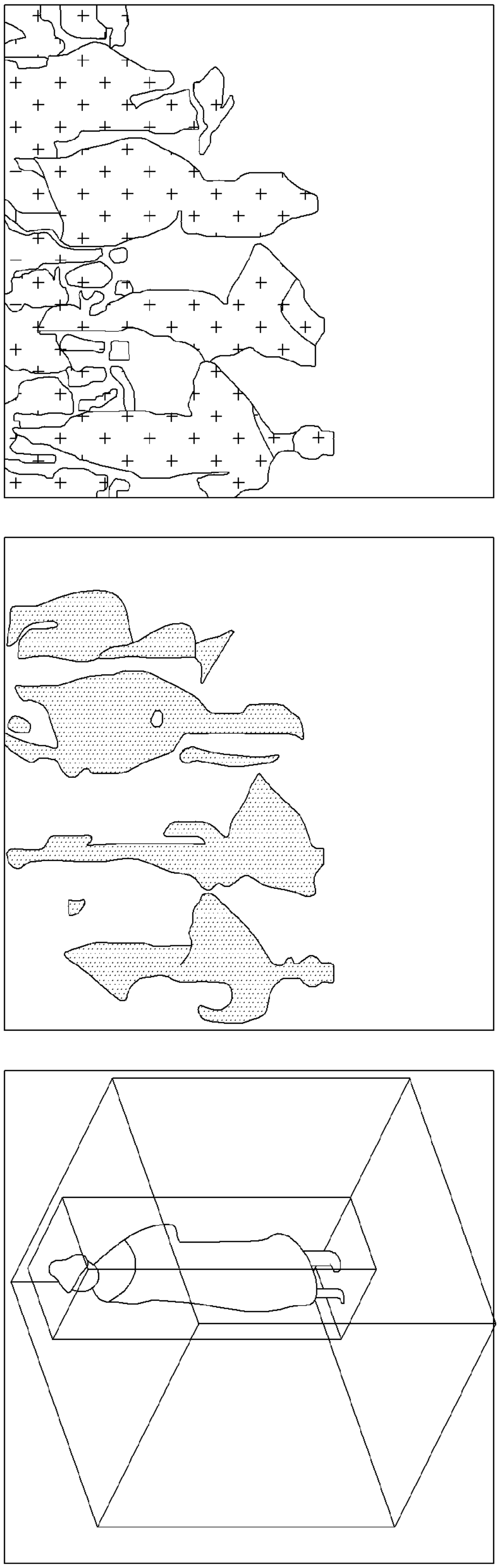
FIG. 3 illustrates an exemplary point cloud, geometry, and texture image according to embodiments.

FIG. 3 illustrates an example of a point cloud, a geometry image, and a texture image according to embodiments.

A point cloud according to the embodiments may be input to the V-PCC encoding process of FIG. 4, which will be described later, to generate a geometric image and a texture image. According to embodiments, a point cloud may have the same meaning as point cloud data.

As shown in the figure, the left part shows a point cloud, in which an object is positioned in a 3D space and may be represented by a bounding box or the like. The middle part shows the geometry, and the right part shows a texture image (non-padded image).

Video-based point cloud compression (V-PCC) according to embodiments may provide a method of compressing 3D point cloud data based on a 2D video codec such as HEVC or VVC. Data and information that may be generated in the V-PCC compression process are as follows:

Occupancy map: this is a binary map indicating whether there is data at a corresponding position in a 2D plane, using a value of 0 or 1 in dividing the points constituting a point cloud into patches and mapping the same to the 2D plane. The occupancy map may represent a 2D array corresponding to ATLAS, and the values of the occupancy map may indicate whether each sample position in the atlas corresponds to a 3D point.

An atlas is a collection of 2D bounding boxes positioned in a rectangular frame that correspond to a 3D bounding box in a 3D space in which volumetric data is rendered and information related thereto.

The atlas bitstream is a bitstream for one or more atlas frames constituting an atlas and related data.

The atlas frame is a 2D rectangular array of atlas samples onto which patches are projected.

An atlas sample is a position of a rectangular frame onto which patches associated with the atlas are projected.

An atlas frame may be partitioned into tiles. A tile is a unit in which a 2D frame is partitioned. That is, a tile is a unit for partitioning signaling information of point cloud data called an atlas.

Patch: A set of points constituting a point cloud, which indicates that points belonging to the same patch are adjacent to each other in 3D space and are mapped in the same direction among 6-face bounding box planes in the process of mapping to a 2D image.

Geometry image: this is an image in the form of a depth map that presents position information (geometry) about each point constituting a point cloud on a patch-by-patch basis. The geometry image may be composed of pixel values of one channel Geometry represents a set of coordinates associated with a point cloud frame.

Texture image: this is an image representing the color information about each point constituting a point cloud on a patch-by-patch basis. A texture image may be composed of pixel values of a plurality of channels (e.g., three channels of R, G, and B). The texture is included in an attribute. According to embodiments, a texture and/or attribute may be interpreted as the same object and/or having an inclusive relationship.

Auxiliary patch info: this indicates metadata needed to reconstruct a point cloud with individual patches. Auxiliary patch info may include information about the position, size, and the like of a patch in a 2D/3D space.

Point cloud data according to the embodiments, for example, V-PCC components may include an atlas, an occupancy map, geometry, and attributes.

Atlas represents a set of 2D bounding boxes. It may be patches, for example, patches projected onto a rectangular frame. Atlas may correspond to a 3D bounding box in a 3D space, and may represent a subset of a point cloud.

An attribute may represent a scalar or vector associated with each point in the point cloud. For example, the attributes may include color, reflectance, surface normal, time stamps, material ID.

The point cloud data according to the embodiments represents PCC data according to video-based point cloud compression (V-PCC) scheme. The point cloud data may include a plurality of components. For example, it may include an occupancy map, a patch, geometry and/or texture.

Figure 4:
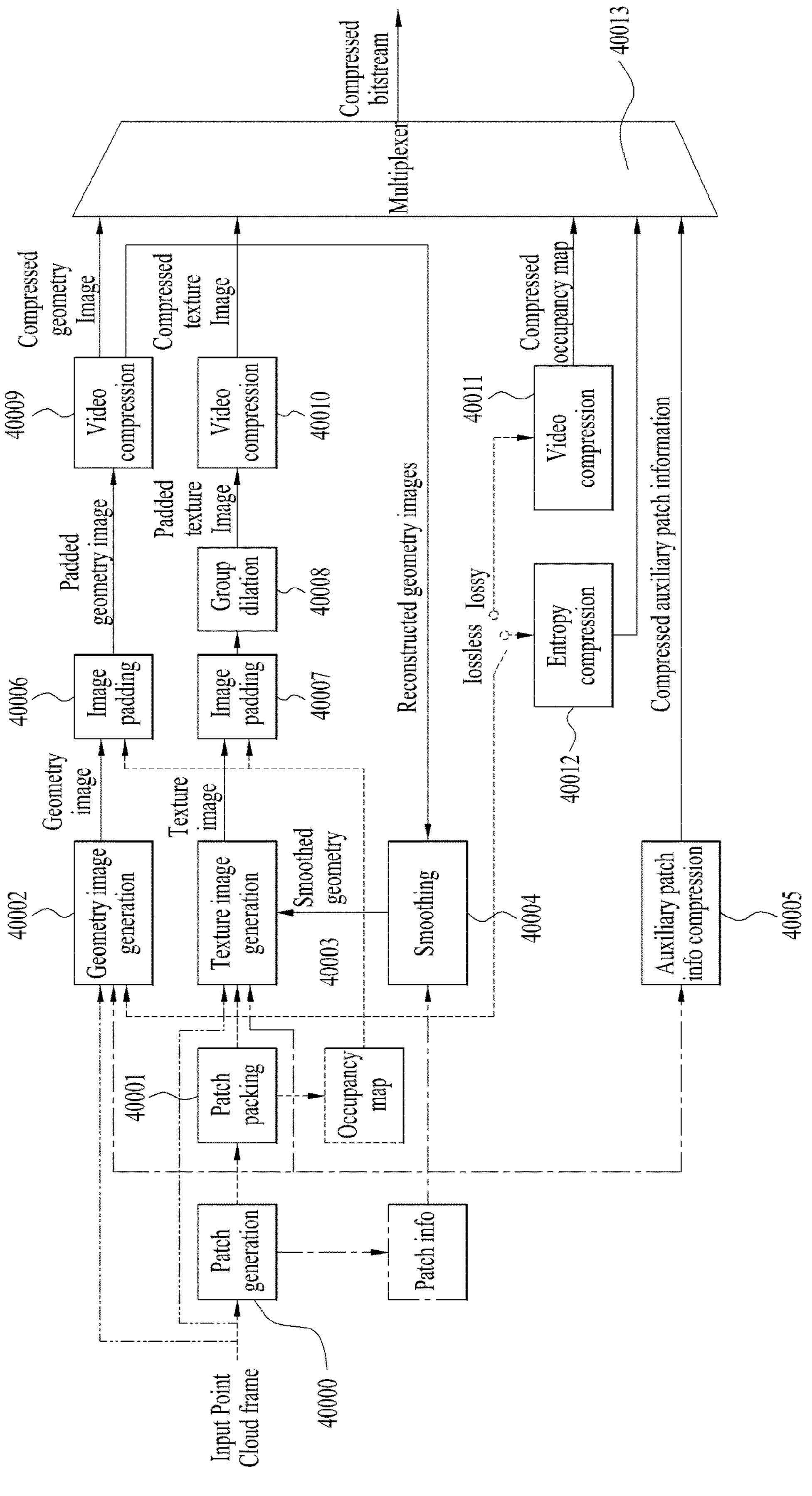
FIG. 4 illustrates an exemplary V-PCC encoding process according to embodiments.

FIG. 4 illustrates a V-PCC encoding process according to embodiments.

The figure illustrates a V-PCC encoding process for generating and compressing an occupancy map, a geometry image, a texture image, and auxiliary patch information. The V-PCC encoding process of FIG. 4 may be processed by the point cloud video encoder 10002 of FIG. 1. Each element of FIG. 4 may be performed by software, hardware, processor and/or a combination thereof.

The patch generation or patch generator 40000 receives a point cloud frame (which may be in the form of a bitstream containing point cloud data). The patch generator 40000 generates a patch from the point cloud data. In addition, patch information including information about patch generation is generated.

The patch packing or patch packer 40001 packs patches for point cloud data. For example, one or more patches may be packed. In addition, the patch packer generates an occupancy map containing information about patch packing.

The geometry image generation or geometry image generator 40002 generates a geometry image based on the point cloud data, patches, and/or packed patches. The geometry image refers to data containing geometry related to the point cloud data.

The texture image generation or texture image generator 40003 generates a texture image based on the point cloud data, patches, and/or packed patches. In addition, the texture image may be generated further based on smoothed geometry generated by smoothing processing of smoothing based on the patch information.

The smoothing or smoother 40004 may mitigate or eliminate errors contained in the image data. For example, based on the patched reconstructed geometry image, portions that may cause errors between data may be smoothly filtered out to generate smoothed geometry.

The auxiliary patch info compression or auxiliary patch info compressor 40005, auxiliary patch information related to the patch information generated in the patch generation is compressed. In addition, the compressed auxiliary patch information may be transmitted to the multiplexer. The auxiliary patch information may be used in the geometry image generation 40002.

The image padding or image padder 40006, 40007 may pad the geometry image and the texture image, respectively. The padding data may be padded to the geometry image and the texture image.

The group dilation or group dilator 40008 may add data to the texture image in a similar manner to image padding. The added data may be inserted into the texture image.

The video compression or video compressor 40009, 40010, 40011 may compress the padded geometry image, the padded texture image, and/or the occupancy map, respectively. The compression may encode geometry information, texture information, occupancy information, and the like.

The entropy compression or entropy compressor 40012 may compress (e.g., encode) the occupancy map based on an entropy scheme.

According to embodiments, the entropy compression and/or video compression may be performed, respectively depending on whether the point cloud data is lossless and/or lossy.

The multiplexer 40013 multiplexes the compressed geometry image, the compressed texture image, and the compressed occupancy map into a bitstream.

The specific operations in the respective processes of FIG. 4 are described below.

Patch Generation 40000

The patch generation process refers to a process of dividing a point cloud into patches, which are mapping units, in order to map the point cloud to the 2D image. The patch generation process may be divided into three steps: normal value calculation, segmentation, and patch segmentation.

The normal value calculation process will be described in detail with reference to FIG. 5.

Figure 5:
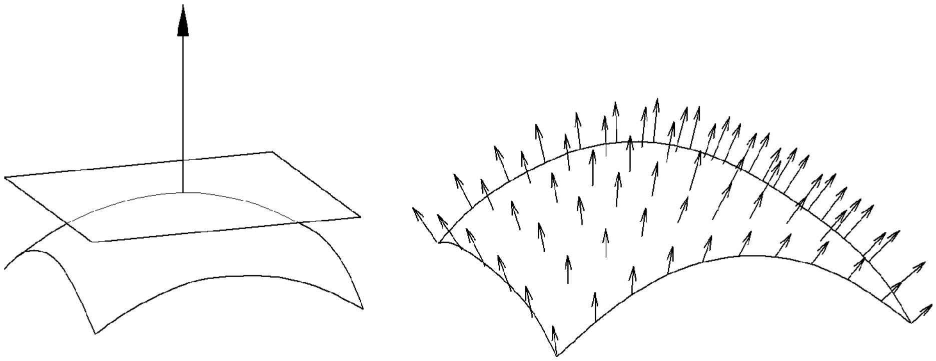
FIG. 5 illustrates an example of a tangent plane and a normal vector of a surface according to embodiments.

FIG. 5 illustrates an example of a tangent plane and a normal vector of a surface according to embodiments.

The surface of FIG. 5 is used in the patch generation process 40000 of the V-PCC encoding process of FIG. 4 as follows.

Normal Calculation Related to Patch Generation:

Each point of a point cloud has its own direction, which is represented by a 3D vector called a normal vector. Using the neighbors of each point obtained using a K-D tree or the like, a tangent plane and a normal vector of each point constituting the surface of the point cloud as shown in the figure may be obtained. The search range applied to the process of searching for neighbors may be defined by the user.

The tangent plane refers to a plane that passes through a point on the surface and completely includes a tangent line to the curve on the surface.

Figure 6:
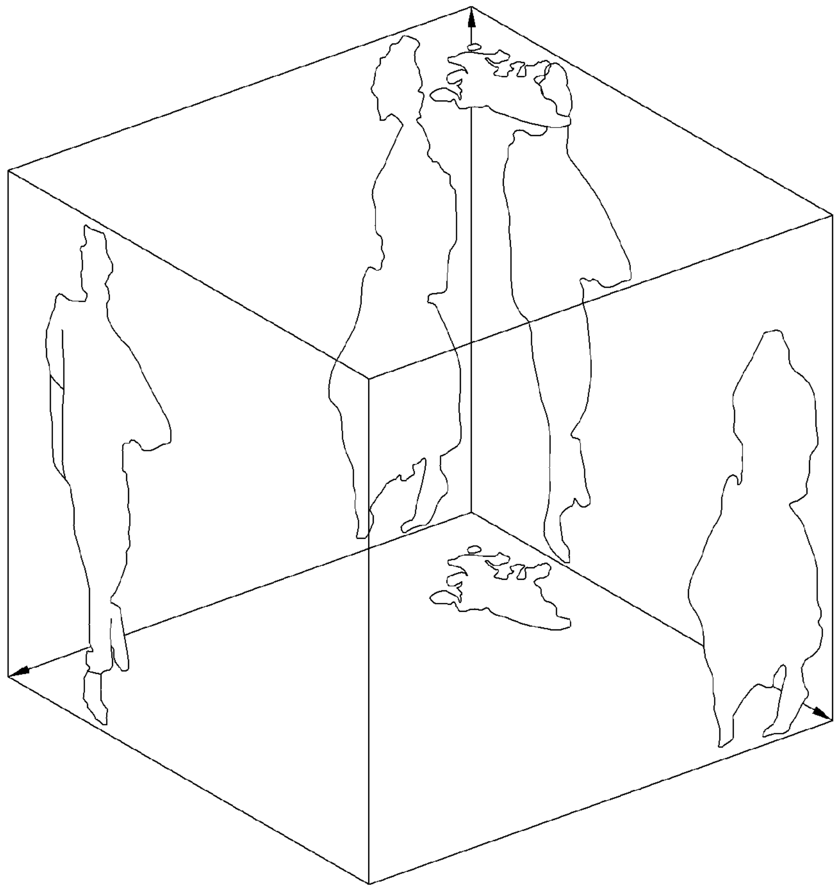
FIG. 6 illustrates an exemplary bounding box of a point cloud according to embodiments.

FIG. 6 illustrates an exemplary bounding box of a point cloud according to embodiments.

A method/device according to embodiments, for example, patch generation, may employ a bounding box in generating a patch from point cloud data.

The bounding box according to the embodiments refers to a box of a unit for dividing point cloud data based on a hexahedron in a 3D space.

The bounding box may be used in the process of projecting a target object of the point cloud data onto a plane of each planar face of a hexahedron in a 3D space. The bounding box may be generated and processed by the point cloud video acquirer 10000 and the point cloud video encoder 10002 of FIG. 1. Further, based on the bounding box, the patch generation 40000, patch packing 40001, geometry image generation 40002, and texture image generation 40003 of the V-PCC encoding process of FIG. 2 may be performed.

Segmentation Related to Patch Generation

Segmentation is divided into two processes: initial segmentation and refine segmentation.

The point cloud encoder 10002 according to the embodiments projects a point onto one face of a bounding box. Specifically, each point constituting a point cloud is projected onto one of the six faces of a bounding box surrounding the point cloud as shown in the figure. Initial segmentation is a process of determining one of the planar faces of the bounding box onto which each point is to be projected.

$\vec{n}_{pi}$ which is a normal value corresponding to each of the six planar faces, is defined as follows:

(1.0, 0.0, 0.0), (0.0, 1.0, 0.0), (0.0, 0.0, 1.0), (−1.0, 0.0, 0.0), (0.0, −1.0, 0.0), (0.0, 0.0, −1.0).

As shown in the equation below, a face that yields the maximum value of dot product of the normal vector $\vec{n}_{pi}$ of each point, which is obtained in the normal value calculation process, and $\vec{n}_{p_{idx}}$ is determined as a projection plane of the corresponding point. That is, a plane whose normal vector is most similar to the direction of the normal vector of a point is determined as the projection plane of the point.

$$\max_{p_{idx}}\{\vec{n}_{p_i}\cdot\vec{n}_{p_{idx}}\}$$

The determined plane may be identified by one cluster index, which is one of 0 to 5.

Refine segmentation is a process of enhancing the projection plane of each point constituting the point cloud determined in the initial segmentation process in consideration of the projection planes of neighboring points. In this process, a score normal, which represents the degree of similarity between the normal vector of each point and the normal of each planar face of the bounding box which are considered in determining the projection plane in the initial segmentation process, and score smooth, which indicates the degree of similarity between the projection plane of the current point and the projection planes of neighboring points, may be considered together.

Score smooth may be considered by assigning a weight to the score normal. In this case, the weight value may be defined by the user. The refine segmentation may be performed repeatedly, and the number of repetitions may also be defined by the user.

Patch Segmentation Related to Patch Generation

Patch segmentation is a process of dividing the entire point cloud into patches, which are sets of neighboring points, based on the projection plane information about each point constituting the point cloud obtained in the initial/refine segmentation process. The patch segmentation may include the following steps:

1) Calculate neighboring points of each point constituting the point cloud, using the K-D tree or the like. The maximum number of neighbors may be defined by the user;

2) When the neighboring points are projected onto the same plane as the current point (when they have the same cluster index), extract the current point and the neighboring points as one patch;

3) Calculate geometry values of the extracted patch. The details are described below; and 4) Repeat operations 2) to 4) until there is no unextracted point.

The occupancy map, geometry image and texture image for each patch as well as the size of each patch are determined through the patch segmentation process.

Figure 7:
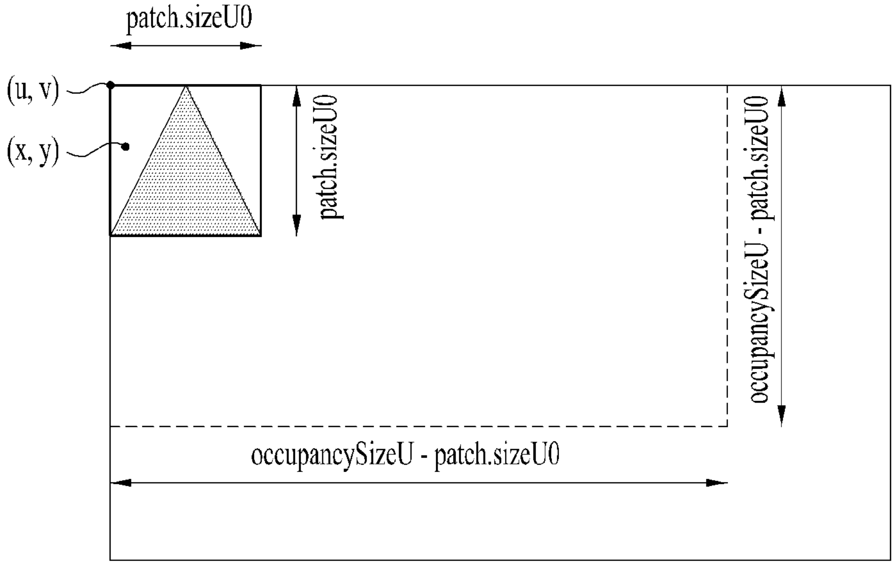
FIG. 7 illustrates an example of determination of individual patch positions on an occupancy map according to embodiments.

FIG. 7 illustrates an example of determination of individual patch positions on an occupancy map according to embodiments.

The point cloud encoder 10002 according to the embodiments may perform patch packing and generate an occupancy map.

Patch Packing & Occupancy Map Generation (40001)

This is a process of determining the positions of individual patches in a 2D image to map the segmented patches to the 2D image. The occupancy map, which is a kind of 2D image, is a binary map that indicates whether there is data at a corresponding position, using a value of 0 or 1. The occupancy map is composed of blocks and the resolution thereof may be determined by the size of the block. For example, when the block is 1*1 block, a pixel-level resolution is obtained. The occupancy packing block size may be determined by the user.

The process of determining the positions of individual patches on the occupancy map may be configured as follows:

1) Set all positions on the occupancy map to 0;

2) Place a Patch at a Point (u, v) Having a Horizontal Coordinate within the Range of (0, occupancySizeU-patch.sizeU0) and a vertical coordinate within the range of (0, occupancySizeV-patch.sizeV0) in the occupancy map plane;

3) Set a point (x, y) having a horizontal coordinate within the range of (0, patch.sizeU0) and a vertical coordinate within the range of (0, patch.sizeV0) in the patch plane as a current point;

4) Change the position of point (x, y) in raster order and repeat operations 3) and 4) if the value of coordinate (x, y) on the patch occupancy map is 1 (there is data at the point in the patch) and the value of coordinate (u+x, v+y) on the global occupancy map is 1 (the occupancy map is filled with the previous patch). Otherwise, proceed to operation 6);

5) Change the position of (u, v) in raster order and repeat operations 3) to 5);

6) Determine (u, v) as the position of the patch and copy the occupancy map data about the patch onto the corresponding portion on the global occupancy map; and 7) Repeat operations 2) to 7) for the next patch.

occupancySizeU: indicates the width of the occupancy map. The unit thereof is occupancy packing block size.

occupancySizeV: indicates the height of the occupancy map. The unit thereof is occupancy packing block size.

patch.sizeU0: indicates the width of the occupancy map. The unit thereof is occupancy packing block size.

patch.sizeV0: indicates the height of the occupancy map. The unit thereof is occupancy packing block size.

For example, as shown in FIG. 7, there is a box corresponding to a patch having a patch size in a box corresponding to an occupancy packing size block, and a point (x, y) may be located in the box.

Figure 8:
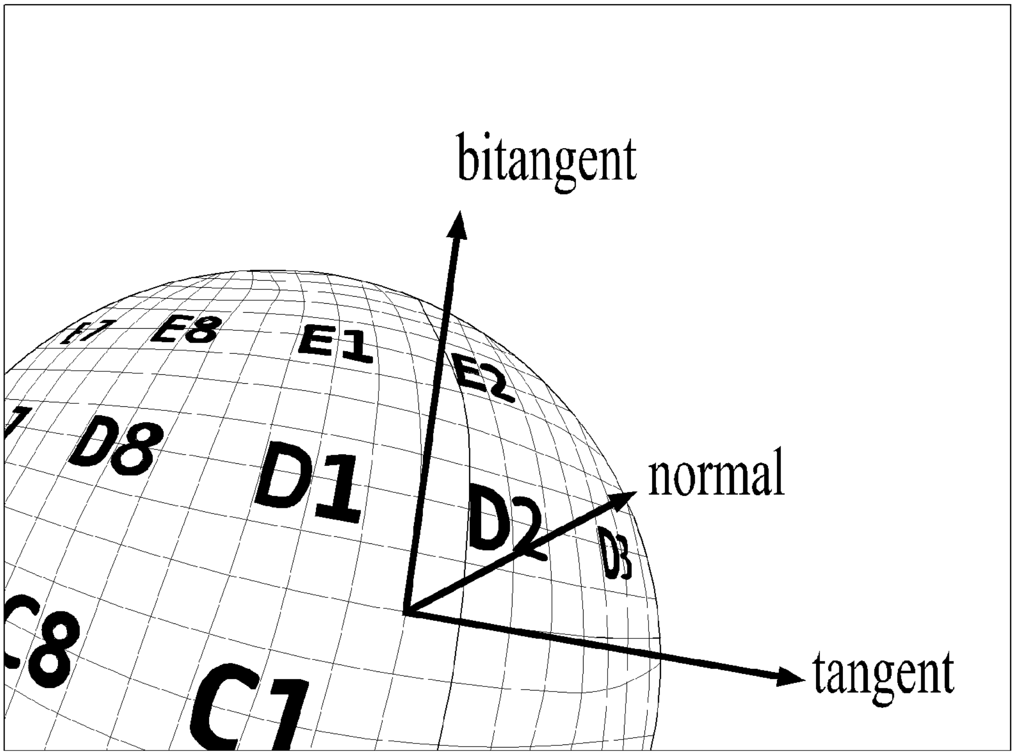
FIG. 8 shows an exemplary relationship among normal, tangent, and bitangent axes according to embodiments.

FIG. 8 shows an exemplary relationship among normal, tangent, and bitangent axes according to embodiments.

The point cloud encoder 10002 according to embodiments may generate a geometry image. The geometry image refers to image data including geometry information about a point cloud. The geometry image generation process may employ three axes (normal, tangent, and bitangent) of a patch in FIG. 8.

Geometry Image Generation (40002)

In this process, the depth values constituting the geometry images of individual patches are determined, and the entire geometry image is generated based on the positions of the patches determined in the patch packing process described above. The process of determining the depth values constituting the geometry images of individual patches may be configured as follows.

1) Calculate parameters related to the position and size of an individual patch. The parameters may include the following information.

A normal index indicating the normal axis is obtained in the previous patch generation process. The tangent axis is an axis coincident with the horizontal axis u of the patch image among the axes perpendicular to the normal axis, and the bitangent axis is an axis coincident with the vertical axis v of the patch image among the axes perpendicular to the normal axis. The three axes may be expressed as shown in the figure.

Figure 9:
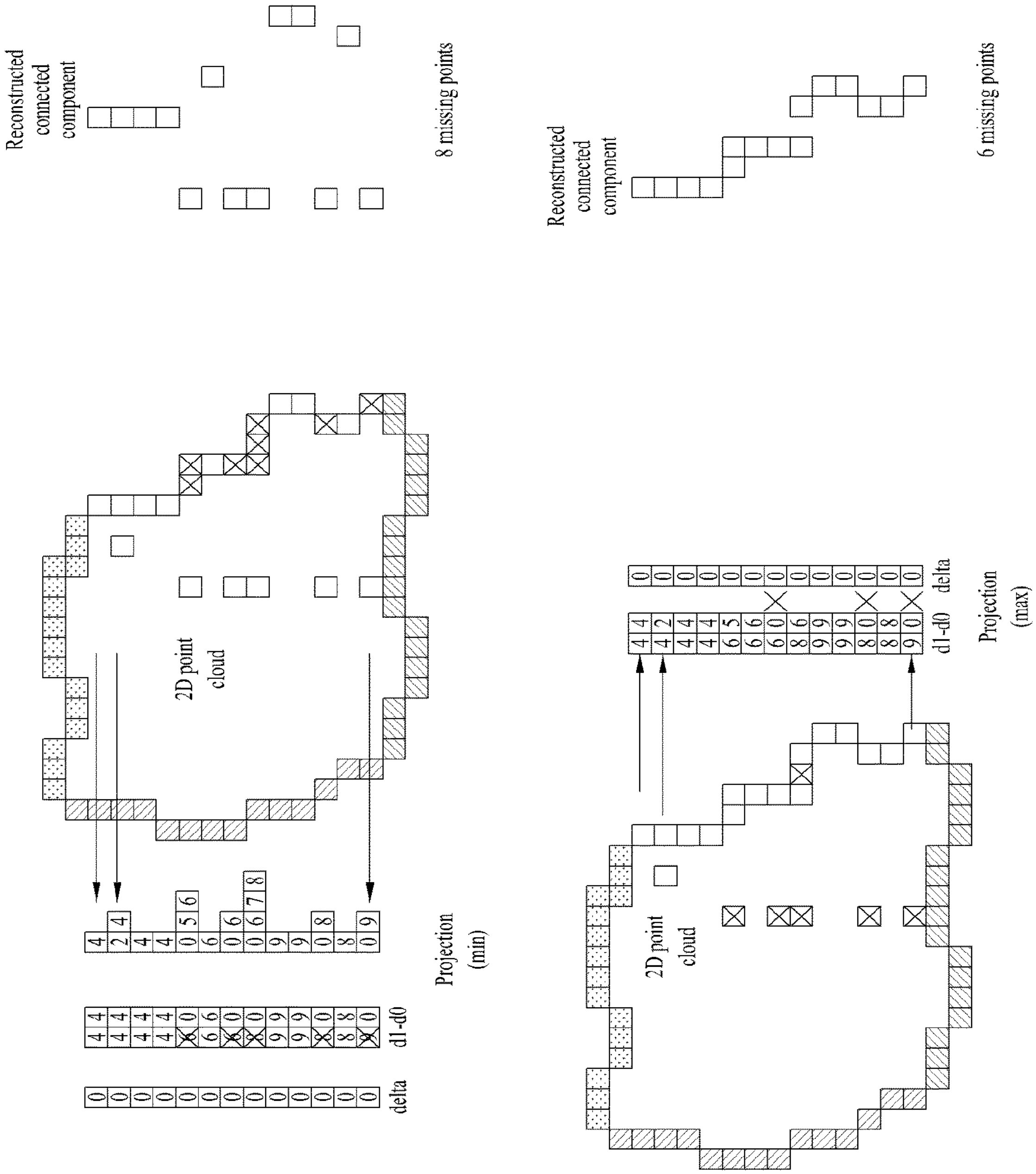
FIG. 9 shows an exemplary configuration of the minimum mode and maximum mode of a projection mode according to embodiments.

FIG. 9 shows an exemplary configuration of the minimum mode and maximum mode of a projection mode according to embodiments.

The point cloud encoder 10002 according to embodiments may perform patch-based projection to generate a geometry image, and the projection mode according to the embodiments includes a minimum mode and a maximum mode.

3D spatial coordinates of a patch may be calculated based on the bounding box of the minimum size surrounding the patch. For example, the 3D spatial coordinates may include the minimum tangent value of the patch (on the patch 3d shift tangent axis) of the patch, the minimum bitangent value of the patch (on the patch 3d shift bitangent axis), and the minimum normal value of the patch (on the patch 3d shift normal axis).

2D size of a patch indicates the horizontal and vertical sizes of the patch when the patch is packed into a 2D image. The horizontal size (patch 2d size u) may be obtained as a difference between the maximum and minimum tangent values of the bounding box, and the vertical size (patch 2d size v) may be obtained as a difference between the maximum and minimum bitangent values of the bounding box.

2) Determine a projection mode of the patch. The projection mode may be either the min mode or the max mode. The geometry information about the patch is expressed with a depth value. When each point constituting the patch is projected in the normal direction of the patch, two layers of images, an image constructed with the maximum depth value and an image constructed with the minimum depth value, may be generated.

In the min mode, in generating the two layers of images d0 and d1, the minimum depth may be configured for d0, and the maximum depth within the surface thickness from the minimum depth may be configured for d1, as shown in the figure.

For example, when a point cloud is located in 2D as illustrated in the figure, there may be a plurality of patches including a plurality of points. As shown in the figure, it is indicated that points marked with the same style of shadow may belong to the same patch. The figure illustrates the process of projecting a patch of points marked with blanks.

When projecting points marked with blanks to the left/right, the depth may be incremented by 1 as 0, 1, 2, . . . , 6, 7, 8, 9 with respect to the left side, and the number for calculating the depths of the points may be marked on the right side.

The same projection mode may be applied to all point clouds or different projection modes may be applied to respective frames or patches according to user definition. When different projection modes are applied to the respective frames or patches, a projection mode that may enhance compression efficiency or minimize missed points may be adaptively selected.

3) Calculate the depth values of the individual points.

In the min mode, image d0 is constructed with depth0 which is a value obtained by subtracting the minimum normal value of the patch (on the patch 3d shift normal axis) calculated in operation 1) from the minimum normal value of the patch (on the patch 3d shift normal axis) for the minimum normal value of each point. If there is another depth value within the range between depth0 and the surface thickness at the same position, this value is set to depth1. Otherwise, the value of depth0 is assigned to depth1. Image d1 is constructed with the value of depth1.

For example, a minimum value may be calculated in determining the depth of points of image d0 (4 2 4 4 0 6 0 0 9 9 0 8 0). In determining the depth of points of image d1, a greater value among two or more points may be calculated. When only one point is present, the value thereof may be calculated (4 4 4 4 6 6 6 8 9 9 8 8 9). In the process of encoding and reconstructing the points of the patch, some points may be lost (For example, in the figure, eight points are lost).

In the max mode, image d0 is constructed with depth0, which is a value obtained by subtracting the minimum normal value of the patch (on the patch 3d shift normal axis) calculated in operation 1) from the minimum normal value of the patch (on the patch 3d shift normal axis) for the maximum normal value of each point. If there is another depth value within the range between depth0 and the surface thickness at the same position, this value is set to depth1. Otherwise, the value of depth0 is assigned to depth1 Image d1 is constructed with the value of depth1.

For example, a maximum value may be calculated in determining the depth of points of d0 (4 4 4 4 6 6 6 8 9 9 8 8 9). In addition, in determining the depth of points of d1, a lower value among two or more points may be calculated. When only one point is present, the value thereof may be calculated (4 2 4 4 5 6 0 6 9 9 0 8 0). In the process of encoding and reconstructing the points of the patch, some points may be lost (For example, in the figure, six points are lost).

The entire geometry image may be generated by placing the geometry images of the individual patches generated through the above-described processes onto the entire geometry image based on the patch position information determined in the patch packing process.

Layer d1 of the generated entire geometry image may be encoded using various methods. A first method (absolute d1 method) is to encode the depth values of the previously generated image d1. A second method (differential method) is to encode a difference between the depth values of previously generated image d1 and the depth values of image d0.

In the encoding method using the depth values of the two layers, d0 and d1 as described above, if there is another point between the two depths, the geometry information about the point is lost in the encoding process, and therefore an enhanced-delta-depth (EDD) code may be used for lossless coding.

Hereinafter, the EDD code will be described in detail with reference to FIG. 10.

Figure 10:
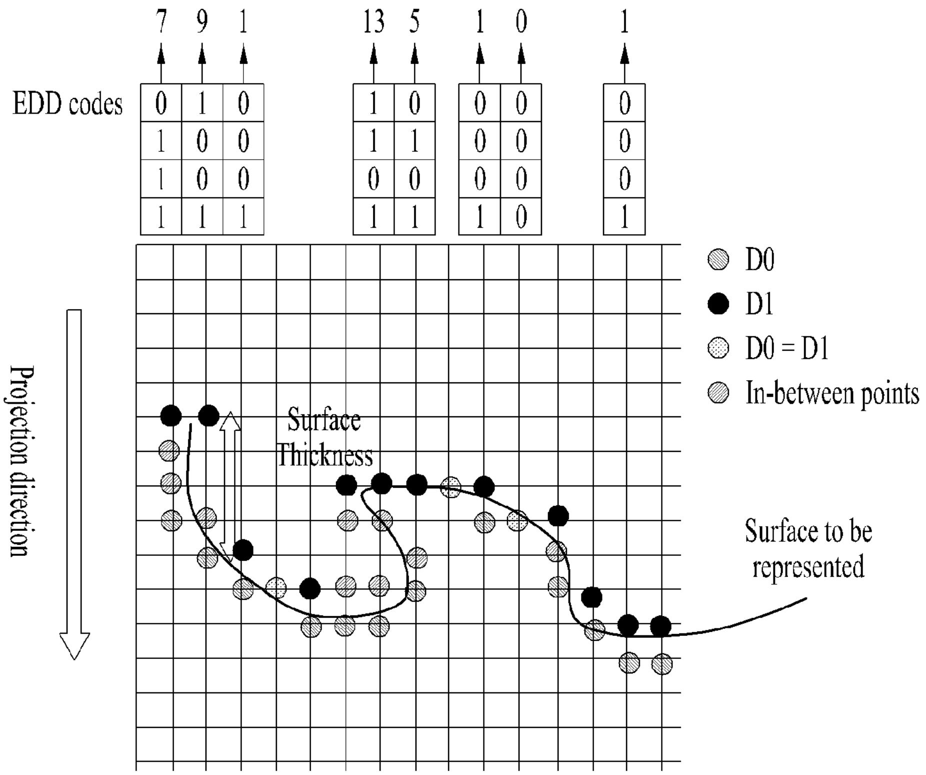
FIG. 10 illustrates an exemplary EDD code according to embodiments.

FIG. 10 illustrates an exemplary EDD code according to embodiments.

In some/all processes of the point cloud encoder 10002 and/or V-PCC encoding (e.g., video compression 40009), the geometry information about points may be encoded based on the EOD code.

As shown in the figure, the EDD code is used for binary encoding of the positions of all points within the range of surface thickness including d1. For example, in the figure, the points included in the second left column may be represented by an EDD code of 0b1001 (=9) because the points are present at the first and fourth positions over DO and the second and third positions are empty. When the EDD code is encoded together with DO and transmitted, a reception terminal may restore the geometry information about all points without loss.

For example, when there is a point present above a reference point, the value is 1. When there is no point, the value is 0. Thus, the code may be expressed based on 4 bits.

Smoothing (40004)

Smoothing is an operation for eliminating discontinuity that may occur on the patch boundary due to deterioration of the image quality occurring during the compression process. Smoothing may be performed by the point cloud encoder or smoother:

1) Reconstruct the point cloud from the geometry image. This operation may be the reverse of the geometry image generation described above. For example, the reverse process of encoding may be reconstructed;
2) Calculate neighboring points of each point constituting the reconstructed point cloud using the K-D tree or the like;
3) Determine whether each of the points is positioned on the patch boundary. For example, when there is a neighboring point having a different projection plane (cluster index) from the current point, it may be determined that the point is positioned on the patch boundary;
4) If there is a point present on the patch boundary, move the point to the center of mass of the neighboring points (positioned at the average x, y, z coordinates of the neighboring points). That is, change the geometry value. Otherwise, maintain the previous geometry value.

Figure 11:
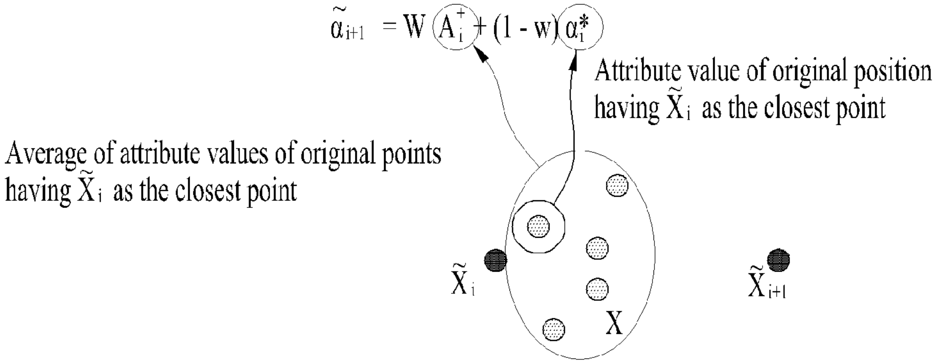
FIG. 11 illustrates an example of recoloring based on color values of neighboring points according to embodiments.

FIG. 11 illustrates an example of recoloring based on color values of neighboring points according to embodiments.

The point cloud encoder or the texture image generator 40003 according to the embodiments may generate a texture image based on recoloring.

Texture Image Generation (40003)

The texture image generation process, which is similar to the geometry image generation process described above, includes generating texture images of individual patches and generating an entire texture image by arranging the texture images at determined positions. However, in the operation of generating texture images of individual patches, an image with color values (e.g., R, G, and B values) of the points constituting a point cloud corresponding to a position is generated in place of the depth values for geometry generation.

In estimating a color value of each point constituting the point cloud, the geometry previously obtained through the smoothing process may be used. In the smoothed point cloud, the positions of some points may have been shifted from the original point cloud, and accordingly a recoloring process of finding colors suitable for the changed positions may be required. Recoloring may be performed using the color values of neighboring points. For example, as shown in the figure, a new color value may be calculated in consideration of the color value of the nearest neighboring point and the color values of the neighboring points.

For example, referring to the figure, in the recoloring, a suitable color value for a changed position may be calculated based on the average of the attribute information about the closest original points to a point and/or the average of the attribute information about the closest original positions to the point.

Texture images may also be generated in two layers of t0 and t1, like the geometry images, which are generated in two layers of d0 and d1.

Auxiliary Patch Info Compression (40005)

The point cloud encoder or the auxiliary patch info compressor according to the embodiments may compress the auxiliary patch information (auxiliary information about the point cloud).

The auxiliary patch info compressor compresses the auxiliary patch information generated in the patch generation, patch packing, and geometry generation processes described above. The auxiliary patch information may include the following parameters:

- Index (cluster index) for identifying the projection plane (normal plane);
- 3D spatial position of a patch, i.e., the minimum tangent value of the patch (on the patch 3d shift tangent axis), the minimum bitangent value of the patch (on the patch 3d shift bitangent axis), and the minimum normal value of the patch (on the patch 3d shift normal axis);
- 2D spatial position and size of the patch, i.e., the horizontal size (patch 2d size u), the vertical size (patch 2d size v), the minimum horizontal value (patch 2d shift u), and the minimum vertical value (patch 2d shift u); and
- Mapping information about each block and patch, i.e., a candidate index (when patches are disposed in order based on the 2D spatial position and size information about the patches, multiple patches may be mapped to one block in an overlapping manner In this case, the mapped patches constitute a candidate list, and the candidate index indicates the position in sequential order of a patch whose data is present in the block), and a local patch index (which is an index indicating one of the patches present in the frame). Table X shows a pseudo code representing the process of matching between blocks and patches based on the candidate list and the local patch indexes.

The maximum number of candidate lists may be defined by a user.

TABLE 1

```
for( i = 0; i < BlockCount; i++ ) {
if( candidatePatches[ i ].size( ) = = 1 ) {
blockToPatch[ i ] = candidatePatches[ i ][ 0 ]
} else {
candidate_index
if( candidate_index = = max_candidate_count ) {
blockToPatch[ i ] = local_patch_index
```

TABLE 1-continued

```
} else {
blockToPatch[ i ] = candidatePatches[ i ][ candidate_index ]
}
}
}
```

Figure 12:
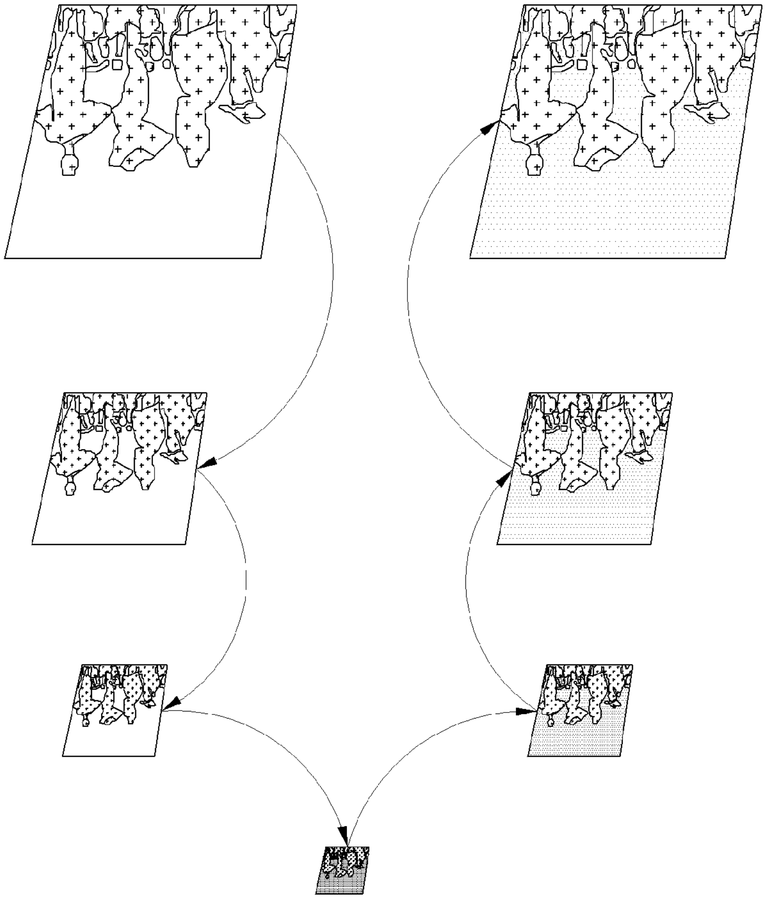
FIG. 12 illustrates an example of push-pull background filling according to embodiments.

FIG. 12 illustrates push-pull background filling according to embodiments.

Image Padding and Group Dilation (40006, 40007, 40008)

The image padder according to the embodiments may fill the space except the patch area with meaningless supplemental data based on the push-pull background filling technique.

Image padding is a process of filling the space other than the patch region with meaningless data to improve compression efficiency. For image padding, pixel values in columns or rows close to a boundary in the patch may be copied to fill the empty space. Alternatively, as shown in the figure, a push-pull background filling method may be used. According to this method, the empty space is filled with pixel values from a low resolution image in the process of gradually reducing the resolution of a non-padded image and increasing the resolution again.

Group dilation is a process of filling the empty spaces of a geometry image and a texture image configured in two layers, d0/d1 and t0/t1, respectively. In this process, the empty spaces of the two layers calculated through image padding are filled with the average of the values for the same position.

Figure 13:
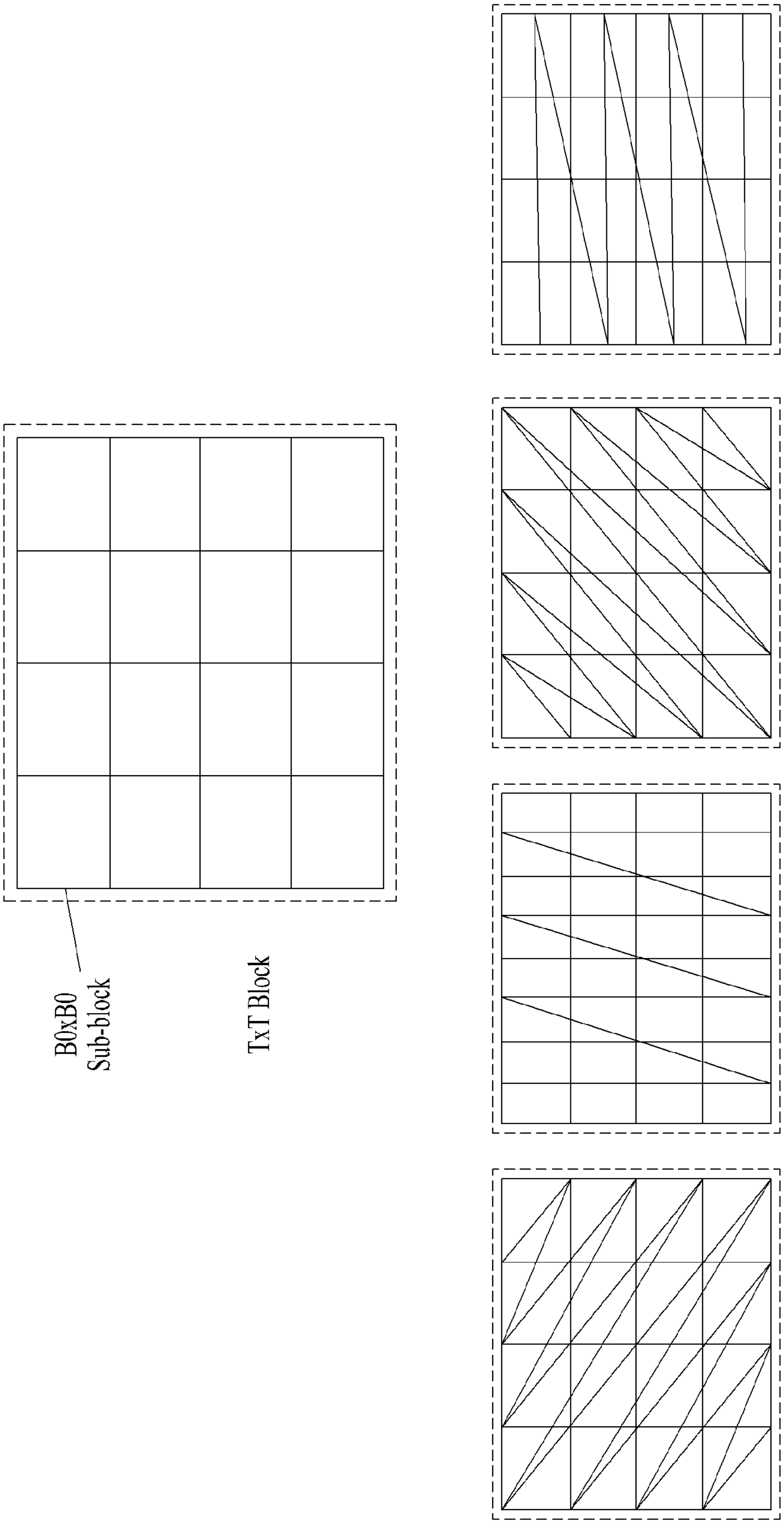
FIG. 13 shows an exemplary possible traversal order for a 4*4 block according to embodiments.

FIG. 13 shows an exemplary possible traversal order for a 4*4 block according to embodiments.

Occupancy Map Compression (40012, 40011)

The occupancy map compressor according to the embodiments may compress the previously generated occupancy map. Specifically, two methods, namely video compression for lossy compression and entropy compression for lossless compression, may be used. Video compression is described below.

The entropy compression may be performed through the following operations.

1) If a block constituting an occupancy map is fully occupied, encode 1 and repeat the same operation for the next block of the occupancy map. Otherwise, encode 0 and perform operations 2) to 5).

2) Determine the best traversal order to perform run-length coding on the occupied pixels of the block. The figure shows four possible traversal orders for a 4*4 block.

Figure 14:
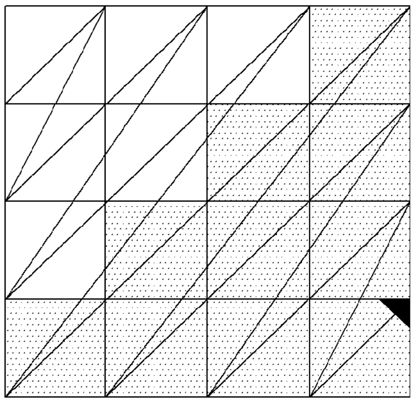
FIG. 14 illustrates an exemplary best traversal order according to embodiments.

FIG. 14 illustrates an exemplary best traversal order according to embodiments.

As described above, the entropy compressor according to the embodiments may code (encode) a block based on the traversal order scheme as described above.

For example, the best traversal order with the minimum number of runs is selected from among the possible traversal orders and the index thereof is encoded. The figure illustrates a case where the third traversal order in FIG. 13 is selected. In the illustrated case, the number of runs may be minimized to 2, and therefore the third traversal order may be selected as the best traversal order.

3) Encode the number of runs. In the example of FIG. 14, there are two runs, and therefore 2 is encoded.

4) Encode the occupancy of the first run. In the example of FIG. 14, 0 is encoded because the first run corresponds to unoccupied pixels.

5) Encode lengths of the individual runs (as many as the number of runs). In the example of FIG. 14, the lengths of the first run and the second run, 6 and 10, are sequentially encoded.

Video Compression (40009, 40010, 40011)

The video compressor according to the embodiments encodes a sequence of a geometry image, a texture image, an occupancy map image, and the like generated in the above-described operations, using a 2D video codec such as HEVC or VVC.

Figure 15:
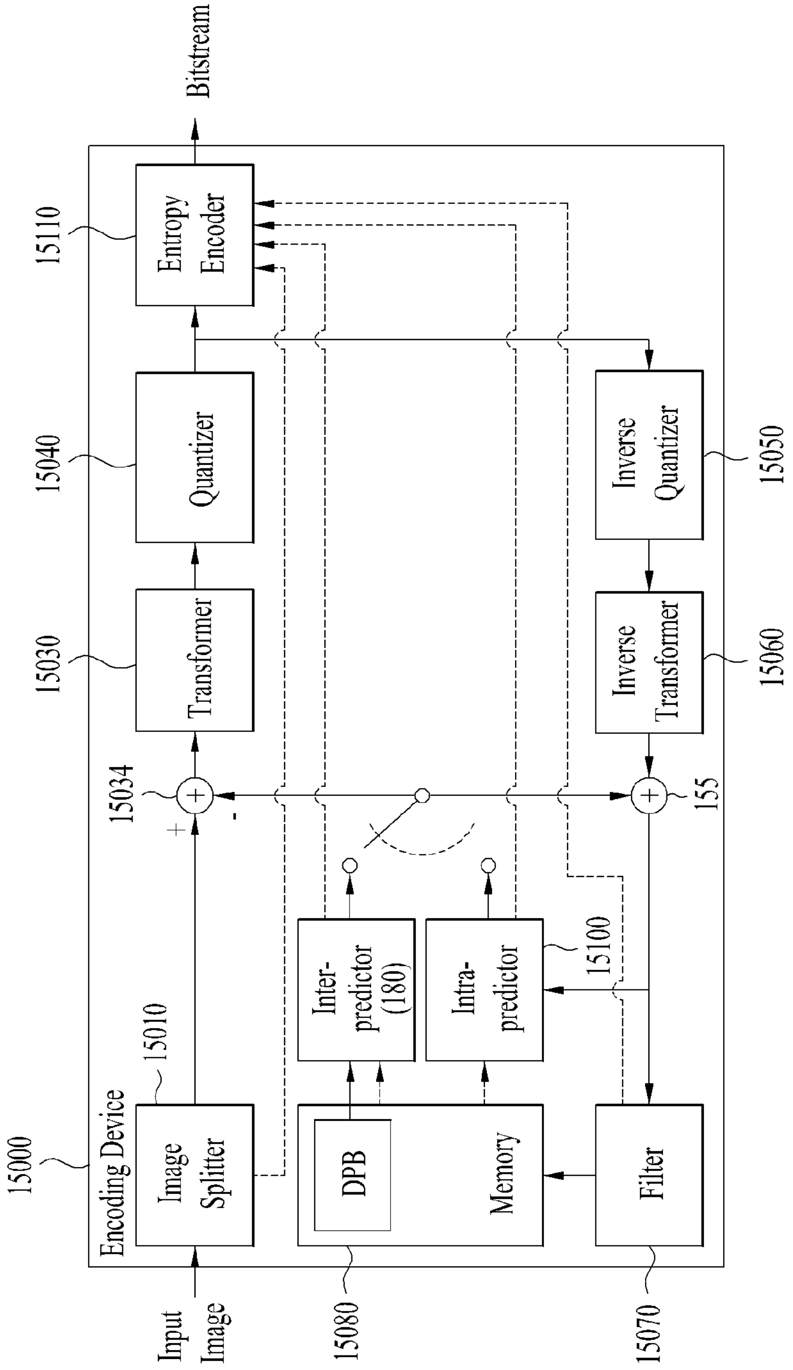
FIG. 15 illustrates an exemplary 2D video/image encoder according to embodiments.

FIG. 15 illustrates an exemplary 2D video/image encoder according to embodiments.

The figure, which represents an embodiment to which the video compression or video compressor 40009, 40010, and 40011 described above is applied, is a schematic block diagram of a 2D video/image encoder 15000 configured to encode a video/image signal. The 2D video/image encoder 15000 may be included in the point cloud video encoder described above or may be configured as an internal/external component. Each component of FIG. 15 may correspond to software, hardware, processor and/or a combination thereof.

Here, the input image may include the geometry image, the texture image (attribute(s) image), and the occupancy map image described above. The output bitstream (i.e., the point cloud video/image bitstream) of the point cloud video encoder may include output bitstreams for the respective input images (i.e., the geometry image, the texture image (attribute(s) image), the occupancy map image, etc.).

An inter-predictor 15090 and an intra-predictor 15100 may be collectively called a predictor. That is, the predictor may include the inter-predictor 15090 and the intra-predictor 15100. A transformer 15030, a quantizer 15040, an inverse quantizer 15050, and an inverse transformer 15060 may be included in the residual processor. The residual processor may further include a subtractor 15020. According to an embodiment, the image splitter 15010, the subtractor 15020, the transformer 15030, the quantizer 15040, the inverse quantizer 15050, the inverse transformer 15060, the adder 155, the filter 15070, the inter-predictor 15090, the intra-predictor 15100, and the entropy encoder 15110 described above may be configured by one hardware component (e.g., an encoder or a processor). In addition, the memory 15080 may include a decoded picture buffer (DPB) and may be configured by a digital storage medium.

The image splitter 15010 may spit an image (or a picture or a frame) input to the encoder 15000 into one or more processing units. For example, the processing unit may be called a coding unit (CU). In this case, the CU may be recursively split from a coding tree unit (CTU) or a largest coding unit (LCU) according to a quad-tree binary-tree (QTBT) structure. For example, one CU may be split into a plurality of CUs of a lower depth based on a quad-tree structure and/or a binary-tree structure. In this case, for example, the quad-tree structure may be applied first and the binary-tree structure may be applied later. Alternatively, the binary-tree structure may be applied first. The coding procedure according to the present disclosure may be performed based on a final CU that is not split anymore. In this case, the LCU may be used as the final CU based on coding efficiency according to characteristics of the image. When necessary, a CU may be recursively split into CUs of a lower depth, and a CU of the optimum size may be used as the final CU. Here, the coding procedure may include prediction, transformation, and reconstruction, which will be described later. As another example, the processing unit may further include a prediction unit (PU) or a transform unit (TU). In this case, the PU and the TU may be split or partitioned from the aforementioned final CU. The PU may be a unit of sample prediction, and the TU may be a unit for deriving a transform coefficient and/or a unit for deriving a residual signal from the transform coefficient.

The term "unit" may be used interchangeably with terms such as block or area. In a general case, an M×N block may represent a set of samples or transform coefficients configured in M columns and N rows. A sample may generally represent a pixel or a value of a pixel, and may indicate only a pixel/pixel value of a luma component, or only a pixel/pixel value of a chroma component. "Sample" may be used as a term corresponding to a pixel or a pel in one picture (or image).

The encoder 15000 may generate a residual signal (residual block or residual sample array) by subtracting a prediction signal (predicted block or predicted sample array) output from the inter-predictor 15090 or the intra-predictor 15100 from an input image signal (original block or original sample array), and the generated residual signal is transmitted to the transformer 15030. In this case, as shown in the figure, the unit that subtracts the prediction signal (predicted block or predicted sample array) from the input image signal (original block or original sample array) in the encoder 15000 may be called a subtractor 15020. The predictor may perform prediction for a processing target block (hereinafter referred to as a current block) and generate a predicted block including prediction samples for the current block. The predictor may determine whether intra-prediction or inter-prediction is applied on a current block or CU basis. As will be described later in the description of each prediction mode, the predictor may generate various kinds of information about prediction, such as prediction mode information, and deliver the generated information to the entropy encoder 15110. The information about the prediction may be encoded and output in the form of a bitstream by the entropy encoder 15110.

The intra-predictor 15100 may predict the current block with reference to the samples in the current picture. The samples may be positioned in the neighbor of or away from the current block depending on the prediction mode. In intra-prediction, the prediction modes may include a plurality of non-directional modes and a plurality of directional modes. The non-directional modes may include, for example, a DC mode and a planar mode. The directional modes may include, for example, 33 directional prediction modes or 65 directional prediction modes according to fineness of the prediction directions. However, this is merely an example, and more or fewer directional prediction modes may be used depending on the setting. The intra-predictor 15100 may determine a prediction mode to be applied to the current block, based on the prediction mode applied to the neighboring block.

The inter-predictor 15090 may derive a predicted block for the current block based on a reference block (reference sample array) specified by a motion vector on the reference picture. In this case, in order to reduce the amount of motion information transmitted in the inter-prediction mode, the motion information may be predicted on a per block, sub-block, or sample basis based on the correlation in motion information between the neighboring blocks and the current block. The motion information may include a motion vector and a reference picture index. The motion information may further include information about an inter-prediction direction (L0 prediction, L1 prediction, Bi prediction, etc.). In the case of inter-prediction, the neighboring blocks may include a spatial neighboring block, which is present in the current picture, and a temporal neighboring block, which is present in the reference picture. The reference picture including the reference block may be the same as or different from the reference picture including the temporal neighboring block. The temporal neighboring block may be referred to as a collocated reference block or a collocated CU (colCU), and the reference picture including the temporal neighboring block may be referred to as a collocated picture (colPic). For example, the inter-predictor 15090 may configure a motion information candidate list based on the neighboring blocks and generate information indicating a candidate to be used to derive a motion vector and/or a reference picture index of the current block. Inter-prediction may be performed based on various prediction modes. For example, in a skip mode and a merge mode, the inter-predictor 15090 may use motion information about a neighboring block as motion information about the current block. In the skip mode, unlike the merge mode, the residual signal may not be transmitted. In a motion vector prediction (MVP) mode, the motion vector of a neighboring block may be used as a motion vector predictor and the motion vector difference may be signaled to indicate the motion vector of the current block.

The prediction signal generated by the inter-predictor 15090 or the intra-predictor 15100 may be used to generate a reconstruction signal or to generate a residual signal.

The transformer 15030 may generate transform coefficients by applying a transformation technique to the residual signal. For example, the transformation technique may include at least one of discrete cosine transform (DCT), discrete sine transform (DST), Karhunen-Loeve transform (KLT), graph-based transform (GBT), or conditionally non-linear transform (CNT). Here, the GBT refers to transformation obtained from a graph depicting the relationship between pixels. The CNT refers to transformation obtained based on a prediction signal generated based on all previously reconstructed pixels. In addition, the transformation operation may be applied to pixel blocks having the same size of a square, or may be applied to blocks of a variable size other than the square.

The quantizer 15040 may quantize the transform coefficients and transmit the same to the entropy encoder 15110. The entropy encoder 15110 may encode the quantized signal (information about the quantized transform coefficients) and output a bitstream of the encoded signal. The information about the quantized transform coefficients may be referred to as residual information. The quantizer 15040 may rearrange the quantized transform coefficients, which are in a block form, in the form of a one-dimensional vector based on a coefficient scan order, and generate information about the quantized transform coefficients based on the quantized transform coefficients in the form of the one-dimensional vector. The entropy encoder 15110 may employ various encoding techniques such as, for example, exponential Golomb, context-adaptive variable length coding (CAVLC), and context-adaptive binary arithmetic coding (CABAC). The entropy encoder 15110 may encode information necessary for video/image reconstruction (e.g., values of syntax elements) together with or separately from the quantized transform coefficients. The encoded information (e.g., encoded video/image information) may be transmitted or stored in the form of a bitstream on a network abstraction layer (NAL) unit basis. The bitstream may be transmitted over a network or may be stored in a digital storage medium. Here, the network may include a broadcast network and/or a communication network, and the digital storage medium may include various storage media such as USB, SD, CD, DVD, Blu-ray, HDD, and SSD. A transmitter (not shown) to transmit the signal output from the entropy encoder 15110 and/or a storage (not shown) to store the signal may be configured as internal/external elements of the encoder 15000. Alternatively, the transmitter may be included in the entropy encoder 15110.

The quantized transform coefficients output from the quantizer 15040 may be used to generate a prediction signal. For example, inverse quantization and inverse transform may be applied to the quantized transform coefficients through the inverse quantizer 15050 and the inverse transformer 15060 to reconstruct the residual signal (residual block or residual samples). The adder 155 may add the reconstructed residual signal to the prediction signal output from the inter-predictor 15090 or the intra-predictor 15100. Thereby, a reconstructed signal (reconstructed picture, reconstructed block, reconstructed sample array) may be generated. When there is no residual signal for a processing target block as in the case where the skip mode is applied, the predicted block may be used as the reconstructed block. The adder 155 may be called a reconstructor or a reconstructed block generator. The generated reconstructed signal may be used for intra-prediction of the next processing target block in the current picture, or may be used for inter-prediction of the next picture through filtering as described below.

The filter 15070 may improve subjective/objective image quality by applying filtering to the reconstructed signal. For example, the filter 15070 may generate a modified reconstructed picture by applying various filtering techniques to the reconstructed picture, and the modified reconstructed picture may be stored in the memory 15080, specifically, the DPB of the memory 15080. The various filtering techniques may include, for example, deblocking filtering, sample adaptive offset, adaptive loop filtering, and bilateral filtering. As described below in the description of the filtering techniques, the filter 15070 may generate various kinds of information about filtering and deliver the generated information to the entropy encoder 15110. The information about filtering may be encoded and output in the form of a bitstream by the entropy encoder 15110.

The modified reconstructed picture transmitted to the memory 15080 may be used as a reference picture by the inter-predictor 15090. Thus, when inter-prediction is applied, the encoder may avoid prediction mismatch between the encoder 15000 and the decoder and improve encoding efficiency.

The DPB of the memory 15080 may store the modified reconstructed picture so as to be used as a reference picture by the inter-predictor 15090. The memory 15080 may store the motion information about a block from which the motion information in the current picture is derived (or encoded) and/or the motion information about the blocks in a picture that has already been reconstructed. The stored motion information may be delivered to the inter-predictor 15090 so as to be used as motion information about a spatial neighboring block or motion information about a temporal neighboring block. The memory 15080 may store the reconstructed samples of the reconstructed blocks in the current picture and deliver the reconstructed samples to the intra-predictor 15100.

At least one of the prediction, transform, and quantization procedures described above may be skipped. For example, for a block to which the pulse coding mode (PCM) is applied, the prediction, transform, and quantization procedures may be skipped, and the value of the original sample may be encoded and output in the form of a bitstream.

Figure 16:
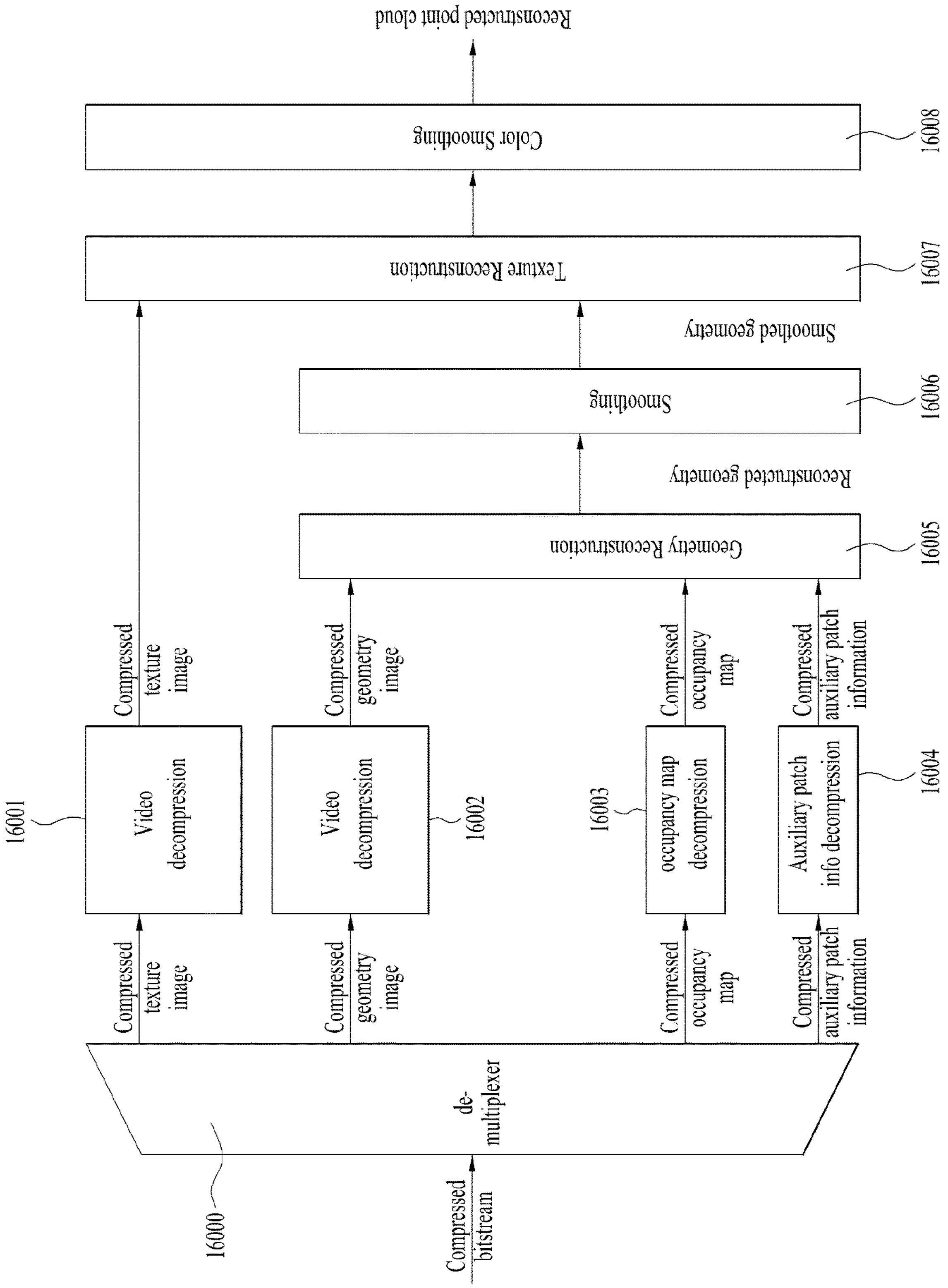
FIG. 16 illustrates an exemplary V-PCC decoding process according to embodiments.

FIG. 16 illustrates an exemplary V-PCC decoding process according to embodiments.

The V-PCC decoding process or V-PCC decoder may follow the reverse process of the V-PCC encoding process (or encoder) of FIG. 4. Each component in FIG. 16 may correspond to software, hardware, a processor, and/or a combination thereof.

The demultiplexer 16000 demultiplexes the compressed bitstream to output a compressed texture image, a compressed geometry image, a compressed occupancy map, and compressed auxiliary patch information.

The video decompression or video decompressor 16001, 16002 decompresses (or decodes) each of the compressed texture image and the compressed geometry image.

The occupancy map decompression or occupancy map decompressor 16003 decompresses the compressed occupancy map.

The auxiliary patch info decompression or auxiliary patch info decompressor 16004 decompresses auxiliary patch information.

The geometry reconstruction or geometry reconstructor 16005 restores (reconstructs) the geometry information based on the decompressed geometry image, the decompressed occupancy map, and/or the decompressed auxiliary patch information. For example, the geometry changed in the encoding process may be reconstructed.

The smoothing or smoother 16006 may apply smoothing to the reconstructed geometry. For example, smoothing filtering may be applied.

The texture reconstruction or texture reconstructor 16007 reconstructs the texture from the decompressed texture image and/or the smoothed geometry.

The color smoothing or color smoother 16008 smoothes color values from the reconstructed texture. For example, smoothing filtering may be applied.

As a result, reconstructed point cloud data may be generated.

The figure illustrates a decoding process of the V-PCC for reconstructing a point cloud by decoding the compressed occupancy map, geometry image, texture image, and auxiliary path information. Each process according to the embodiments is operated as follows.

Video Decompression (1600, 16002)

Video decompression is a reverse process of the video compression described above. In video decompression, a 2D video codec such as HEVC or VVC is used to decode a compressed bitstream containing the geometry image, texture image, and occupancy map image generated in the above-described process.

Figure 17:
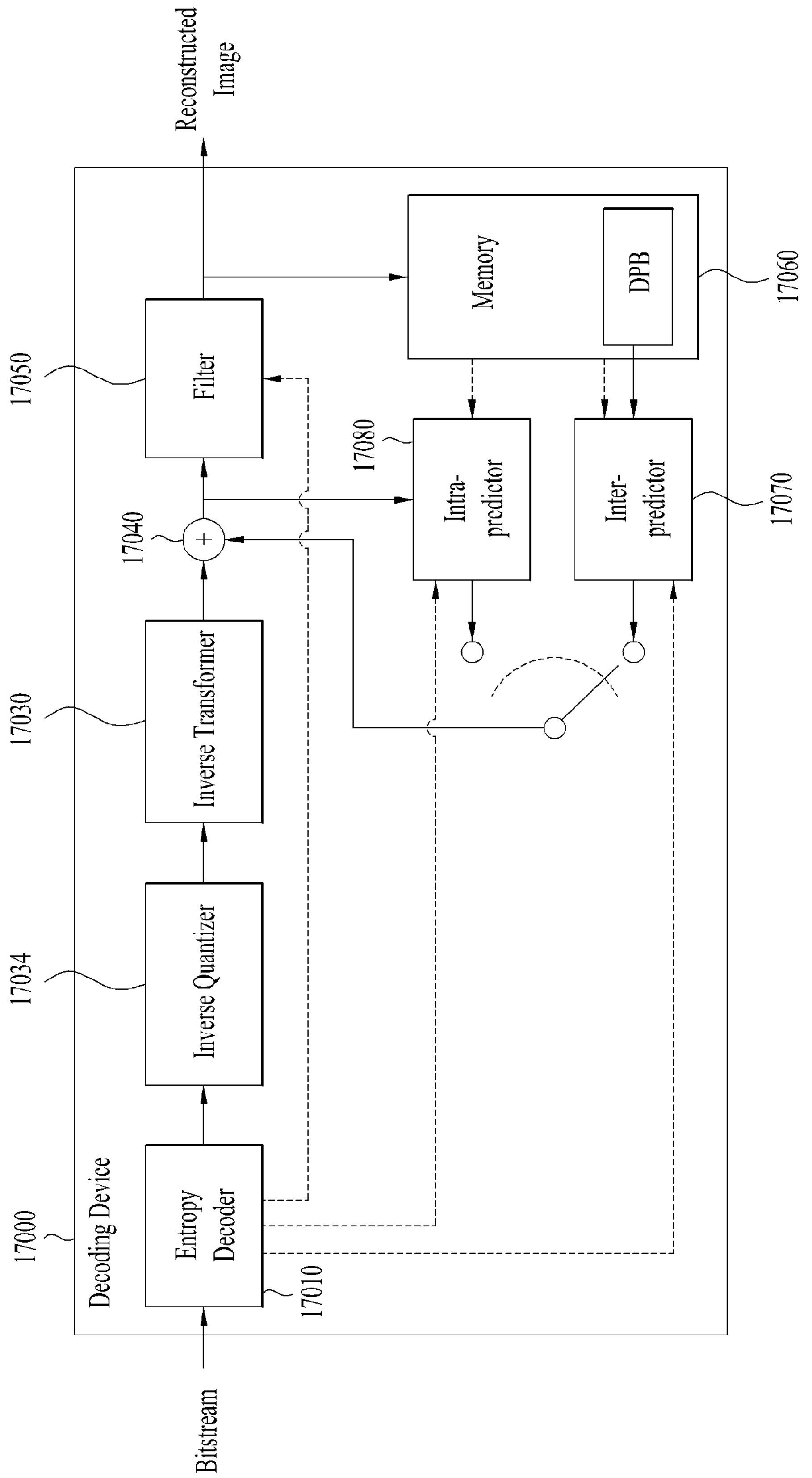
FIG. 17 shows an exemplary 2D video/image decoder according to embodiments.

FIG. 17 illustrates an exemplary 2D video/image decoder according to embodiments.

The 2D video/image decoder may follow the reverse process of the 2D video/image encoder of FIG. 15.

The 2D video/image decoder of FIG. 17 is an embodiment of the video decompression or video decompressor of FIG. 16. FIG. 17 is a schematic block diagram of a 2D video/image decoder 17000 by which decoding of a video/image signal is performed. The 2D video/image decoder 17000 may be included in the point cloud video decoder of FIG. 1, or may be configured as an internal/external component. Each component in FIG. 17 may correspond to software, hardware, a processor, and/or a combination thereof.

Here, the input bitstream may include bitstreams for the geometry image, texture image (attribute(s) image), and occupancy map image described above. The reconstructed image (or the output image or the decoded image) may represent a reconstructed image for the geometry image, texture image (attribute(s) image), and occupancy map image described above.

Referring to the figure, an inter-predictor 17070 and an intra-predictor 17080 may be collectively referred to as a predictor. That is, the predictor may include the inter-predictor 17070 and the intra-predictor 17080. An inverse quantizer 17020 and an inverse transformer 17030 may be collectively referred to as a residual processor. That is, the residual processor may include the inverse quantizer 17020 and the inverse transformer 17030. The entropy decoder 17010, the inverse quantizer 17020, the inverse transformer 17030, the adder 17040, the filter 17050, the inter-predictor 17070, and the intra-predictor 17080 described above may be configured by one hardware component (e.g., a decoder or a processor) according to an embodiment. In addition, the memory 170 may include a decoded picture buffer (DPB) or may be configured by a digital storage medium.

When a bitstream containing video/image information is input, the decoder 17000 may reconstruct an image in a process corresponding to the process in which the video/image information is processed by the encoder of FIG. 1. For example, the decoder 17000 may perform decoding using a processing unit applied in the encoder. Thus, the processing unit of decoding may be, for example, a CU. The CU may be split from a CTU or an LCU along a quad-tree structure and/or a binary-tree structure. Then, the reconstructed video signal decoded and output through the decoder 17000 may be played through a player.

The decoder 17000 may receive a signal output from the encoder in the form of a bitstream, and the received signal may be decoded through the entropy decoder 17010. For example, the entropy decoder 17010 may parse the bitstream to derive information (e.g., video/image information) necessary for image reconstruction (or picture reconstruction). For example, the entropy decoder 17010 may decode the information in the bitstream based on a coding technique such as exponential Golomb coding, CAVLC, or CABAC, output values of syntax elements required for image reconstruction, and quantized values of transform coefficients for the residual. More specifically, in the CABAC entropy decoding, a bin corresponding to each syntax element in the bitstream may be received, and a context model may be determined based on decoding target syntax element information and decoding information about neighboring and decoding target blocks or information about a symbol/bin decoded in a previous step. Then, the probability of occurrence of a bin may be predicted according to the determined context model, and arithmetic decoding of the bin may be performed to generate a symbol corresponding to the value of each syntax element. According to the CABAC entropy decoding, after a context model is determined, the context model may be updated based on the information about the symbol/bin decoded for the context model of the next symbol/bin. Information about the prediction in the information decoded by the entropy decoder 17010 may be provided to the predictors (the inter-predictor 17070 and the intra-predictor 17080), and the residual values on which entropy decoding has been performed by the entropy decoder 17010, that is, the quantized transform coefficients and related parameter information, may be input to the inverse quantizer 17020. In addition, information about filtering of the information decoded by the entropy decoder 17010 may be provided to the filter 17050. A receiver (not shown) configured to receive a signal output from the encoder may be further configured as an internal/external element of the decoder 17000. Alternatively, the receiver may be a component of the entropy decoder 17010.

The inverse quantizer 17020 may output transform coefficients by inversely quantizing the quantized transform coefficients. The inverse quantizer 17020 may rearrange the quantized transform coefficients in the form of a two-dimensional block. In this case, the rearrangement may be performed based on the coefficient scan order implemented by the encoder. The inverse quantizer 17020 may perform inverse quantization on the quantized transform coefficients using a quantization parameter (e.g., quantization step size information), and acquire transform coefficients.

The inverse transformer 17030 acquires a residual signal (residual block and residual sample array) by inversely transforming the transform coefficients.

The predictor may perform prediction on the current block and generate a predicted block including prediction samples for the current block. The predictor may determine whether intra-prediction or inter-prediction is to be applied to the current block based on the information about the prediction output from the entropy decoder 17010, and may determine a specific intra-/inter-prediction mode.

The intra-predictor 265 may predict the current block with reference to the samples in the current picture. The samples may be positioned in the neighbor of or away from the current block depending on the prediction mode. In intra-prediction, the prediction modes may include a plurality of non-directional modes and a plurality of directional modes. The intra-predictor 17080 may determine a prediction mode to be applied to the current block, using the prediction mode applied to the neighboring block.

The inter-predictor 17070 may derive a predicted block for the current block based on a reference block (reference sample array) specified by a motion vector on the reference picture. In this case, in order to reduce the amount of motion information transmitted in the inter-prediction mode, the motion information may be predicted on a per block, sub-block, or sample basis based on the correlation in motion information between the neighboring blocks and the current block. The motion information may include a motion vector and a reference picture index. The motion information may further include information about an inter-prediction direction (L0 prediction, L1 prediction, Bi prediction, etc.). In the case of inter-prediction, the neighboring blocks may include a spatial neighboring block, which is present in the current picture, and a temporal neighboring block, which is present in the reference picture. For example, the inter-predictor 17070 may configure a motion information candidate list based on neighboring blocks and derive a motion vector of the current block and/or a reference picture index based on the received candidate selection information. Inter-prediction may be performed based on various prediction modes. The information about the prediction may include information indicating an inter-prediction mode for the current block.

The adder 17040 may add the acquired residual signal to the prediction signal (predicted block or prediction sample array) output from the inter-predictor 17070 or the intra-predictor 17080, thereby generating a reconstructed signal (a reconstructed picture, a reconstructed block, or a reconstructed sample array). When there is no residual signal for a processing target block as in the case where the skip mode is applied, the predicted block may be used as the reconstructed block.

The adder 17040 may be called a reconstructor or a reconstructed block generator. The generated reconstructed signal may be used for intra-prediction of the next processing target block in the current picture, or may be used for inter-prediction of the next picture through filtering as described below.

The filter 17050 may improve subjective/objective image quality by applying filtering to the reconstructed signal. For example, the filter 17050 may generate a modified reconstructed picture by applying various filtering techniques to the reconstructed picture, and may transmit the modified reconstructed picture to the memory 250, specifically, the DPB of the memory 17060. The various filtering techniques may include, for example, deblocking filtering, sample adaptive offset, adaptive loop filtering, and bilateral filtering.

The reconstructed picture stored in the DPB of the memory 17060 may be used as a reference picture in the inter-predictor 17070. The memory 17060 may store the motion information about a block from which the motion information is derived (or decoded) in the current picture and/or the motion information about the blocks in a picture that has already been reconstructed. The stored motion information may be delivered to the inter-predictor 17070 so as to be used as the motion information about a spatial neighboring block or the motion information about a temporal neighboring block. The memory 17060 may store the reconstructed samples of the reconstructed blocks in the current picture, and deliver the reconstructed samples to the intra-predictor 17080.

In the present disclosure, the embodiments described regarding the filter 160, the inter-predictor 180, and the intra-predictor 185 of the encoding device 100 may be applied to the filter 17050, the inter-predictor 17070 and the intra-predictor 17080 of the decoder 17000, respectively, in the same or corresponding manner.

At least one of the prediction, transform, and quantization procedures described above may be skipped. For example, for a block to which the pulse coding mode (PCM) is applied, the prediction, transform, and quantization procedures may be skipped, and the value of a decoded sample may be used as a sample of the reconstructed image.

Occupancy Map Decompression (16003)

This is a reverse process of the occupancy map compression described above. Occupancy map decompression is a process for reconstructing the occupancy map by decompressing the occupancy map bitstream.

Auxiliary Patch Info Decompression (16004)

The auxiliary patch information may be reconstructed by performing the reverse process of the aforementioned auxiliary patch info compression and decoding the compressed auxiliary patch info bitstream.

Geometry Reconstruction (16005)

This is a reverse process of the geometry image generation described above. Initially, a patch is extracted from the geometry image using the reconstructed occupancy map, the 2D position/size information about the patch included in the auxiliary patch info, and the information about mapping between a block and the patch. Then, a point cloud is reconstructed in a 3D space based on the geometry image of the extracted patch and the 3D position information about the patch included in the auxiliary patch info. When the geometry value corresponding to a point (u, v) within the patch is g(u, v), and the coordinates of the position of the patch on the normal, tangent and bitangent axes of the 3D space are (δ0, s0, r0), • δ(u, v), s(u, v), and r(u, v), which are the normal, tangent, and bitangent coordinates in the 3D space of a position mapped to point (u, v) may be expressed as follows:

$$\delta(u,v)=\delta 0+g(u,v);$$

$$s(u,v)=s0+u;$$

$$r(u,v)=r0+v.$$

Smoothing (16006)

Smoothing, which is the same as the smoothing in the encoding process described above, is a process for eliminating discontinuity that may occur on the patch boundary due to deterioration of the image quality occurring during the compression process.

Texture Reconstruction (16007)

Texture reconstruction is a process of reconstructing a color point cloud by assigning color values to each point constituting a smoothed point cloud. It may be performed by assigning color values corresponding to a texture image pixel at the same position as in the geometry image in the 2D space to points of a point of a point cloud corresponding to the same position in the 3D space, based on the mapping information about the geometry image and the point cloud in the geometry reconstruction process described above.

Color Smoothing (16008)

Color smoothing is similar to the process of geometry smoothing described above. Color smoothing is a process for eliminating discontinuity that may occur on the patch boundary due to deterioration of the image quality occurring during the compression process. Color smoothing may be performed through the following operations:

1) Calculate neighboring points of each point constituting the reconstructed point cloud using the K-D tree or the like. The neighboring point information calculated in the geometry smoothing process described in section 2.5 may be used.
2) Determine whether each of the points is positioned on the patch boundary. These operations may be performed based on the boundary information calculated in the geometry smoothing process described above.
3) Check the distribution of color values for the neighboring points of the points present on the boundary and determine whether smoothing is to be performed. For example, when the entropy of luminance values is less than or equal to a threshold local entry (there are many similar luminance values), it may be determined that the corresponding portion is not an edge portion, and smoothing may be performed. As a method of smoothing, the color value of the point may be replaced with the average of the color values of the neighboring points.

Figure 18:
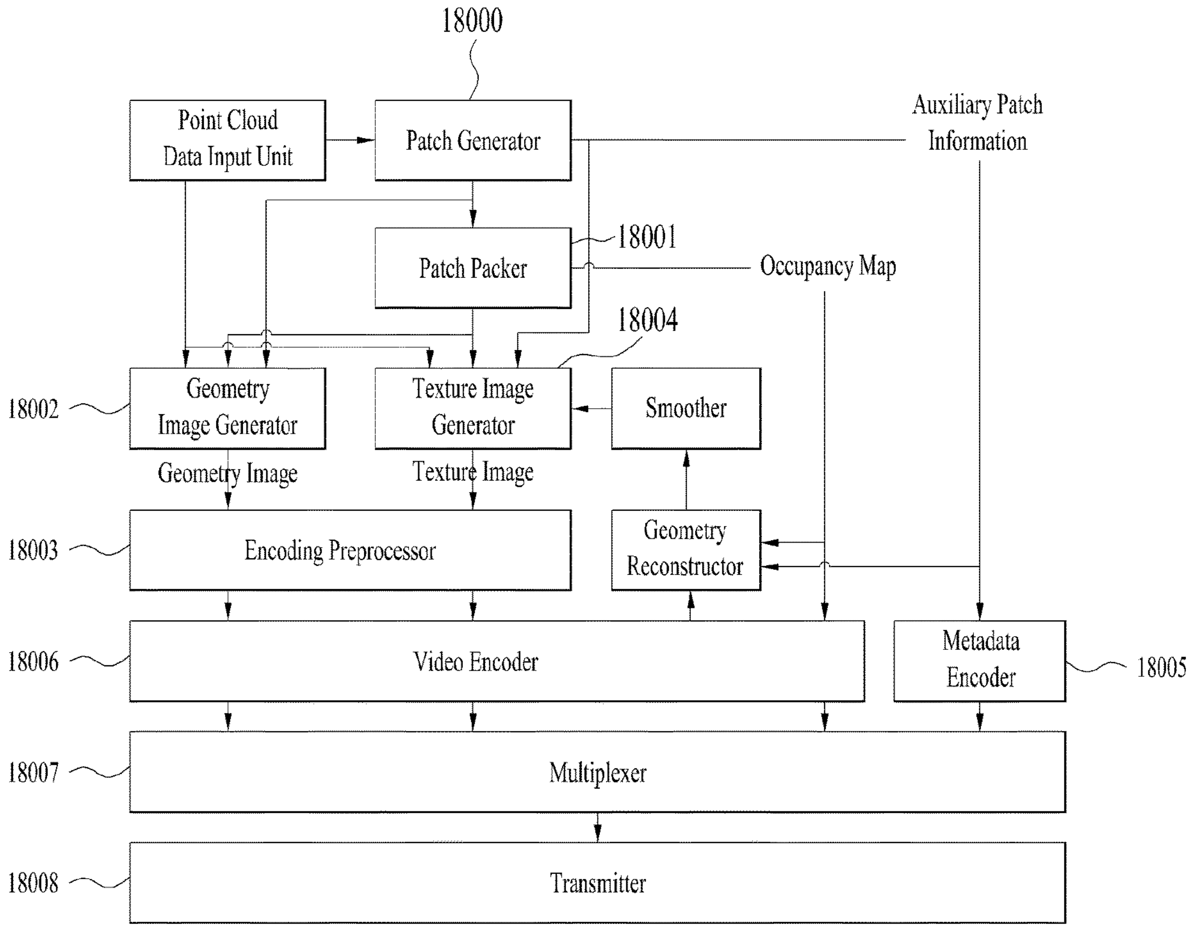
FIG. 18 is a flowchart illustrating operation of a transmission device according to embodiments of the present disclosure.

FIG. 18 is a flowchart illustrating operation of a transmission device according to embodiments of the present disclosure.

The transmission device according to the embodiments may correspond to the transmission device of FIG. 1, the encoding process of FIG. 4, and the 2D video/image encoder of FIG. 15, or perform some/all of the operations thereof. Each component of the transmission device may correspond to software, hardware, a processor and/or a combination thereof.

An operation process of the transmission terminal for compression and transmission of point cloud data using V-PCC may be performed as illustrated in the figure.

The point cloud data transmission device according to the embodiments may be referred to as a transmission device.

Regarding a patch generator 18000, a patch for 2D image mapping of a point cloud is generated. Auxiliary patch information is generated as a result of the patch generation. The generated information may be used in the processes of geometry image generation, texture image generation, and geometry reconstruction for smoothing.

Regarding a patch packer 18001, a patch packing process of mapping the generated patches into the 2D image is performed. As a result of patch packing, an occupancy map may be generated. The occupancy map may be used in the processes of geometry image generation, texture image generation, and geometry reconstruction for smoothing.

A geometry image generator 18002 generates a geometry image based on the auxiliary patch information and the occupancy map. The generated geometry image is encoded into one bitstream through video encoding.

An encoding preprocessor 18003 may include an image padding procedure. The geometry image regenerated by decoding the generated geometry image or the encoded geometry bitstream may be used for 3D geometry reconstruction and then be subjected to a smoothing process.

A texture image generator 18004 may generate a texture image based on the (smoothed) 3D geometry, the point cloud, the auxiliary patch information, and the occupancy map. The generated texture image may be encoded into one video bitstream.

A metadata encoder 18005 may encode the auxiliary patch information into one metadata bitstream.

A video encoder 18006 may encode the occupancy map into one video bitstream.

A multiplexer 18007 may multiplex the video bitstreams of the generated geometry image, texture image, and occupancy map and the metadata bitstream of the auxiliary patch information into one bitstream.

A transmitter 18008 may transmit the bitstream to the reception terminal. Alternatively, the video bitstreams of the generated geometry image, texture image, and the occupancy map and the metadata bitstream of the auxiliary patch information may be processed into a file of one or more track data or encapsulated into segments and may be transmitted to the reception terminal through the transmitter.

Figure 19:
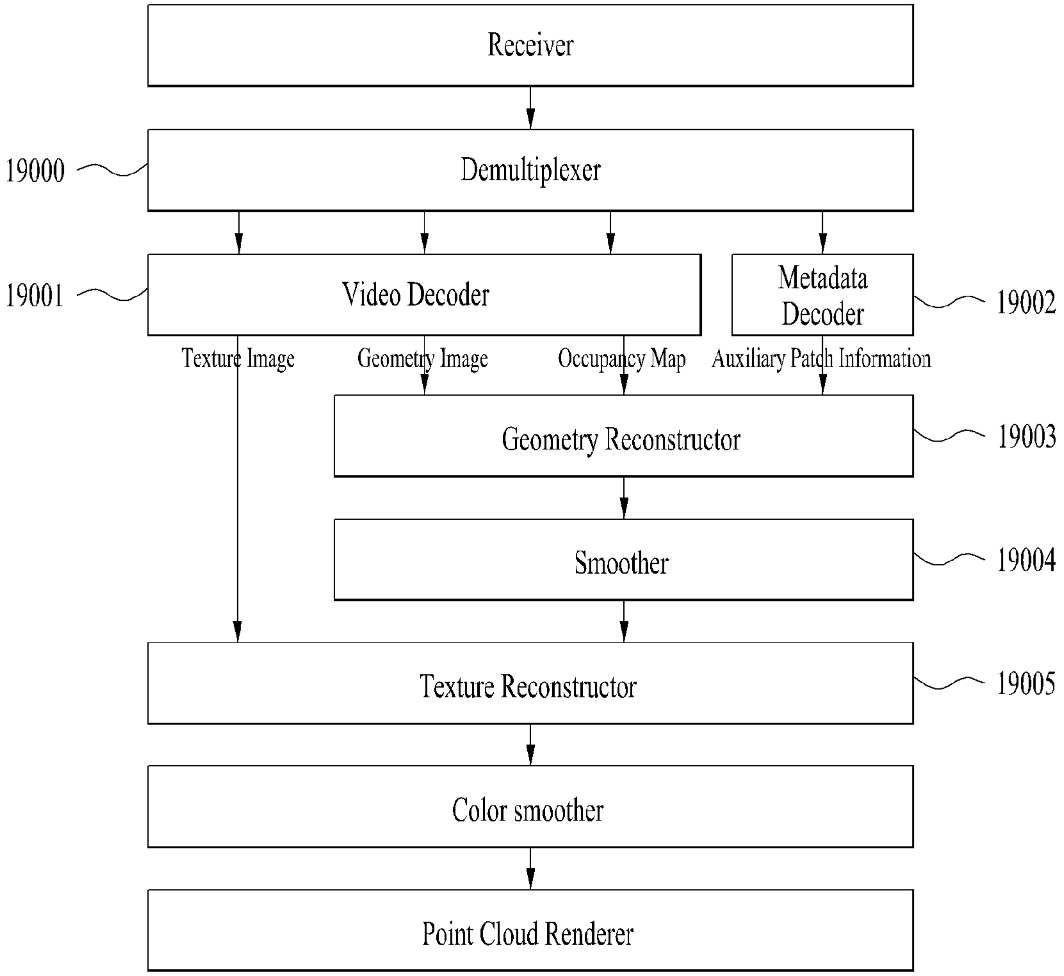
FIG. 19 is a flowchart illustrating operation of a reception device according to embodiments.

FIG. 19 is a flowchart illustrating operation of a reception device according to embodiments.

The reception device according to the embodiments may correspond to the reception device of FIG. 1, the decoding process of FIG. 16, and the 2D video/image encoder of FIG. 17, or perform some/all of the operations thereof. Each component of the reception device may correspond to software, hardware, a processor and/or a combination thereof.

The operation of the reception terminal for receiving and reconstructing point cloud data using V-PCC may be performed as illustrated in the figure. The operation of the V-PCC reception terminal may follow the reverse process of the operation of the V-PCC transmission terminal of FIG. 18.

The point cloud data reception device according to the embodiments may be referred to as a reception device.

The bitstream of the received point cloud is demultiplexed into the video bitstreams of the compressed geometry image, texture image, occupancy map and the metadata bitstream of the auxiliary patch information by a demultiplexer 19000 after file/segment decapsulation. A video decoder 19001 and a metadata decoder 19002 decode the demultiplexed video bitstreams and metadata bitstream. 3D geometry is reconstructed by a geometry reconstructor 19003 based on the decoded geometry image, occupancy map, and auxiliary patch information, and is then subjected to a smoothing process performed by a smoother 19004. A color point cloud image/picture may be reconstructed by a texture reconstructor 19005 by assigning color values to the smoothed 3D geometry based on the texture image. Thereafter, a color smoothing process may be additionally performed to improve the objective/subjective visual quality, and a modified point cloud image/picture derived through the color smoothing process is shown to the user through the rendering process (through, for example, the point cloud renderer). In some cases, the color smoothing process may be skipped.

Figure 20:
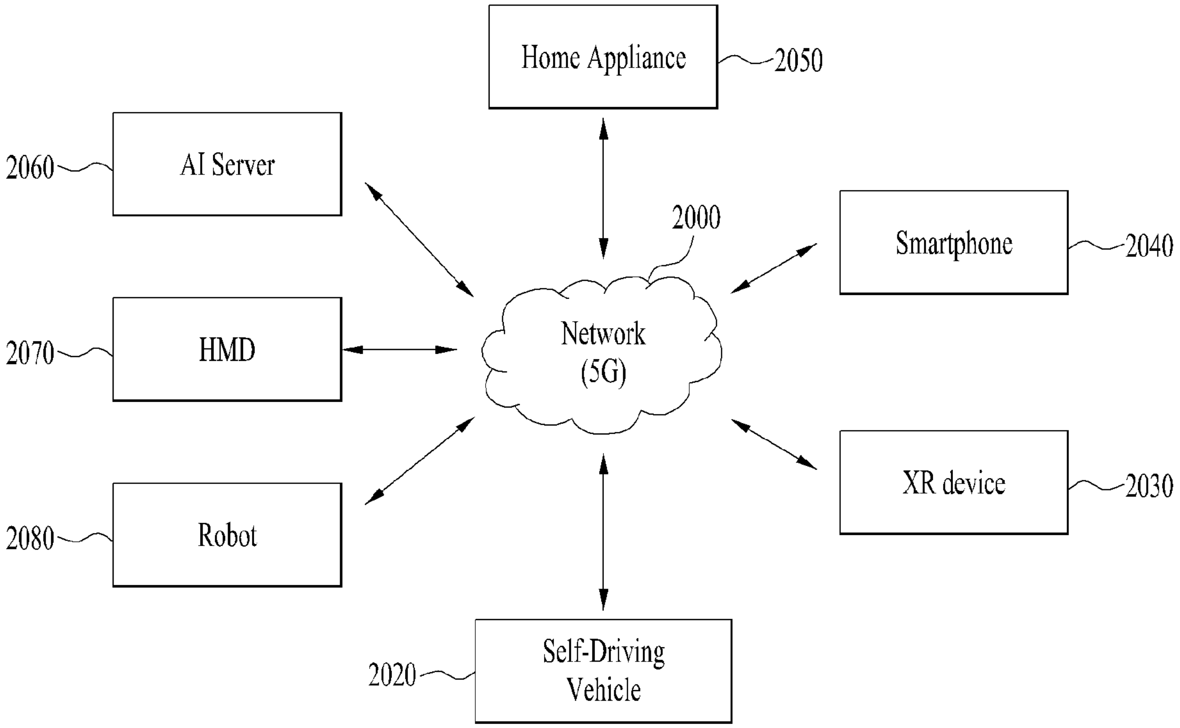
FIG. 20 illustrates an exemplary structure operable in connection with point cloud data transmission/reception methods/devices according to embodiments.

FIG. 20 illustrates an exemplary structure operable in connection with point cloud data transmission/reception methods/devices according to embodiments.

In the structure according to the embodiments, at least one of a server 2060, a robot 2010, a self-driving vehicle 2020, an XR device 2030, a smartphone 2040, a home appliance 2050 and/or a head-mount display (HMD) 2070 is connected to a cloud network 2010. Here, the robot 2010, the self-driving vehicle 2020, the XR device 2030, the smartphone 2040, or the home appliance 2050 may be referred to as a device. In addition, the XR device 2030 may correspond to a point cloud data (PCC) device according to embodiments or may be operatively connected to the PCC device.

The cloud network 2000 may represent a network that constitutes part of the cloud computing infrastructure or is present in the cloud computing infrastructure. Here, the cloud network 2000 may be configured using a 3G network, 4G or Long Term Evolution (LTE) network, or a 5G network.

The server 2060 may be connected to at least one of the robot 2010, the self-driving vehicle 2020, the XR device 2030, the smartphone 2040, the home appliance 2050, and/or the HMD 2070 over the cloud network 2000 and may assist at least a part of the processing of the connected devices 2010 to 2070.

The HMD 2070 represents one of the implementation types of the XR device and/or the PCC device according to the embodiments. An HMD type device according to embodiments includes a communication unit, a control unit, a memory, an I/O unit, a sensor unit, and a power supply unit.

Hereinafter, various embodiments of the devices 2010 to 2050 to which the above-described technology is applied will be described. The devices 2010 to 2050 illustrated in FIG. 20 may be operatively connected/coupled to a point cloud data transmission and reception device according to the above-described embodiments.

<PCC+XR> The XR/PCC device 2030 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 2030 may analyze 3D point cloud data or image data acquired through various sensors or from an external device and generate position data and attribute data about 3D points. Thereby, the XR/PCC device 2030 may acquire information about the surrounding space or a real object, and render and output an XR object. For example, the XR/PCC device 2030 may match an XR object including auxiliary information about a recognized object with the recognized object and output the matched XR object.

<PCC+Self-driving+XR> The self-driving vehicle 2020 may be implemented as a mobile robot, a vehicle, an unmanned aerial vehicle, or the like by applying the PCC technology and the XR technology.

The self-driving vehicle 2020 to which the XR/PCC technology is applied may represent an autonomous vehicle provided with means for providing an XR image, or an autonomous vehicle that is a target of control/interaction in the XR image. In particular, the self-driving vehicle 2020, which is a target of control/interaction in the XR image, may be distinguished from the XR device 2030 and may be operatively connected thereto.

The self-driving vehicle 2020 having means for providing an XR/PCC image may acquire sensor information from the sensors including a camera, and output the generated XR/PCC image based on the acquired sensor information. For example, the self-driving vehicle may have an HUD and output an XR/PCC image thereto to provide an occupant with an XR/PCC object corresponding to a real object or an object present on the screen.

In this case, when the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap the object on the screen. For example, the self-driving vehicle may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only real-world objects, backgrounds, and the like as CG images. On the other hand, the AR technology refers to a technology for showing a CG image virtually created on a real object image. The MR technology is similar to the AR technology described above in that virtual objects to be shown are mixed and combined with the real world. However, the MR technology differs from the AR technology makes a clear distinction between a real object and a virtual object created as a CG image and uses virtual objects as complementary objects for real objects, whereas the MR technology treats virtual objects as objects having the same characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to all VR, AR, MR, and XR technologies. For such technologies, encoding/decoding based on PCC, V-PCC, and G-PCC techniques may be applied.

The PCC method/device according to the embodiments may be applied to a vehicle that provides a self-driving service.

A vehicle that provides the self-driving service is connected to a PCC device for wired/wireless communication.

When the point cloud data transmission and reception device (PCC device) according to the embodiments is connected to a vehicle for wired/wireless communication, the device may receive and process content data related to an AR/VR/PCC service that may be provided together with the self-driving service and transmit the processed content data to the vehicle. In the case where the point cloud data transmission and reception device is mounted on a vehicle, the point cloud transmitting and reception device may receive and process content data related to the AR/VR/PCC service according to a user input signal input through a user interface device and provide the processed content data to the user. The vehicle or the user interface device according to the embodiments may receive a user input signal. The user input signal according to the embodiments may include a signal indicating the self-driving service.

Figure 40:
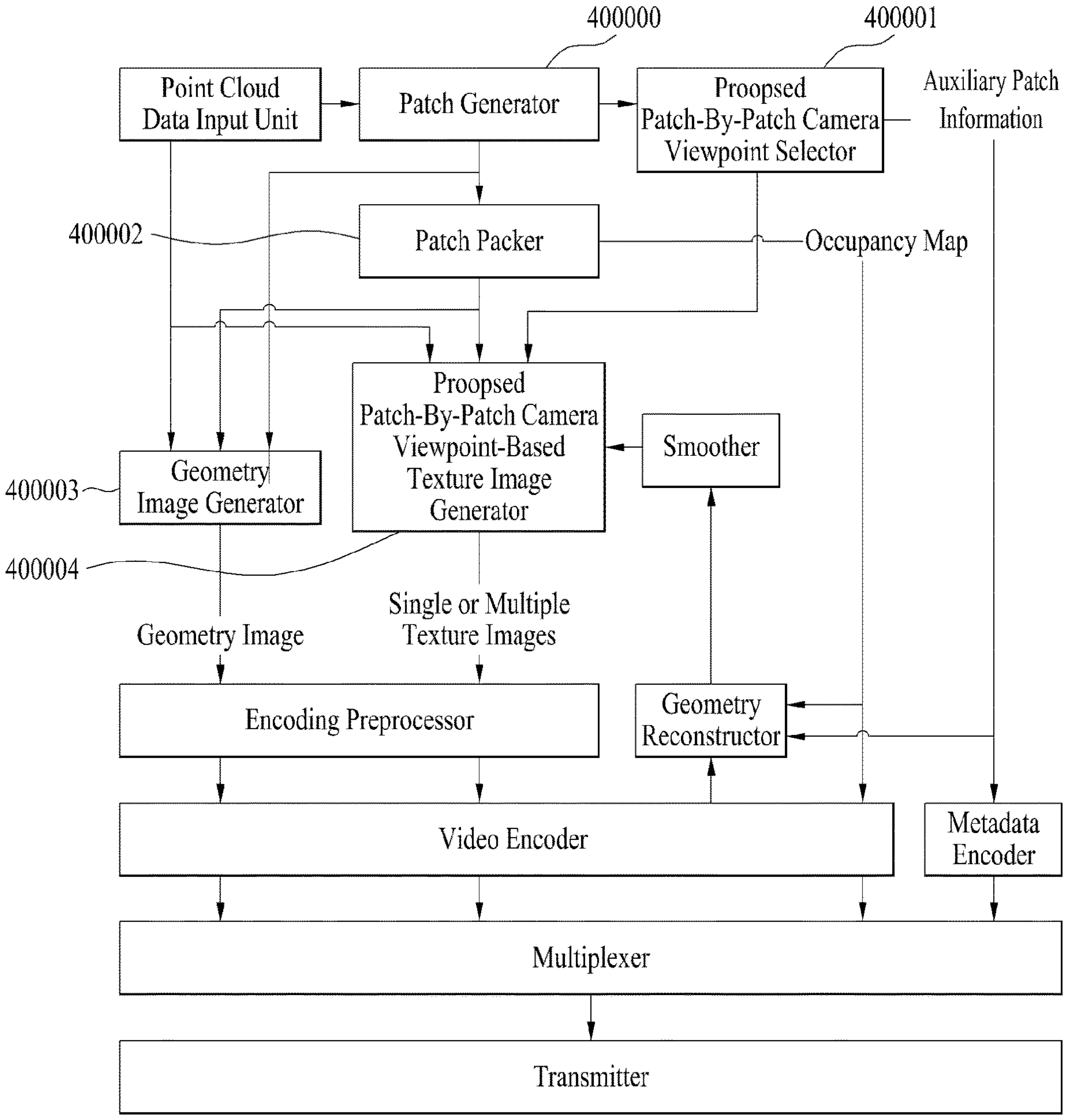
FIG. 40 illustrates a V-PCC point cloud data transmission device according to embodiments.

The point cloud data transmission method/device according to the embodiments may refer to the transmission device 10000 in FIG. 1, the point cloud video encoder 10002 in FIG. 1, the encoding process in FIG. 4, the video/image encoder in FIG. 15, the transmission device in FIG. 18, the XR device 1730 in FIG. 20, the transmission device in FIG. 40, and the like. Each component of the transmission method/device may correspond to hardware, software, a processor connected to a memory, and/or a combination thereof.

The point cloud data reception method/device according to the embodiments may refer to the reception device 10005, the point cloud video decoder 10008 in FIG. 2, the decoding process in FIG. 16, the video/image decoder in FIG. 17, the reception device in FIG. 19, the XR device 1730 in FIG. 20, and the like. Each component of the reception method/device may correspond to hardware, software, a processor connected to a memory, and/or a combination thereof.

The point cloud data transmission/reception method/device according to the embodiments may be referred to as a method/device according to embodiments.

Figure 21:
FIG. 21 illustrates a voxelized surface light field sequence according to embodiments.

FIG. 21 illustrates a voxelized surface light field sequence according to embodiments.

The method/device according to the embodiments may compress and reconstruct a surface light field (SLF) data set including point cloud data.

The method/device according to the embodiments may use a patch-based camera view selection and attribute video generation method for V-PCC-based effective compression/reconstruction of a surface light field (SLF) sequence.

Embodiments relate to video-based point cloud compression (V-PCC), which is a method of compressing 3D point cloud data using a 2D video codec. In particular, when compressing an SLF data set having more attributes than the general point cloud data set using V-PCC, the low compression rate and high complexity that other methods provide, and the issue of use of many codec instances may be addressed.

In the case of compressing an SLF sequence using V-PCC, a method capable of exhibiting more effective compression performance than other methods is provided. Embodiments provide a method of selecting a significant camera viewpoint among camera viewpoints constituting SLF sequence data in V-PCC, a method of generating an attribute video stream, signaling of a camera view selection method and a video stream generation method, and video stream processing methods for the transmitter and receiver.

In order to compress input 3D point cloud data, the V-PCC method generates, from the input data, three video streams: 1) an occupancy map video stream, 2) a geometry video stream, and 3) an attribute video stream. They are compressed respectively using a 2D video codec in the V-PCC encoder. Among the videos, the attribute video is generated to contain the color attribute of a 3D point in the 2D image. When the attribute video has texture type information, each pixel value in the image represents a (R, G, B) color attribute of corresponding 3D point.

A voxelized surface light field (VSLF) data set is a test data set for standardization of MPEG created to provide users with a more realistic experience through more realistic presentation and free movement of the viewpoint when 3D scenes are rendered in applications including an augmented reality or virtual reality application (see FIG. 21). Unlike the general point cloud data set, which has one piece of (R, G, B) information as a color attribute representing one point, the SLF data set has as many pieces of (R, G, B) information as the number of different camera viewpoints. Therefore, in compressing a general point cloud data set using V-PCC, one attribute video may be generated to present and compress the color attributes of all points. However, in compressing an SLF data set, it is necessary to apply an additional V-PCC compression technology because one attribute video cannot contain all color attributes.

There are techniques for compressing an SLF sequence using the V-PCC technique according to embodiments.

According to embodiments, multiple attribute videos may be generated and compressed by equally applying, to the color attributes of all SLF data sets, the method of generating one attribute video for color attributes of a point cloud in the compression process of V-PCC.

In the case of compressing the sequence of FIG. 21, the embodiments generate 13 attribute videos in addition to one geometry video, one occupancy map, and auxiliary information. In addition, each of the 13 attribute videos is compressed in the same way as compressing each video stream using a 2D video codec in V-PCC. As a result, when the same sequence is compressed in the form of general point cloud data rather than SLF data (on the condition of 2 frames and highest quality compression), the compressed data is 991099 Bytes to 0.9 Bytes. When the sequence is compressed in the form of an SLF data set, the compressed data may have a capacity of 11083828 Bytes to 11 Mega bytes. Since the original data size of the SLF sequence is large, the size of the compressed data may also be very large. When this technique is applied to an actual application, it may be predicted that a high level of memory capacity will be required. In addition, a large number of video codec instances are required to encode and decode each of the 13 attribute videos.

Figure 22:
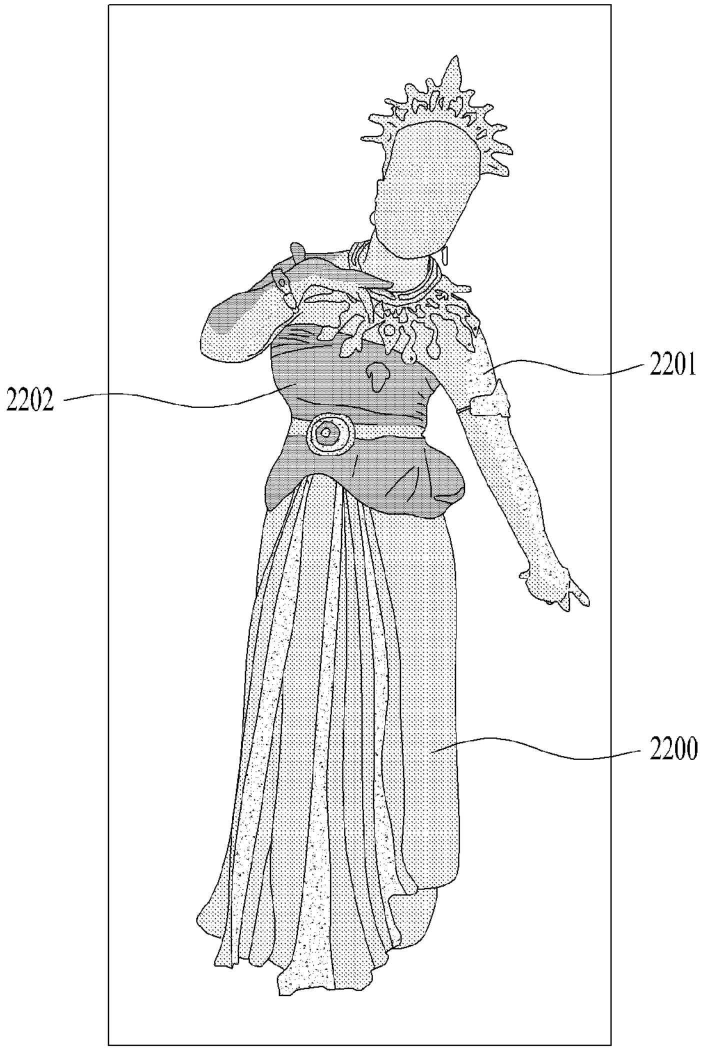
FIG. 22 illustrates an example in which 2D point cloud data according to embodiments are divided and displayed according to activity region information for each point.

FIG. 22 illustrates an example in which 2D point cloud data according to embodiments are divided and displayed according to activity region information for each point.

Embodiments may include an optimized technique to address the issue of excessive use of memory, in other words, the low compression rate. Representative cameras that may represent all camera viewpoints are selected, and only color information expressed by these camera views is compressed.

To this end, all points of the SLF sequence may be classified into a low activity region 2200, a medium activity region 2201, and a high activity region 2202 (see FIG. 22).

The method/device according to the embodiments performs patch segmentation in consideration of activity region information. Through this process, all points belonging to one patch may have the same activity region. For a patch having the high activity region, five representative cameras may be selected. For a patch having the medium activity region, three representative cameras may be selected. For a patch having the low activity region, one representative camera may be selected. An attribute video is generated using the color information expressed by the selected cameras.

Figure 23:
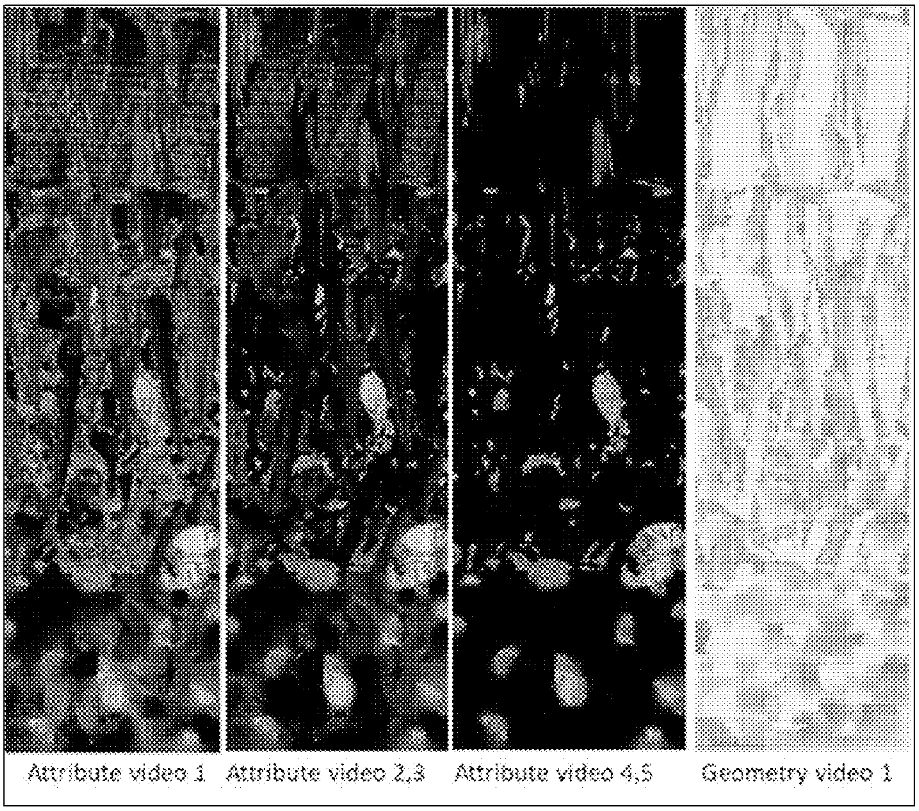
FIG. 23 illustrates configuration of five attribute videos and one geometry video generated from an SLF data set according to embodiments.

FIG. 23 illustrates configuration of five attribute videos and one geometry video generated from an SLF data set according to embodiments.

Finally, as described above, 5 attribute videos are generated for the input SLF sequence, and each of the videos is compressed using a 2D video codec (see FIG. 23).

According to the above-described embodiment, the compression rate may be improved by 40%, but the PSNR performance of the reconstructed view is greatly reduced. Accordingly, further improvement may be needed.

The method/device according to the embodiments may address the issue of memory requirement in the described method and further provide additional operations for providing high quality compression performance.

Specifically, disclosed herein are a method of effectively compressing color data of an SLF sequence using V-PCC, and a method of selecting only significant color information for camera viewpoints in units of patches rather than compressing color information for all camera viewpoints for each point, a method of generating and compressing video using color information related to selected camera viewpoints, a method of minimizing encoding and decoding complexity and the number of required codec instances by minimizing the number of attribute videos used in V-PCC, and a signaling method for notifying that the SLF sequence compression method proposed is applied in the transmitting side (or V-PCC encoder) and the receiving side (or V-PCC decoder).

As used herein, attribute video, which is a term according to embodiments, means a video generated using attribute data (or attributes) supported in V-PCC. When the attribute video has a texture data type, it may be referred to as a texture video.

An SLF sequence according to embodiments represents data composed of color information acquired from multiple cameras for one point. That is, the SLF sequence includes multiple pieces of color information as data for each point in a point cloud representing an object. Multiple pieces of color information for one point may have different values according to a camera's photographing position and angle. Embodiments provide a method of selecting only significant color information in units of patches and generating a video using the same in generating a texture video for color information of the SLF sequence.

First, in order to select significant color information in units of patches, a camera viewpoint that provides the most significant color information for each patch among all camera viewpoints constituting SLF data should be selected. Embodiments use two methods for patch-by-patch camera viewpoint selection.

To describe the proposed method, the total number of camera viewpoints constituting the SLF data is defined as N, and the number of camera viewpoints selected for each patch is defined as M.

Figure 24:
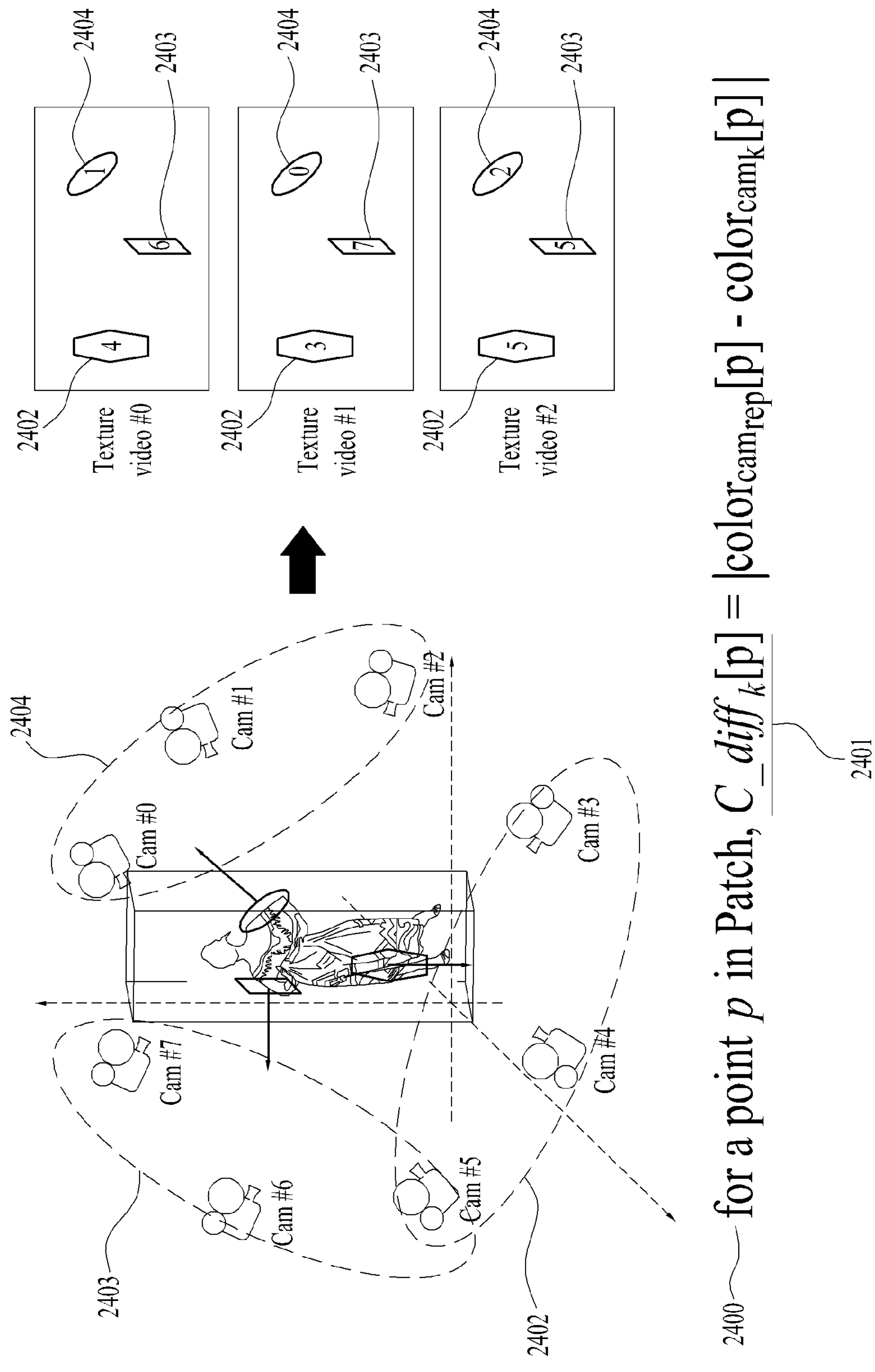
FIG. 24 illustrates a method for patch-by-patch camera viewpoint selection and an example of texture video generation according to embodiments.

FIG. 24 illustrates a method for patch-by-patch camera viewpoint selection and an example of texture video generation according to embodiments.

Method 1 for Patch-by-Patch Camera Viewpoint Selection According to Embodiments (FIG. 24)

A patch packing step and a patch packer (processor) in the point cloud data transmission method/device according to the embodiments may perform this operation. The patch may be decoded based on this operation in a patch decoding process of the point cloud data reception method/device according to the embodiments.

In the embodiments, among N camera viewpoints constituting the SLF data, M camera viewpoints most closely facing the direction in which the patch is directed are selected (see FIG. 24).

FIG. 24 shows an example where N=8 and M=3. Since N is 8, there are cameras #0 to #7. Since M is 3, 3 camera viewpoints may be selected.

In most cases, when a point cloud is rendered, a point area that a user may actually see may correspond to the front of each region. Therefore, even when there are N pieces of color information for one point, it is highly likely that the information actually visible and required by the user is limited to color information corresponding to some angles. In the embodiments, based on these characteristics, it may be determined that the color information obtained from the camera viewpoint present in the direction of the front side of the patch is the most valid and accurate, and only the corresponding information may be selected, compressed, and transmitted.

Each of the N camera viewpoints used to generate SLF data has camera matrix information about a position and a direction. In addition, when each patch is generated through point cloud segmentation, the direction in which the corresponding patch is projected is determined. Accordingly, the direction in which the patch faces in the 3D space may be known by a normal vector. Therefore, through the operation between the camera matrix information and the normal vector of the patch, the camera viewpoint that most closely faces the patch may be determined. The operation between the camera matrix and the normal vector of the patch is a vector dot product (u·v). Thus, the closer the patch and the camera viewpoint are in the direction in which they face each other, the smaller the result of the vector dot product operation. Therefore, by performing the vector dot product operation on the camera matrix of all camera viewpoints and the patch normal vector to select M camera viewpoints having the least values, camera viewpoints most closely facing the patch may be selected.

Here, the value of M may be set differently for each patch. In this case, an additional constraint may be applied to exclude the case where the angle formed by the direction vector of the camera matrix and the patch normal vector is out of a specific angle range. Alternatively, M may be set to be constant in a tile, or may be set to be constant in a frame. Similarly, for the same sequence, the same value of M may be set to be applied. Information on setting the value of M is signaled as atlas information. Information on the M selected camera viewpoints is signaled and transmitted for each patch. As the value of M increases, the number of generated texture videos may increase, and the view coverage range for the patch may be widened.

Texture videos may include texture videos #0, #1, #2, and the like. Each texture video includes patch(s) corresponding to the texture video, and the patches may be acquired from camera(s) closest to the patches and included in the texture video.

For example, texture video #0 may include patches acquired from camera #4, camera #6, and camera #1. That is, texture video #0 includes a patch based on camera #4, which is the closest camera among camera #5, camera #4, and camera #3. In this way, point cloud data about an object may be configured in detail, and may be efficiently compressed even when the amount of data increases.

Method 2 for Patch-by-Patch Camera Viewpoint Selection According to Embodiments

The method/device according to the embodiments may exclude duplicate attributes (colors) between cameras in a patch, if any.

The SLF data for each point contains N pieces of color information. It often has duplicate color information depending on the positions and orientations of the point and camera viewpoints. Therefore, it may be a more efficient method to select and transmit only representative color information excluding duplicate color information. In the embodiments, camera viewpoints that have differentiated color information in the color information of the camera viewpoints representing a patch may be determined as significant camera viewpoints and selected.

As in method 1 described above, a camera viewpoint that most closely faces the direction of the patch is selected using an operation of a camera matrix of the employed camera viewpoint and a normal vector of the patch. This camera viewpoint is defined as the representative camera viewpoint cam_rep that best expresses the color information about the patch. Then, the difference between the patch color obtained from the remaining N−1 camera viewpoints and the patch color obtained from cam_rep is calculated. A camera viewpoint other than cam_rep is defined as cam_k, and the difference between color values obtained from cam_rep and cam_k is calculated for all points constituting the patch, as shown in part 2400.

After calculating the values of 2401 of all points in the patch, the average ave_C_diff_k thereof is calculated. ave_C_diff is calculated for the remaining N−1 camera viewpoints excluding cam_rep, and M camera viewpoints in descending order of the values of ave_C_diff are selected. As ave_C_diff is larger, colors that have a larger difference from the color obtained from cam_rep may be obtained from the corresponding camera viewpoint, and may be it may be determined to e significant information as non-duplicate differentiated color information. Here, an additional constraint may be configured such that camera viewpoints with ave_C_diff less than or equal to a specific threshold may not be selected and transmission of similar color information may be excluded.

The determined value of M is very likely to differ among the patches, and information on the value of M and the selected camera viewpoint is signaled and transmitted for each patch.

One of the two methods according to the embodiments may be employed and applied according to the user's selection, and the employed selection method may be signaled so as to be recognized on the receiving side. The user at the receiving side may know how the corresponding SLF sequence color data has been selected and transmitted, and may selectively utilize the compressed SLF color information according to the purpose of use.

In addition, for M, the number of camera viewpoints selected for each patch, the maximum value max_M that M may have may be ready to for a corresponding SLF sequence under the condition that 2<=max_M<=N.

Next, two methods of generating texture video using the color information related to camera viewpoints selected for each patch through the method described above will be described.

Texture Video Generation Method 1

The number of texture videos generated for the input SLF sequence should be determined as the maximum value among the numbers of selected camera viewpoints. Therefore, as many texture videos as K=max(M) are generated, and the color information obtained from the selected camera viewpoints is mapped to the position of each patch determined in the patch packing operation. The order of mapping color information for each patch to each of the K texture videos reflects the order in which camera viewpoints are selected for each patch. When method 1 for patch-by-patch camera viewpoint selection is used, the colors of the camera viewpoints are mapped to respective texture videos in descending order of closeness to the direction in which the patch faces (see FIG. 24). For example, part 2402 represents a patch with a red color and camera viewpoints for acquiring the patch, and part 2403 represents a patch with a blue color and camera viewpoints for acquiring the patch. Part 2404 represents a patch with a yellow color and camera viewpoints for acquiring the patch.

When method 2 for patch-by-patch camera viewpoint selection is used, the color information obtained from cam_rep is mapped to the first texture video, and then the color information obtained from the corresponding camera viewpoints is mapped to texture videos in descending order of ave_C_diff. Applying this order is intended to reflect the importance of color information in order of texture videos. Accordingly, it may be considered that the first texture video contains the most significant color information. In addition, the application of this order may contribute to determining whether to reconstruct all colors or only some color data with high importance according to the user's selection on the receiving side.

Since the number of selected camera viewpoints may be different for each patch, tile, or frame, there may be patches without color information to be mapped in some cases. In this case, the patch color in the texture video may be filled with 0.

According to embodiments, each of the K texture videos generated in this way may be compressed and transmitted using a 2D video codec.

Figure 25:
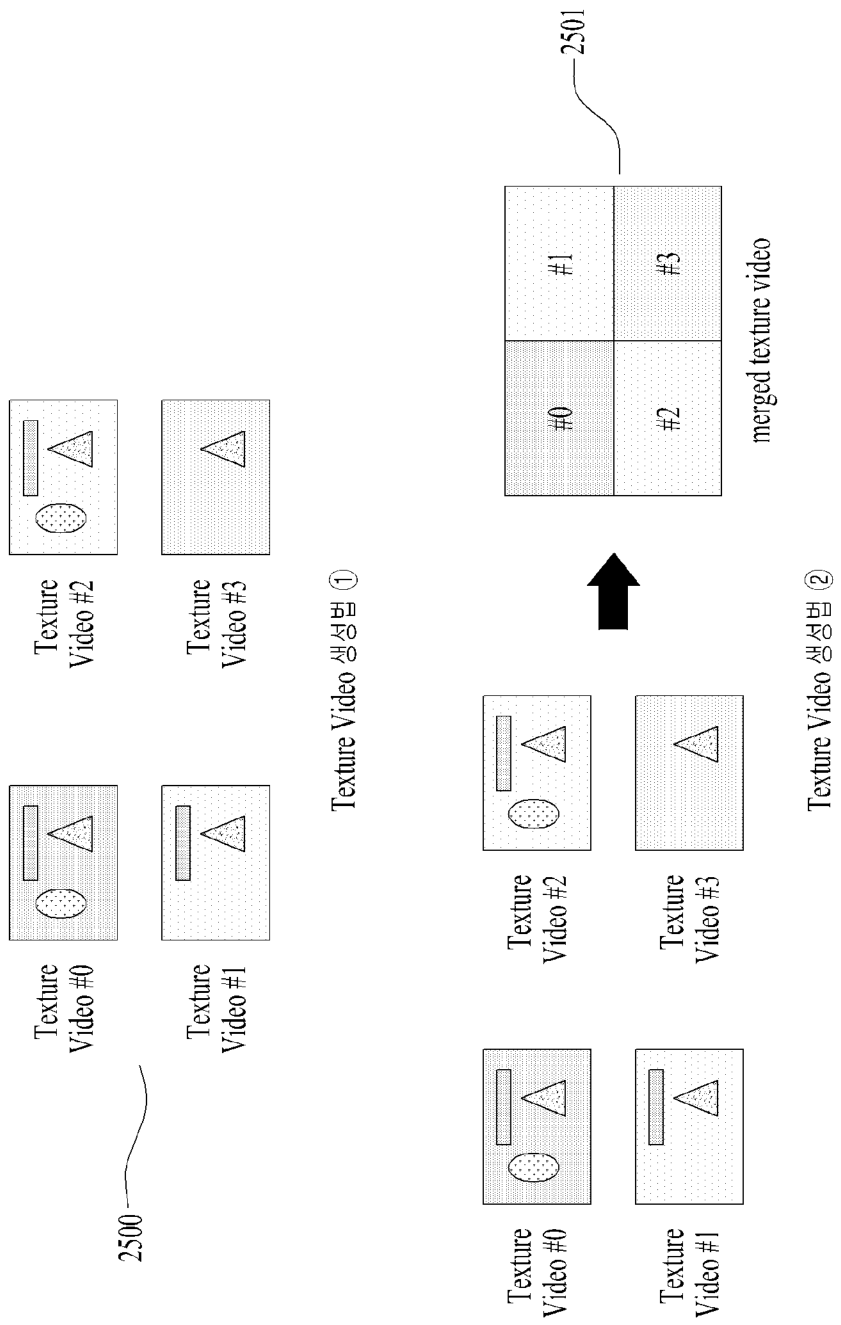
FIG. 25 illustrates a texture video generation method according to embodiments.

FIG. 25 illustrates a texture video generation method according to embodiments.

Texture Video Generation Method 2

In the case of texture video generation method 1 (2500), as K, the number of generated texture videos, increases, the number of required codec instances increases. Therefore, texture video generation method 2 is intended to reduce the number of generated texture videos. First, K texture videos are generated in the same way as in texture video generation method 1, and then frames of the respective videos are combined into one frame to synthesize one texture video 2501 (see FIG. 25). The number of video frames arranged in horizontal/vertical directions may be determined according to a user's intention.

In the ascending order of K video indexes, the information related to each frame is arranged according to the raster scan order within the merged texture video. A frame area that cannot be filled in the merged texture video may be filled with 0. The generated merged texture video is compressed using one video codec and transmitted.

By signaling the number of videos arranged in the horizontal/vertical direction such that the attribute video transmitted through signaling information (parameter information) according to embodiments is identified as a merged video, the receiving side may recognize the structure of the merged video.

Figure 26:
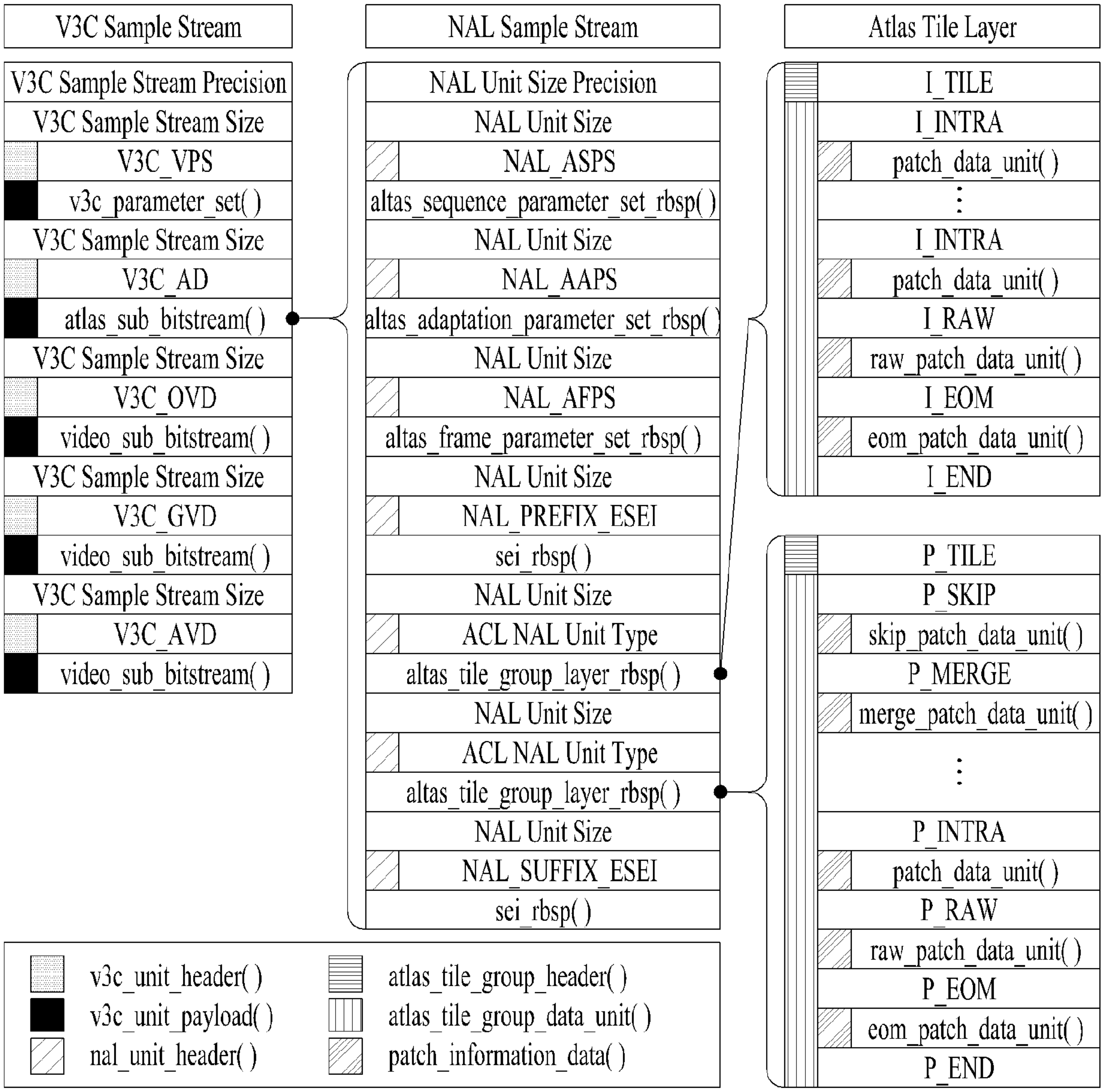
FIG. 26 illustrates a V3C bitstream structure according to embodiments.

FIG. 26 illustrates a V3C bitstream structure according to embodiments.

The point cloud data transmission method/device according to the embodiments may compress (encode) point cloud data, generate related parameter information (as shown in FIGS. 26 to 39), and generate and transmit a bitstream as shown in FIG. 26.

The point cloud data reception method/device according to the embodiments may receive a bitstream as shown in FIG. 26 and decode point cloud data contained in the bitstream based on parameter information included in the bitstream.

Signaling information (which may be referred to as parameter/metadata, etc.) according to embodiments may be encoded by a metadata encoder (which may be referred to as metadata encoding device) in the point cloud data transmission device according to the embodiments and may be transmitted in a bitstream. In addition, in the point cloud data reception device according to the embodiments, it may be decoded by a metadata decoder (which may be referred to as a metadata decoding device) and provided to a decoding process of the point cloud data.

A transmitter according to embodiments may generate a bitstream by encoding point cloud data.

The bitstream according to the embodiments may include a V3C unit.

A receiver according to the embodiments may receive the bitstream transmitted by the transmitter, decode and reconstruct point cloud data. Hereinafter, specific syntax of the V3C unit according to the embodiments and elements included in the V3C unit will be described.

FIGS. 27 to 39 show the syntax of a V3C parameter set generated by the point cloud data transmission method/device according to the embodiments.

FIGS. 27 to 39 show a general V3C parameter set according to embodiments.

vps_v3c_parameter_set_id provides an identifier for the VPS for reference by other syntax elements.

vps_reserved_zero_8 bits may be 0 in the bitstream.

vps_atlas_count_minus1 plus 1 indicates the total number of supported atlases in the current bitstream. It may have a value in the range of 0 to 63.

vps_atlas_id[k] is the atlas ID with index k. It may have a value in the range of 0 to 63.

vps_frame_width[j] indicates the frame width in terms of samples for the atlases with atlas ID j.

vps_frame_height[j] indicates the frame height in terms of samples for the atlases with atlas ID j.

vps_map_count_minus1[j] plus 1 indicates the number of maps used for encoding the geometry and attribute data for the atlas with atlas ID j. It may have a value in the range of 0 to 15.

vps_multiple_map_streams_present_flag[j] equal to 0 indicates that all geometry or attribute maps for the atlas with atlas ID j are placed in a single geometry or attribute video stream. vps_multiple_map_streams_present_flag[j] equal to 1 indicates that all geometry or attribute maps for the atlas with atlas ID j are placed in separate video streams.

vps_map_absolute_coding_enabled_flag[j] equal to 1 indicates that the geometry map with index i for the atlas with atlas ID j is coded without any map prediction. vps_map_absolute_coding_enabled_flag[j][i] equal to 0 indicates that the geometry map with index i for the atlas with atlas ID j is first predicted from another, earlier coded map, prior to map coding.

vps_map_predictor_index_diff[j][i] is used to compute the predictor of the geometry map with index i for the atlas with atlas ID j when vps_map_absolute_coding_enabled_flag[j][i] is equal to 0. The map predictor index is calculated as: MapPredictorIndex[i]=(i−1)−vps_map_predictor_index_diff[j][i].

vps_auxiliary_video_present_flag[j] equal to 1 indicates that auxiliary information for a patch in the atlas with atlas ID j, i.e., information related to RAW or EOM patch types, may be stored in a separate video stream. The separate video stream may be referred to as an auxiliary video stream. vps_auxiliary_video_present_flag[j] equal to 0 indicates that auxiliary information for a patch in the atlas with atlas ID j, i.e., information related to RAW or EOM patch types, is not stored in an auxiliary video stream.

vps_occupancy_video_present_flag[j] equal to 0 indicates that the atlas with the atlas ID j does not have related occupancy video data. vps_occupancy_video_present_flag[j] equal to 1 indicates that the atlas with the atlas ID j has related occupancy video data.

vps_geometry_video_present_flag[j] equal to 0 indicates that the atlas with atlas ID j does not have related geometry video data. vps_geometry_video_present_flag[j] equal to 1 indicates that the atlas has related geometry video data.

vps_attribute_video_present_flag[j] equal to 0 indicates that the atlas with the atlas ID j does not have related attribute video data. vps_attribute_video_present_flag[j] equal to 1 indicates that the atlas has related attribute video data.

FIG. 29 illustrates attribute information according to embodiments.

ai_attribute_count[j] indicates the number of attributes associated with the atlas with atlas ID j. ai_attribute_count[j] may be in the range of 0 to 127.

ai_attribute_type_id[j][i] indicates the attribute type of the attribute video data unit with index i for the atlas with atlas ID j.

V3C Attribute Types:

When id is 0, the identifier is ATTR_TEXTURE and the type is Texture.

When id is 1, the identifier is ATTR_MATERIAL_ID and the type is Material ID.

When id is 2, the identifier is ATTR_TRANSPARENCY and the type is Transparency.

When the id is 3, the identifier is ATTR_REFLECTANCE and the type is Reflectance.

When the id is 4, the identifier is ATTR_NORMAL and the type is Normals.

When id is 5 to 14, the identifier is ATTR_RESERVED and the type is Reserved.

When the id is 15, the identifier is ATTR_UNSPECIFIED and the type is Unspecified.

ATTR_TEXTURE indicates an attribute that contains texture information of a volumetric frame. For example, this may indicate an attribute that contains RGB (Red, Green, Blue) color information.

ATTR_MATERIAL_ID indicates an attribute that contains supplemental information identifying the material type of a point in a volumetric frame. For example, the material type may be used as a indicator for identifying an object or the characteristic of a point within a volumetric frame.

ATTR_TRANSPARENCY indicates an attribute that contains transparency information that is associated with each point in a volumetric frame.

ATTR_REFLECTANCE indicates an attribute that contains reflectance information that is associated with each point in a volumetric frame.

ATTR_NORMAL indicates an attribute that contains unit vector information associated with each point in a volumetric frame. The unit vector specifies the perpendicular direction to a surface at a point (i.e., the direction in which a point is facing). An attribute frame with this attribute type may have ai_attribute_dimension_minus1 equal to 2. Each channel of an attribute frame with this attribute type may contain one component of the unit vector (x, y, z), where the first component contains the x coordinate, the second component contains the y coordinate, and the third component contains the z coordinate.

ATTR_UNSPECIFIED may indicate values that have no specified meaning. Values indicated as ATTR_RESERVED may be reserved for future use by IS O/IEC and may not be present in bitstreams conforming to this version of this document.

ai_attribute_codec_id[j][i] indicates the identifier of the codec used to compress the attribute video data with index i for the atlas with atlas ID j. ai_attribute_codec_id[j][i] may be in the range of 0 to 255.

ai_auxiliary_attribute_codec_id[j][i] indicates the identifier of the codec used to compress the attribute video data for RAW and/or EOM coded points of attribute i, when RAW and/or EOM coded points are encoded in an auxiliary video stream for the atlas with atlas ID j. ai_auxiliary_attribute_codec_id[j][i] may be in the range of 0 to 255. When not present, the value of ai_auxiliary_attribute_codec_id[j][i] is inferred to be equal to ai_attribute_codec_id[j][i].

ai_attribute_map_absolute_coding_persistence_flag[j][i] equal to 1 indicates that all attribute maps, for the attribute with index i, that corresponds to the atlas with atlas ID j, are coded without any form of map prediction. ai_attribute_map_absolute_coding_persistence_flag[j][i] equal to 0 indicates that the attribute maps of the attribute with index i, which correspond to the atlas with atlas ID j, shall use the same map prediction method as used for the geometry component of the atlas with atlas ID j. When ai_attribute_map_absolute_coding_persistence_flag[j][i] is not present, its value may be inferred to be equal to 1.

The 3D array AttributeMapAbsoluteCodingEnabledFlag, which indicates if a particular map of an attribute is to be coded with or without prediction, is obtained as follows:

```
if( ai__attribute__map__absolute__coding__persistance__flag[ j ][ i ] == 1) {
for( k = 0; k < vps__map__count__minus1[ j ]; k++ )
AttributeMapAbsoluteCodingEnabledFlag[ j ][ i ][ k ] = 1
}
else{
for( k = 0; k < vps__map__count__minus1[ j ]; k++ )
AttributeMapAbsoluteCodingEnabledFlag[ j ][ i ][ k ] =
vps__map__absolute__coding__enabled__flag[ j ][ i ]
}
```

ai_attribute_dimension_minus1[j][i] plus 1 indicates the total number of dimensions (i.e., number of channels) of the attribute with index i for the atlas with atlas ID j. ai_attribute_dimension_minus1[j][i] may be in the range of 0 to 63.

ai_attribute_dimension_partitions_minus1[j][i] plus 1 indicates the number of partition groups in which the attribute channels for attribute with index i for the atlas with atlas ID j should be grouped. ai_attribute_dimension_partitions_minus1[j][i] may be in the range of 0 to 63.

ai_attribute_partition_channels_minus1[k][i][j] plus 1 indicates the number of channels assigned to the dimension partition group with index j of attribute with i for atlas with atlas ID k. ai_attribute_partition_channels_minus1[k][i][j] may be in the range of 0 to ai_attribute_dimension_minus1[k][i] for all dimension partition groups.

ai_attribute_2d_bit_depth_minus1[j][i] plus 1 indicates the nominal 2D bit depth to which all the attribute videos with attribute index i for atlas with atlas ID j shall be converted. ai_attribute_2d_bit_depth_minus1[j][i] may be in the range of 0 to 31.

ai_attribute_MSB_align_flag[j][i] indicates how the decoded attribute video samples, associated with an atlas with atlas ID j and attribute with index i, are converted to samples at the nominal attribute bit depth.

ai_attribute_count[j] indicates the number of attributes associated with the atlas with atlas ID j. ai_attribute_count[j] may be in the range of 0 to 127.

ai_attribute_slf_cameraview_selection_type[j] indicates whether to compress color information of SLF data and a camera viewpoint selection method for each patch used in compressing the SLF data. ai_attribute_slf_cameraview_selection_type[j] equal to 0 indicates that the attribute information of general point cloud data, not the SLF data, is transmitted. Among the values, 1 to 3 indicate that attribute information obtained from the SLF data is transmitted. 1 indicates that camera viewpoint selection method 1 for each patch according to the embodiments is used. 2 indicates that camera viewpoint selection method 2 for each patch according to the embodiments is used. 3 indicates that attribute information obtained from all camera viewpoints is transmitted without selecting camera viewpoints for each patch.

ai_attribute_merged_video_flag[j][i] equal to 1 indicates that the transmitted attribute video is a merged attribute video generated using texture video generation method 2 according to the embodiments. ai_attribute_merged_video_flag[j][i] equal to 0 indicates that each of the K attribute videos generated as described in texture video generation method 1 is transmitted.

ai_attribute_number_of_merged_attributes_in_column[j][i] is a syntax used to indicate the merge structure of the merged attribute video when ai_attribute_merged_video_flag[j][i]=1. When attribute videos are merged in the method as illustrated in FIG. 30 and transmitted as one merged attribute video, ai_attribute_number_of_merged_attributes_in_column[j][i]=2 is signaled.

ai_attribute_number_of_merged_attributes_in_row[j][i] is a syntax used to indicate the merge structure of the merged attribute video when ai_attribute_merged_video_flag[j][i]=1. When attribute videos are merged using the method as illustrated in FIG. 6 and transmitted as one merged attribute video, ai_attribute_number_of_merged_attributes_in_row[j][i]=3 is signaled.

Figure 30:
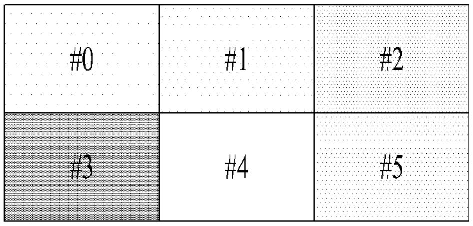
FIG. 30 illustrates a video merge structure according to embodiments.

FIG. 30 illustrates a video merge structure according to embodiments.

FIG. 30 illustrates an example of a video merge structure configured when six attribute videos are merged into one merged attribute video to be transmitted.

FIGS. 31 and 32 show an atlas sequence parameter set according to embodiments.

asps_atlas_sequence_parameter_set_id provides an identifier for the atlas sequence parameter set for reference by other syntax elements.

asps_frame_width indicates the atlas frame width in terms of integer number of samples, where a sample corresponds to a luma sample of a video component. It may be a requirement of V3C bitstream conformance that the value of asps_frame_width shall be equal to the value of vps_frame_width[j], where j is the ID of the current atlas.

asps_frame_height indicates the atlas frame height in terms of integer number of samples, where a sample corresponds to a luma sample of a video component. It may be a requirement of V3C bitstream conformance that the value of asps_frame_height shall be equal to the value of vps_frame_height[j], where j is the ID of the current atlas.

asps_geometry_3d_bit_depth_minus1 plus 1 indicates the bit depth of geometry coordinates of the reconstructed volumetric content. asps_geometry_3d_bit_depth_minus1 may be in the range of 0 to 31.

asps_geometry_2d_bit_depth_minus1 plus 1 indicates the bit depth of geometry when projected into 2d images. asps_geometry_2d_bit_depth_minus1 may be in the range of 0 to 31.

asps_attribute_use_fixed_number_of_cameraview_flag may be set to 1 when camera viewpoints are selected for each patch using the method according to the embodiments to generate an attribute video based on the selection, and the number of selected camera viewpoints is the same for all patches in the sequence. On the other hand, when the number of camera viewpoints selected for each patch is applied differently on a per frame, tile, or patch basis, asps_attribute_use_fixed_number_of_cameraview_flag may be set to 0.

asps_attribute_selected_cameraview_count signals the number of selected camera viewpoints when the same number of camera viewpoints are set to be selected for all patches in the sequence. When asps_attribute_selected_cameraview_count is equal to 7, M=7 as described in A. 1), and 7 camera viewpoints are selected for each of the patches in the sequence.

asps_log2_max_atlas_frame_order_cnt_lsb_minus4 specifies the value of the variable MaxAtlasFrmOrderCntLsb that is used in the decoding process for the atlas frame order count as follows: MaxAtlasFrmOrderCntLsb 2asps_log2_max_atlas_frame_order_cnt_lsb_minus4+4. The value of asps_log2_max_atlas_frame_order_cnt_lsb_minus4 may be in the range of 0 to 12.

asps_max_dec_atlas_frame_buffering_minus1 plus 1 specifies the maximum required size of the decoded atlas frame buffer for the CAS in units of atlas frame storage buffers. The value of asps_max_dec_atlas_frame_buffering_minus1 may be in the range of 0 to 15.

asps_long_term_ref_atlas_frames_flag equal to 0 specifies that no long-term reference atlas frame is used for inter prediction of any coded atlas frame in the CAS. asps_long_term_ref_atlas_frames_flag equal to 1 specifies that long term reference atlas frames may be used for inter prediction of one or more coded atlas frames in the CAS.

asps_num_ref_atlas_frame_lists_in_asps specifies the number of the ref list_struct(rlsIdx) syntax structures included in the atlas sequence parameter set. The value of asps_num_ref_atlas_frame_lists_in_asps may be in the range of 0 to 64.

asps_use_eight_orientations_flag equal to 0 specifies that the patch orientation index for a patch with index j in a tile with tile ID equal to i, pdu_orientation_index[i][j] is in the range of 0 to 1, inclusive. asps_use_eight_orientations_flag equal to 1 specifies that pdu_orientation_index[i][j] is in the range of 0 to 7.

asps_extended_projection_enabled_flag equal to 0 specifies that the patch projection information is not signaled for the current atlas tile. asps_extended_projection_enabled_flag equal to 1 specifies that the patch projection information is signaled for the current atlas tile. When asps_extended_projection_enabled_flag is not present, its value is inferred to be equal to 0.

asps_max_number_projections_minus1 plus 1 specifies the maximum value that may be indicated for the patch projection ID syntax element, pdu_projection_id[i][j] for a patch with index j in a tile with tile ID equal to i. When asps_max_number_projections_minus1 is not present, its value is inferred to be equal to 5.

asps_normal_axis_limits_quantization_enabled_flag equal to 1 specifies that quantization parameters shall be signaled and used for quantizing the normal axis related elements of a patch data unit, a merge patch data unit, or an inter patch data unit. When asps_normal_axis_limits_quantization_enabled_flag is equal to 0, no quantization is applied on any normal axis related elements of a patch data unit, a merge patch data unit, or an inter patch data unit.

asps_normal_axis_max_delta_value_enabled_flag equal to 1 specifies that the maximum nominal shift value of the normal axis that may be present in the geometry information of a patch with index i in a frame with index j will be indicated in the bitstream for each patch data unit, a merge patch data unit, or an inter patch data unit. When asps_normal_axis_max_delta_value_enabled_flag is equal to 0, the maximum nominal shift value of the normal axis that may be present in the geometry information of a patch with index i in a frame with index j may not be indicated in the bitstream for each patch data unit, a merge patch data unit, or an inter patch data unit.

asps_patch_precedence_order_flag specifies the patch precedence that is utilized for assigning atlas samples to patches. asps_patch_precedence_order_flag equal to 1 specifies that patch precedence for the current atlas is the same as the decoding order of the patches. asps_patch_precedence_order_flag equal to 0 specifies that patch precedence for the current atlas is the reverse of the decoding order of the patches.

asps_log2_patch_packing_block_size specifies the value of the variable PatchPackingBlockSize, which is used for the horizontal and vertical placement of the patches within the atlas, as follows: $PatchPackingBlockSize=2^{asps\_log2\_patch\_packing\_block\_size}$.

The value of asps_log2_patch_packing_block_size may be in the range of 0 to 7.

asps_patch_size_quantizer_present_flag equal to 1 indicates that the patch size quantization parameters are present in an atlas tile header. When asps_patch_size_quantizer_present_flag is equal to 0, the patch size quantization parameters may not be present.

asps_map_count_minus1 plus 1 indicates the number of maps that may be used for encoding the geometry and attribute data for the current atlas. asps_map_count_minus1 may be in the range of 0 to 15. It may be a requirement of bitstream conformance to this document that asps_map_count_minus1 is equal to vps_map_count_minus1[atlasID], where atlasID is the atlas ID of the current atlas.

asps_pixel_deinterleaving_enabled_flag equal to 1 indicates that the decoded geometry and attribute data may require an additional spatial interpolation process during reconstruction. asps_pixel_deinterleaving_enabled_flag equal to 0 indicates that the decoded geometry and attribute data does not require an additional spatial interpolation process.

asps_map_pixel_deinterleaving_flag[i] equal to 1 indicates that an additional spatial interpolation process needs to be performed on the associated geometry and attribute data of a projected patch in a map with index i in the current atlas.

asps_map_pixel_deinterleaving_flag[i] equal to 0 indicates that no additional spatial interpolation process is performed. When not present, the value of asps_map_pixel_deinterleaving_flag[i] is inferred to be 0.

asps_raw_patch_enabled_flag equal to 1 indicates that the decoded geometry and attribute videos for the current atlas contains information related to RAW coded points. asps_raw_patch_enabled_flag equal to 0 indicates that the decoded geometry and attribute videos do not contain information related to RAW coded points.

asps_eom_patch_enabled_flag equal to 1 indicates that the decoded occupancy video for the current atlas contains information related to whether intermediate depth positions between two depth maps are occupied. asps_eom_patch_enabled_flag equal to 0 indicates that the decoded occupancy video does not contain information related to whether intermediate depth positions between two depth maps are occupied. It may be a requirement of bitstream conformance that if asps_eom_patch_enabled_flag is equal to 1, oi_lossy_occupancy_compression_threshold[atlasID] shall be equal to 0.

asps_eom_fix_bit_count_minus1 plus 1 indicates the size in bits of the EOM codeword. asps_eom_fix_bit_count_minus1 may be in the range of 0 to Min(15, oi_occupancy_2d_bit_depth_minus1[atlasID]−1), where atlasID is the atlas ID of the current atlas.

asps_auxiliary_video_enabled_flag equal to 1 indicates that information associated with RAW and EOM patch types may be placed in auxiliary video sub-bitstreams. asps_auxiliary_video_enabled_flag equal to 0 indicates that information associated with RAW and EOM patch types may only be placed in primary video sub-bitstreams.

It may be a requirement of bitstream conformance that if vps_auxiliary_video_present_flag[atlasID] is equal to 0, where atlasID is the atlas ID of the current atlas, then asps_auxiliary_video_enabled_flag is equal to 0.

asps_plr_enabled_flag equal to 1 indicates that point local reconstruction mode information may be present in the bitstream for the current atlas. asps_plr_enabled_flag equal to 0 indicates that no information related to the point local reconstruction mode is present in the bitstream for the current atlas.

It may be a requirement of bitstream conformance that when asps_pixel_deinterleaving_enabled_flag is equal to 1, asps_plr_enabled_flag shall be equal to 0.

asps_vui_parameters_present_flag equal to 1 specifies that the vui_parameters( ) syntax structure is present. asps_vui_parameters_present_flag equal to 0 specifies that the vui_parameters( ) syntax structure is not present.

asps_extension_present_flag equal to 1 specifies that the syntax elements asps_vpcc_extension_present_flag and asps_extension_7 bits are present in the atlas_sequence_parameter_set_rbsp syntax structure. asps_extension_present_flag equal to specifies that the syntax elements asps_vpcc_extension_present_flag and asps_extension_7 bits are not present.

asps_vpcc_extension_present_flag equal to 1 specifies that the asps_vpcc_extension( ) syntax structure is present in the atlas_sequence_parameter_set_rbsp syntax structure. asps_vpcc_extension_present_flag equal to 0 specifies that this syntax structure is not present. When not present, the value of asps_vpcc_extension_present_flag is inferred to be equal to 0.

asps_extension_7 bits equal to 0 specifies that no asps_extension_data_flag syntax elements are present in the ASPS RBSP syntax structure. When present, asps_extension_7 bits may be equal to 0 in bitstreams conforming to this version of this document. Values of asps_extension_7 bits not equal to 0 may be reserved for future use by ISO/IEC. Decoders shall allow the value of asps_extension_7 bits to other than 0 and may ignore all asps_extension_data_flag syntax elements in an ASPS NAL unit. When not present, the value of asps_extension_7 bits is inferred to be equal to 0.

asps_extension_data_flag may have any value. Its presence and value do not affect decoder conformance to profiles specified in this version of this document. Decoders conforming to this version of this document may ignore all asps_extension_data_flag syntax elements.

FIG. 33 shows another atlas frame parameter set according to embodiments.

afps_atlas_frame_parameter_set_id identifies the atlas frame parameter set for reference by other syntax elements.

afps_atlas_sequence_parameter_set_id specifies the value of asps_atlas_sequence_parameter_set_id for the active atlas sequence parameter set.

afps_attribute_use_fixed_number_of_cameraview_flag is set to 1 when camera viewpoints are selected for each patch using the method according to the embodiments to generate an attribute video based on the selection, and the number of selected camera viewpoints is the same for all patches in the frame. On the other hand, when the number of camera viewpoints selected for each patch is applied differently on a per tile or patch basis, afps_attribute_use_fixed_number_of_cameraview_flag is set to 0.

afps_attribute_selected_cameraview_count signals the number of selected camera viewpoints when the same number of camera viewpoints are set to be selected for all patches in the frame. When afps_attribute_selected_cameraview_count is equal to 7, M=7 for the frame as described above, and 7 camera viewpoints are selected for each of the patches in the frame.

afps_output_flag_present_flag equal to 1 indicates that the ath_atlas_output_flag syntax element is present in the associated tile headers. afps_output_flag_present_flag equal to 0 indicates that the ath_atlas_output_flag syntax element is not present in the associated tile headers.

afps_num_ref_idx_default_active_minus1 plus 1 specifies the inferred value of the variable NumRefIdxActive for the tile with ath_num_ref_idx_active_override_flag equal to 0. The value of afps_num_ref_idx_default_active_minus1 may be in the range of 0 to 14.

afps_additional_lt_afoc_lsb_len specifies the value of the variable MaxLtAtlasFrmOrderCntLsb that is used in the decoding process for reference atlas frame lists as follows: MaxLtAtlasFrmOrderCntLsb=2 (asps_log2_max_atlas_frame_order_cnt_lsb_minus4+4+afps_additional_lt_afoc_lsb_len). The value of afps_additional_lt_afoc_lsb_len may be in the range of 0 to 28 (asps_log2_max_atlas_frame_order_cnt_lsb_minus4), inclusive.

When asps_long_term_ref_atlas_frames_flag is equal to 0, the value of afps_additional_lt_afoc_lsb_len may be equal to 0.

afps_lod_mode_enabled_flag equal to 1 indicates that the LOD parameters may be present in a patch. afps_lod_mode_enabled_flag equal to 0 indicates that the LOD parameters shall not be present in a patch.

afps_raw_3d_offset_bit_count_explicit_mode_flag equal to 1 indicates that the number of bits in the fixed-length representation of rpdu_3d_offset_u[tileID][p], rpdu_3d_offset_v[tileID][p], and rpdu_3d_offset_d[tileID][p] for a patch with index p in a tile with tile ID equal to tileID, is explicitly coded by ath_raw_3d_offset_axis_bit_count_minus1 in the atlas tile header that refers to afps_atlas_frame_parameter_set_id. afps_raw_3d_offset_bit_count_explicit_mode_flag equal to 0 indicates the value of ath_raw_3d_offset_axis_bit_count_minus1 is implicitly derived.

afps_extension_present_flag equal to 1 specifies that the syntax element afps_extension_8 bits is present in the atlas_frame_parameter_set_rbsp syntax structure. afps_extension_present_flag equal to 0 specifies that the syntax element afps_extension_8 bits is not present. The value of afps_extension_present_flag may be 0 in this version of this document.

afps_extension_8 bits equal to 0 specifies that no afps_extension_data_flag syntax elements are present in the AFPS RBSP syntax structure. When present, afps_extension_8 bits may be equal to 0 in bitstreams conforming to this version of this document. Values of afps_extension_8 bits not equal to 0 may be reserved for future use by ISO/IEC. Decoders may allow the value of afps_extension_8 bits to other than 0 and ignore all afps_extension_data_flag syntax elements in an AFPS NAL unit. When not present, the value of afps_extension_8 bits is inferred to be equal to 0.

afps_extension_data_flag may have any value. Its presence and value do not affect decoder conformance to profiles specified in this version of this document. Decoders conforming to this version of this document may ignore all afps_extension_data_flag syntax elements.

FIGS. 34 and 35 show atlas frame tile information according to embodiments.

afti_single_tile_in_atlas_frame_flag equal to 1 specifies that there is only one tile in each atlas frame referring to the AFPS. afti_single_tile_in_atlas_frame_flag equal to 0 specifies that there may be more than one tile in each atlas frame referring to the AFPS.

afti_uniform_partition_spacing_flag equal to 1 specifies that the tile partitioning of an atlas uses a method that distributes column and row partition boundaries uniformly across the atlas frame. The information corresponding to these boundaries is signaled using the syntax elements afti_partition_cols_width_minus1 and afti_partition_rows_height_minus1, respectively. afti_uniform_partition_spacing_flag equal to 0 specifies that the tile partitioning of an atlas uses a method that may result in column and row partition boundaries that may or may not be distributed uniformly across the atlas frame. In this case, these boundaries are signaled using the syntax elements afti_num_partition_columns_minus1 and afti_num_partition_rows_minus1 and a list of syntax element pairs afti_partition_column_width_minus1 and afti_partition_row_height_minus1[i] When not present, the value of afti_uniform_partition_spacing_flag is inferred to be equal to 1.

afti_partition_cols_width_minus1 plus 1 specifies the width of the tile partition columns excluding the right-most tile partition column of the atlas frame when afti_uniform_partition_spacing_flag is equal to 1. When not present, the value of afti_partition_cols_width_minus1 is inferred to be equal to asps_frame_width/64−1.

afti_partition_rows_height_minus1 plus 1 specifies the height of the tile partition rows excluding the bottom tile partition row of the atlas frame in units of 64 samples when afti_uniform_partition_spacing_flag is equal to 1. When not present, the value of afti_partition_rows_height_minus1 is inferred to be equal to asps_frame_height/64−1.

afti_num_partition_columns_minus1 plus 1 specifies the number of tile partition columns used to partition the atlas frame when afti_uniform_partition_spacing_flag is equal to 0. The value of afti_num_partition_columns_minus1 may be in the range of 0 to asps_frame_width/64−1. When afti_single_tile_in_atlas_frame_flag is equal to 1, the value of afti_num_partition_columns_minus1 is inferred to be equal to 0.

afti_num_partition_rows_minus1 plus 1 specifies the number of tile partition rows used to partition the atlas frame when afti_uniform_partition_spacing_flag is equal to 0. The value of afti_num_partition_rows_minus1 may be in the range of 0 to asps_frame_height/64−1, inclusive. When afti_single_tile_in_atlas_frame_flag is equal to 1, the value of afti_num_partition_rows_minus1 is inferred to be equal to 0.

The variable NumPartitionsInAtlasFrame is set equal to NumPartitionColumns*NumPartitionRows.

When afti_single_tile_in_atlas_frame_flag is equal to 0, NumPartitionsInAtlasFrame may be greater than 1.

afti_partition_column_width_minus1[i] plus 1 specifies the width of the i-th tile partition column in units of 64 samples.

afti_partition_row_height_minus1[i] plus 1 specifies the height of the i-th tile partition row in units of 64 samples.

afti_single_partition_per_tile_flag equal to 1 specifies that each tile that refers to this AFPS includes one tile partition. afti_single_partition_per_tile_flag equal to 0 specifies that a tile that refers to this AFPS may include more than one tile partition. When not present, the value of afti_single_partition_per_tile_flag is inferred to be equal to 1.

afti_num_tiles_in_atlas_frame_minus1 plus 1 specifies the number of tiles in each atlas frame referring to the AFPS. The value of afti_num_tiles_in_atlas_frame_minus1 may be in the range of 0 to NumPartitionsInAtlasFrame−1. When not present and afti_single_partition_per_tile_flag is equal to 1, the value of afti_num_tiles_in_atlas_frame_minus1 is inferred to be equal to NumPartitionsInAtlasFrame−1.

afti_top_left_partition_idx[i] specifies the partition index of the tile partition located at the top-left corner of the i-th tile. The value of afti_top_left_partition_idx[i] may be in the range of 0 to NumPartitionsInAtlasFrame−1. When not present, the value of afti_top_left_partition_idx[i] is inferred to be equal to 1. The length of the afti_top_left_partition_idx [i] syntax element is Ceil(Log2(NumPartitionsInAtlasFrame) bits.

afti_bottom_right_partition_column_offset[i] specifies the offset between the column position of the tile partition located at the bottom-right corner of the i-th tile and the column position of the tile partition with partition index equal to afti_top_left_partition_idx[i]. When afti_single_partition_per_tile_flag is equal to 1, the value of afti_bottom_right_partition_column_offset[i] is inferred to be equal to 0.

afti_bottom_right_partition_row_offset[i] specifies the offset between the row position of the tile partition located at the bottom-right corner of the i-th tile and the row position of the tile partition with partition index equal to afti_top_left_partition_idx[i]. When afti_single_partition_per_tile_flag is equal to 1, the value of afti_bottom_right_partition_row_offset[i] is inferred to be equal to 0.

The variables topLeftColumn[i], topLeftRow[i], bottomRightColumn[i], and bottomRightRow[i], which specify the corresponding tile column and row positions for the top left and bottom right tiles in a tile may be computed as follows:

$$topLeftColumn[i]=afti\_top\_left\_partition\_idx[i]\%NumPartitionColumns$$

$$topLeftRow[i]=afti\_top\_left\_partition\_idx[i]/NumPartitionColumns$$

$$bottomRightColumn[i]=topLeftColumn[i]+afti\_bottom\_right\_partition\_column\_offset[i]$$

$$bottomRightRow[i]=topLeftRow[i]+afti\_bottom\_right\_partition\_row\_offset[i]$$

It may be a requirement of bitstream conformance that the values of bottomRightColumn[i] and bottomRightRow[i] shall be less than or equal to (asps_frame_width+63)/64−1 and (asps_frame_height+63)/64−1, respectively.

It may also be a requirement of bitstream conformance that there shall not be a value of j, where j !=i, that satisfies either one of the following properties:

topLeftColumn[i]<=topLeftColumn[j]<=bottomRightColumn[i]

topLeftRow[i]<=topLeftRow[j]<=bottomRightRow[i]

The variables TileOffsetX[i], TileOffsetY[i], TileWidth[i], and TileHeight[i], which specify the horizontal position, vertical position, width, and height of a tile respectively, may be computed, using PartitionWidth[i] and PartitionHeight[j] as follows:

```
TileOffsetX[ i ] = PartitionPosX[ topLeftColumn[ i ] ]
TileOffsetY[ i ] = PartitionPosY[ topLeftColumn[ i ] ]
TileWidth[ i ] = 0
```

-continued

```
TileHeight[ i ] = 0
for( j = topLeftColumn[ i ]; j <= bottomRightColumn[ i ]; j++) {
TileWidth[ i ] += Partition Width[ j ]
}
for( j = topLeftRow[ i ]; j <= bottomRightRow[ i ]; j++) {
TileHeight[ i ] += PartitionHeight[ j ]
}
```

afti_attribute_use_fixed_number_of_cameraview_flag may be set to 1 when camera viewpoints are selected for each patch using the method according to the embodiments to generate an attribute video based on the selection, and the number of selected camera viewpoints is the same for all patches in the tile. On the other hand, when the number of camera viewpoints selected for each patch is applied differently on a per patch basis, afti_attribute_use_fixed_number_of_cameraview_flag may be set to 0.

afti_attribute_selected_cameraview_count[i] indicates the number of selected camera viewpoints in the i-th tile in the current atlas frame when the same number of camera viewpoints are set to be selected for all patches in a tile. When afti_attribute_selected_cameraview_count[i] is equal to 7, M=7 in the tile as described above according to embodiments, and 7 camera viewpoints are selected for each of the patches in the tile.

afti_auxiliary_video_tile_row_width_minus1 plus 1 indicates the nominal width of all auxiliary video sub-bitstreams in units of 64 integer samples. When afti_auxiliary_video_tile_row_width_minus1 is not present, its value may be inferred to be equal to −1.

afti_auxiliary_video_tile_row_height[i] indicates the nominal height in units of 64 integer samples of the i-th vertical sub-region in each auxiliary video sub-bitstream that is associated with the i-th tile of the atlas. When afti_auxiliary_video_tile_row_height[i] is not present, its value may be inferred to be equal to 0.

The height, AuxTileHeight[i] of each auxiliary sub-region associated with the i-th tile of the atlas may be computed as:

$$AuxTileHeight[i]=afti\_auxiliary\_video\_tile\_row\_height[i]*64$$

The vertical position, AuxTileOffset[i] of each auxiliary sub-region associated with the i-th tile of the atlas may be computed as:

$$AuxTileOffset[0]=0$$

$$AuxTileOffset[i]=AuxTileOffset[i]-1+AuxTileHeight[i-1],\ \text{for all } i>0$$

The nominal width, AuxVideoWidthNF, and height, AuxVideoHeightNF, of all auxiliary video sub-bitstreams associated with an atlas may be computed as:

$$AuxVideoWidthNF=(afti\_auxiliary\_video\_tile\_row\_width\_minus1+1)*64$$

$$AuxVideoHeightNF=\Sigma AuxTileHeight[n](n=0\sim N)$$

where N is equal to afti_num_tiles_in_atlas_frame_minus1 afti_signalled_tile_id_flag equal to 1 specifies that the tile ID for each tile is signaled. afti_signalled_tile_id_flag equal to 0 specifies that tile IDs are not signaled.

afti_signalled_tile_id_length_minus1 plus 1 specifies the number of bits used to represent the syntax element afti_tile_id[i] when present, and the syntax element ath_id in a tile header. The value of afti_signalled_tile_id_length_minus1 may be in the range of 0 to 15. When not present, the value of afti_signalled_tile_id_length_minus1 is inferred to be equal to Ceil(Log2(afti_num_tiles_in_atlas_frame_minus1+1))−1.

afti_tile_id[i] specifies the tile ID of the i-th tile. The length of the afti_tile_id[i] syntax element is afti_signalled_tile_id_length_minus1+1 bits. When not present, the value of afti_tile_id[i] may be inferred to be equal to 1, for each i in the range of 0 to afti_num_tiles_in_atlas_frame_minus1. It may be a requirement of bitstream conformance that afti_tile_id[i] shall not be equal to afti_tile_id[j] for all i !=j. The length of the afti_tile_id[i] syntax element is afti_signalled_tile_id_length_minus1+1 bits.

The variable FirstTileID may be computed as follows:

FirstTileID=afti_tile_id[0]

for (i=1; i<afti_num_tiles_in_atlas_frame_minus1+1; i++)

FirstTileID=Min(FirstTileID,afti_tile_id[*i*])

The arrays TileIDToIndex and TileIndexToID provide forward and inverse mapping, respectively, of the ID associated with each tile and the order index of how each tile is specified in the atlas frame tile information syntax.

FIG. 36 shows an atlas adaptation parameter according to embodiments.

aaps_atlas_adaptation_parameter_set_id may identify the atlas adaptation parameter set for reference by other syntax elements.

When aaps_attribute_use_fixed_number_of_camerview_flag is to be defined in the atlas_adaptation_parameter_set_rbsp syntax while the same number of camera viewpoints are set to be selected for all patches in a tile unit referring to atlas_adaptation_parameter_set_rbsp syntax in the case where camera viewpoints are selected for each patch using the method according to the embodiments to generate an attribute video based on the selection, aaps_attribute_use_fixed_number_of_camerview_flag is signaled as 1. On the other hand, when the number is applied differently on a per frame, tile, or patch basis, and the value of aaps_attribute_use_fixed_number_of_camerview_flag is defined in another syntax structure, the value is signaled as 0.

aaps_attribute_selected_camerview_count may signal the number of selected camera viewpoints when the same number of camera viewpoints are set to be selected for all patches in the tile unit referring to the atlas_adaptation_parameter_set_rbsp syntax. When aaps_attribute_selected_camerview_count is equal to 7, M=7 as described according to embodiments, and 7 camera viewpoints are selected for each of the patches in the tile.

aaps_log2_max_afoc_present_flag equal to 1 specifies that the syntax element aaps_log2_max_atlas_frame_order_cnt_lsb is present in atlas_adaptation_parameter_set_rbsp syntax structure. aaps_log2_max_afoc_present_flag equal to 0 specifies that syntax element aaps_log2_max_atlas_frame_order_cnt_lsb is not present.

aaps_log2_max_atlas_frame_order_cnt_lsb_minus4 may specify the value of the variable MaxAtlasFrmOrderCntLsb that is used in the decoding process for frame order count as follows:

MaxAtlasFrmOrderCntLsb=2^(aaps_log2_max_atlas_frame_order_cnt_lsb_minus4+4)

The value of aaps_log2_max_atlas_frame_order_cnt_lsb_minus4 may be in the range of 0 to 12. It is required for bitstream conformance that the value of MaxAtlasFrmOrderCntLsb be the same for all atlas sub-bitstreams in CVS.

aaps_extension_present_flag equal to 1 specifies that the syntax elements aaps_vpcc_extension_present_flag and aaps_extension_7 bits are present in the atlas_adaptation_parameter_set_rbsp syntax structure. aaps_extension_present_flag equal to 0 specifies that the syntax elements aaps_vpcc_extension_present_flag and aaps_extension_7 bits are not present.

aaps_vpcc_extension_present_flag equal to 1 specifies that the aaps_vpcc_extension( ) syntax structure is present in the atlas_adaptation_parameter_set_rbsp syntax structure. aaps_vpcc_extension_present_flag equal to 0 specifies that this syntax structure is not present. When not present, the value of aaps_vpcc_extension_present_flag may be inferred to be equal to 0.

aaps_extension_7 bits equal to 0 specifies that no aaps_extension_data_flag syntax elements are present in the AAPS RBSP syntax structure. When present, aaps_extension_7 bits may be equal to 0 in bitstreams conforming to this version of this document. Values of aaps_extension_7 bits not equal to 0 are reserved for future use by ISO/IEC. Decoders may allow the value of aaps_extension_7 bits to other than 0 and may ignore all aaps_extension_data_flag syntax elements in an AAPS NAL unit. When not present, the value of aaps_extension_7 bits may be inferred to be equal to 0.

aaps_extension_data_flag may have any value. Its presence and value do not affect decoder conformance to profiles specified in this version of this document. Decoders conforming to this version of this document may ignore all aaps_extension_data_flag syntax elements.

FIG. 37 shows patch information data according to embodiments.

Depending on the patch mode, patch information suitable for the patch mode may be delivered as shown in FIG. 37.

FIGS. 38 and 39 show a patch data unit according to embodiments.

pdu_2d_pos_x[tileID][p] specifies the x-coordinate of the top-left corner of the patch bounding box for patch p in the current atlas tile. The tile ID may be equal to tileID, expressed as a multiple of PatchPackingBlockSize.

pdu_2d_pos_y[tileID][p] specifies the y-coordinate of the top-left corner of the patch bounding box for patch p in the current atlas tile. The tile ID may be equal to tileID, expressed as a multiple of PatchPackingBlockSize.

pdu_2d_size_x_minus1[tileID][p] plus 1 specifies the quantized width value of the patch with index p in the current atlas tile, with tile ID equal to tileID.

pdu_2d_size_y_minus1[tileID][p] plus 1 specifies the quantized height value of the patch with index p in the current atlas tile, with tile ID equal to tileID.

pdu_3d_offset_u[tileID][p] specifies the shift to be applied to the reconstructed patch points in patch with index p of the current atlas tile, with tile ID equal to tileID, along the tangent axis. The value of pdu_3d_offset_u[tileID][p] may be in the range of 0 to 2^(asps_geometry_3d_bit_depth_minus1+1)−1, inclusive. The number of bits used to represent pdu_3d_offset_u[tileID][p] may be asps_geometry_3d_bit_depth_minus1+1.

pdu_3d_offset_v[tileID][p] specifies the shift to be applied to the reconstructed patch points in the patch with index p of the current atlas tile, with tile ID equal to tileID, along the bi-tangent axis. The value of pdu_3d_offset_v[tileID][p] may be in the range of 0 to 2^(asps_geometry_3d_bit_depth_minus1+1)−1, inclusive.

The number of bits used to represent pdu_3d_offset_v [tileID][p] is asps_geometry_3d_bit_depth_minus1+1.

pdu_3d_offset_d[tileID][p] specifies the shift to be applied to the reconstructed patch points in the patch with index p of the current atlas tile, with tile ID equal to tileID, along the normal axis, Pdu3dOffsetD[tileID][p], as follows: Pdu3dOffsetD[tileID][p]=pdu_3d_offset_d[tileID][p] <<ath_pos_min_d_quantizer.

The value of Pdu3dOffsetD[tileID][p] may be in the range of 0 to 2^(asps_geometry_3d_bit_depth_minus1+1)−1, inclusive.

The number of bits used to represent pdu_3d_offset_d [tileID][p] is equal to (asps_geometry_3d_bit_depth_minus1−ath_pos_min_d_quantizer+1).

pdu_3d_range_d[tileID][p], if present, specifies the nominal maximum value of the shift expected to be present in the reconstructed bit depth patch geometry samples, after conversion to their nominal representation, in the patch with index p of the current atlas tile, with tile ID equal to tileID, along the normal axis, Pdu3dRangeD[tileID][p], as follows:

```
if( pdu_3d_range_d[ tileID ][ p ] == 0 )
Pdu3dRangeD[ tileID ][ p ] = 0
else {
range = pdu_3d_range_d[ tileID ][ p ] <<
ath_pos_delta_max_d_quantizer
Pdu3dRangeD[ tileID ][ p ] = range − 1
}
```

The variable rangeDBitDepth may be set equal to Min (asps_geometry_2d_bit_depth_minus1, asps_geometry_3d_bit_depth_minus1)+1. When pdu_3d_range_d[tileID][p] is not present, the value of Pdu3dRangeD[ ]−[tileID][pDB may be assumed to be equal to Pdu3dRangeD[ ]−[pDB]. When present, the value of Pdu3dRangeD[tileID][p] may be in the range of 0 to 2^(rangeDBitDepth)−1, inclusive.

The number of bits used to represent pdu_3d_range_d [tileID][p] may be equal to (rangeDBitDepth−ath_pos_delta_max_d_quantizer).

pdu_projection_id[tileID][p] specifies the values of the projection mode and of the index of the normal to the projection plane for the patch with index p of the current atlas tile, with tile ID equal to tileID. The value of pdu_projection_id[tileID][p] may be in the range of 0 to asps_max_number_projections_minus1.

The number of bits used to represent pdu_projection_id [tileID][p] may be Ceil(Log2(asps_max_number_projections_minus1+1)).

pdu_orientation_index[tileID][p] specifies the patch orientation index, for the patch with index p of the current atlas tile, with tile ID equal to tileID, used to determine the transformation matrices, $R_o$ and $R_s$, as indicated in Table 11, that are to be used to transform atlas coordinates of a patch to a local patch coordinate system denoted by coordinates (u, v), before conversion to 3D space coordinates. The number of bits used to represent pdu_orientation_index[tileID][p] is (asps_use_eight_orientations_flag? 3:1).

pdu_attribute_selected_cameraview_count [tileID][p]: When asps_attribute_use_fixed_number_of_cameraview_flag, afps_attribute_use_fixed_number_of_c_ameraview_flag, aps_attribute_use_fixed_number_of_c_amerview_flag, and afti_attribute_use_fixed_number_of_cameraview_flag are all signaled as 0, this indicates that the number of camera viewpoints selected for each patch is determined differently for each patch. In this case, the syntax pdu_attribute_selected_cameraview_count[tileID][p] signals the number of camera viewpoints selected for the p-th patch in the current atlas tile with tile ID equal to tileID.

pdu_attr_selected_cameraview [j] signals the information about each camera viewpoint for the current patch according to the number of selected camera viewpoints. This syntax represents the information about the j-th camera viewpoint, and the value thereof may be the index of the camera viewpoint or may be another distinguishable factor.

pdu_lod_enabled_flag[tileID][p] specifies the patch orientation index, for the patch with index p of the current atlas tile, with tile ID equal to tileID, used to determine the transformation matrices, $R_o$ and $R_s$, as indicated in Table 11, that are to be used to transform atlas coordinates of a patch to a local patch coordinate system denoted by coordinates (u, v), before conversion to 3D space coordinates. The number of bits used to represent pdu_orientation_index[tileID][p] is (asps_use_eight_orientations_flag? 3:1).

pdu_lod_scale_x_minus1 [tileID][p] specifies the LOD scaling factor to be applied to the local x coordinate of a point in a patch with index p of the current atlas tile, with tile ID equal to tileID, prior to addition of the tile ID to the patch coordinate TilePatch3dOffsetU[tileID][p]. When pdu_lod_scale_x_minus1 [tileID][p] is not present, its value may be inferred to be equal to 0.

pdu_lod_scale_y_idc[tileID][p] indicates the LOD scaling factor to be applied to the local y coordinate of a point in a patch with index p of the current atlas tile, with tile ID equal to tileID, prior to addition of the tile ID to the patch coordinate TilePatch3dOffsetV[tileID][p]. When pdu_lod_scale_y_idc[tileID][p] is not present, its value may be inferred to be equal to 0.

FIG. 40 illustrates a V-PCC point cloud data transmission device according to embodiments.

The point cloud data transmission method/device according to the embodiments of FIG. 40 may correspond to the transmission device 10000 in FIG. 1, the point cloud video encoder 10002 in FIG. 1, the encoding process in FIG. 4, the video/image encoder in FIG. 15, the transmission device in FIG. 18, the XR device 1730 in FIG. 20, and the like. Each component of the transmission method/device may correspond to hardware, software, a processor connected to a memory, and/or a combination thereof.

When the SLF sequence data is input, the transmitter of FIG. 40 generates patches for the input point cloud through a patch generator 400000 as in the operation in V-PCC. For the generated patches, a camera viewpoint containing the most significant color information for each patch is selected by a patch-by-patch camera viewpoint selector 400001. The viewpoint selector 400001 may select a viewpoint by selecting method 1 for patch-by-patch camera viewpoint selection or method 2 for patch-by-patch camera viewpoint selection according to the embodiments. The geometry image and the occupancy map generated for the input point cloud may be the same as those in V-PCC.

A geometry image generator 400003 generates a geometry image from geometry data of the point cloud data.

A patch packer 400002 packs each generated patch onto a 2D image. Based on the patch packing result, the proposed texture video is generated. In this operation, a single texture video may be generated by reflecting the camera viewpoint information selected for each patch, or multiple texture videos may be generated by a patch-by-patch camera viewpoint-based texture image generator 400004.

When multiple texture videos are generated, the number of generated videos is determined according to the case where the largest number of camera viewpoints is selected. The texture image generator 400004 may determine whether a single texture video or multiple texture videos are to be generated, and the device/user may select one of texture video generation method 1 and texture video generation method 2 according to the embodiments to generate a texture video. The texture video generated in this way is compressed together with the geometry video or the occupancy map using a 2D video codec, and then transmitted. The selection methods used in generating texture videos are signaled as auxiliary information and transmitted together.

The encoding pre-processor may receive a geometry image and single or multiple texture images (attributes), and perform pre-processing required for encoding.

The video encoder may encode geometry data and/or attribute data. The encoded geometry data may be reconstructed by the geometry reconstructor and used for attribute encoding. The smoother may apply processing such as filtering to the reconstructed geometry data and transmit the result to the texture image generator.

The metadata encoder may encode auxiliary patch information related to the geometry data (geometry image), attribute data (texture image), and occupancy map.

The auxiliary patch information may be generated by the viewpoint selector 400001.

The multiplexer may multiplex the encoded geometry data, attribute data, occupancy map, and auxiliary patch information into a bitstream.

The transmitter may transmit the encoded point cloud data.

Components of the transmission device of FIG. 40 may correspond to components of the transmission device of FIG. 18 and the like.

The viewpoint selector 400001 may be connected to the patch generator or included in the patch generator.

The texture image generator 400004 may be included in or connected to the patch packer 400002 and/or the viewpoint selector 400001, and may be connected to the encoder of the transmission device by a packing-related preprocessor (processor).

The point cloud data reception device according to the embodiments may reconstruct point cloud data based on a reverse process of the transmission device.

The geometry video, texture (attribute) video, occupancy map video, and auxiliary information data input to the receiver (the reception device 10005, the point cloud video decoder 10008 in FIG. 2, the decoding process in FIG. 16, the video/image decoder in FIG. 17, the reception device in FIG. 19, the XR device 1730 in FIG. 20, and the like, wherein each component of the reception method/device may correspond to hardware, software, a processor connected to a memory, and/or a combination thereof) are each decoded to reconstruct the corresponding information, thereby reconstructing the point cloud of the SLF sequence.

The color information related to camera viewpoints representing each point may be reconstructed based on the reconstructed texture video. Thereby, the color information related to the SLF sequence may be reconstructed or only color information suitable for the purpose may be selected and used.

Camera viewpoint information corresponding to each patch in each video may be known from the reconstructed auxiliary information, may be used to apply corresponding reconstructed color information according to the currently required camera viewpoint condition in point cloud rendering. In the case where the currently required camera viewpoint does not match the camera viewpoint that the target point has, the color information related to a possessed camera viewpoint located closest to the required camera viewpoint may be used.

Accordingly, the user may select and decode only some texture video bitstreams having a high importance among a plurality of texture video bitstreams according to circumstances. Alternatively, when several texture videos are merged into a single texture video to be transmitted, only the bitstream part of a region corresponding to the required texture video may be extracted, decoded, and utilized. To this end, a function (e.g., the MCTS function of HEVC) capable of independently decoding a partial region of the texture video at the transmitting side may be applied for compression.

The existing method [2] of compressing SLF data using V-PCC requires multiple video codec instances and high memory usage to compress multiple attribute video data generated in the encoding process. The other method [3] proposed to address this issue may cause excessive data reduction, resulting in significantly degraded image quality/performance.

The compression/reconstruction method according to the embodiments may address the issue caused by the SLF sequence compression method and obtain more efficient compression performance. The efficiency of image quality and compression performance may be improved by selecting only significant camera viewpoints for the point cloud group divided into patches and transmitting only color information obtained from the corresponding camera viewpoints. The two methods of selecting significant camera viewpoints on a patch-by-patch basis are proposed to allow suitable color information to be transmitted, reconstructed, and utilized according to the user's purpose of use.

In addition, a method of generating attribute video based on camera viewpoint information selected on a patch-by-patch basis. Since not all color information is transmitted, SLF data may be compressed at a higher compression ratio. Furthermore, by merging attribute videos generated according to the user's selection into one video to be transmitted, the number of required codec instances may be minimized, thereby reducing coding complexity.

The selected camera viewpoint related information and the transmitted attribute video related information are signaled such that the information on the method carried out on the transmitting side and the receiving side may be checked. Thus, the receiving side may selectively reconstruct only necessary attribute video according to the user's purpose or use color information suitable for the direction in which rendering is to be performed based on all the reconstructed color information.

Therefore, the proposed method may provide improved performance compared to the V-PCC-based SLF sequence data compression method in terms of coding complexity, compression ratio, color image quality, and color information utilization.

Operations according to embodiments described in the present disclosure may be performed by a transmission/reception device including a memory and/or a processor according to embodiments. The memory may store programs (flow charts, etc.) for processing/controlling operations according to embodiments, and the processor may control various operations described in this document. The processor may be referred to as a controller or the like. The operations in the embodiments may be performed by firmware, software, and/or a combination thereof. The firmware, software, and/or combination thereof may be stored in the processor or the memory.

When compressing a Surface Light Field (SLF) data set having more attribute attributes than a general point cloud data set using V-PCC, the method/device according to the embodiments may transmit a valid camera viewpoint information for each object included in the SLF data set, such that performance of point cloud reconstruction for each object is improved at the receiving side.

In the case of compressing an SLF sequence including multiple objects with V-PCC, a method for improving performance of point cloud reconstruction for each object and enabling selective use of a camera viewpoint at the receiving side is provided. It is related to a method of signaling a significant camera viewpoint for each object among camera viewpoints constituting SLF sequence data in the V-PCC by an SEI message.

A method/device according to embodiments is intended to address the following issue. Assuming that there is one object in the SLF sequence, the method/device is intended to remove the restriction mainly focusing on the compression method.

Consider a case where multiple objects are present in an SLF sequence. In this case, there may be a camera viewpoint from which attribute information cannot be obtained because the object is occluded by other adjacent objects. For a camera viewpoint from which attribute information about an object has not been obtained, the value is predicted based on the attribute information obtained from other camera viewpoints and is transmitted as its own attribute information. However, if the predicted attribute information, namely, the processed attribute information is used in reconstructing attribute values of other viewpoints at the receiving side, it may affect the degradation in image quality of the reconstructed point cloud. Therefore, in the present disclosure, by excluding processed information and reconstructing attributes based only on accurate information, preventing unnecessary degradation in the reconstructed image quality may be prevented.

Provided herein are a method of transmitting available camera viewpoint information for each object when the method/device according to the embodiments codes an SLF sequence including multiple objects using V-PCC, and a related signaling method.

By using significant camera viewpoints for each object rather than comprehensive camera viewpoint information, performance degradation related to reconstructed image quality may be minimized.

Based on valid camera viewpoint information for each object, selective use of camera viewpoints may be facilitated at the receiving side.

Figure 41:
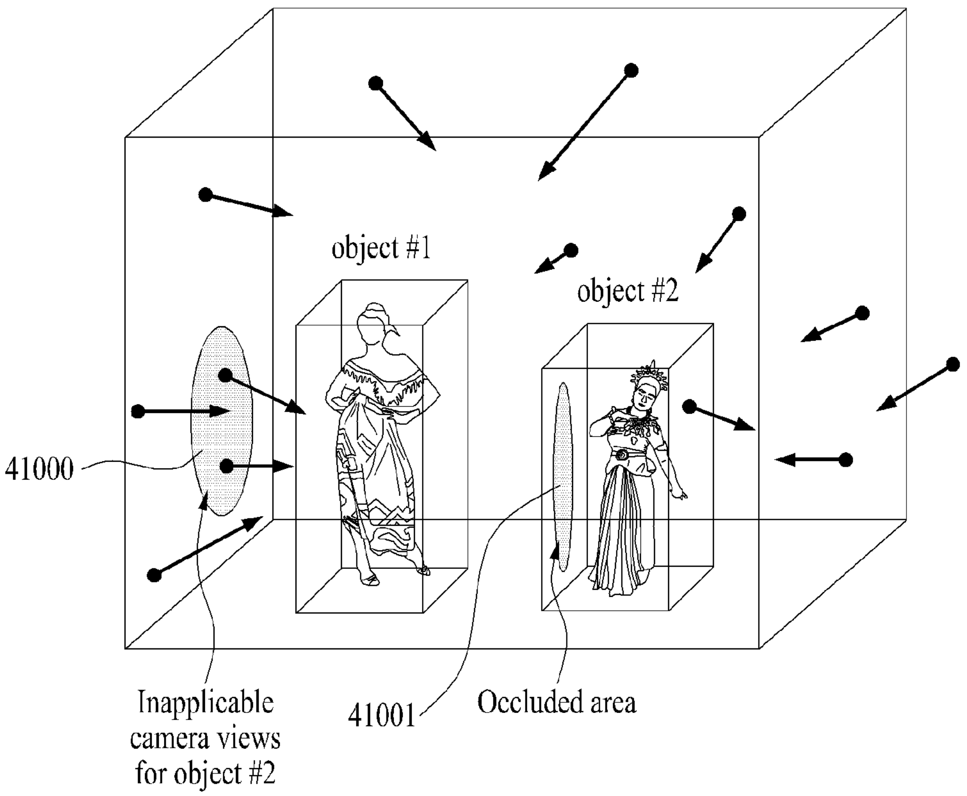
FIG. 41 illustrates an example of an SLF data set including multiple objects according to embodiments.

FIG. 41 illustrates an example of an SLF data set including multiple objects according to embodiments.

The method/device according to the embodiments may compress and reconstruct point cloud data about multiple objects, such as object #1 and object #2.

The arrows in FIG. 41 indicate different multiple camera views.

As shown in FIG. 41, the SLF data set includes all attribute information about each point acquired from multiple camera viewpoints as data. The SLF data set generated in this way is compressed and transmitted through V-PCC. When the SLF data set includes multiple objects, there may be a camera viewpoint from which attribute information cannot be obtained because the corresponding object is occluded by other adjacent objects, as illustrated in FIG. 41.

Object #2, the object on the right side in FIG. 41, is occluded by object #1, namely the left object, and thus there are two camera viewpoints from which information cannot be obtained (41000). As a result, attribute information related to points included in the area marked as an occluded area of object #2 may not be acquired through these two camera viewpoints.

Similarly, object #1 is occluded by object #2, resulting in a camera viewpoint area 41001 from which information cannot be obtained.

However, when an SLF data set is generated, a value processed based on attribute information obtained from other applicable camera viewpoints may be used in place of the attribute information that is not obtained as described above. The data set generated in this way is transmitted through V-PCC and used for point cloud reconstruction. The processed attribute information may replace unobtained information. However, reconstructing attribute values of other neighbor points based on this processed information may result in lowered accuracy of data, which may cause deterioration of the reconstructed image quality.

In order to minimize such unnecessary deterioration of image quality, the present disclosure proposes a method of additionally signaling and transmitting information on available camera viewpoints for each object such that only unprocessed, directly acquired data may be used in reconstructing attribute information about a point. In the proposed method, for all objects included in the SLF sequence, a method of transmitting applicable camera viewpoint information for each object in the SEI message is proposed. The information included in the SEI message includes the number of valid camera viewpoints for each object and index information for identifying each camera viewpoint.

Information related to the occluded area according to embodiments is signaled in a scene object information SEI message in the volumetric annotation SEI message family of V-PCC (see FIGS. 42 to 47).

A device for transmitting point cloud data according to embodiments may generate information as shown in FIGS. 42 to 47, and transmit a bitstream containing the same to a reception device.

A device for receiving point cloud data according to embodiments may receive the bitstream containing the point cloud data, and decode the point cloud data (geometry data, attribute data, an occupancy map, etc.) contained in the bitstream based on the information of FIGS. 42 to 47 contained in the bitstream.

FIGS. 42 to 47 show a scene object information SEI message syntax included in a volumetric annotation SEI message family syntax according to embodiments.

This scene object information SEI message defines a set of objects that may be present in a volumetric scene, and optionally assigns different properties to these objects. These objects may then potentially be associated with different types of information, including patches and 2D volumetric rectangles that may be defined using the patch information and volumetric rectangle information SEI messages.

At the start of each sequence, let ObjectTracked[k]=0, where k corresponds to an object index and is in the range of 0 to $2^{32}-1$. ObjectTracked[k] equal to 0 indicates that all related parameters, including the object label, 3D bounding box parameters, priority information, hidden flag, dependency information, visibility cones, collision shapes, point style, and material id, contains their default values.

Object index limits may be further specified by an application to constrain the required memory.

soi_persistence_flag specifies the persistence of the scene object information SEI message for the current layer.

soi_persistence_flag equal to 0 specifies that the scene object information SEI message applies to the current decoded atlas frame only.

Let aFrmA be the current atlas frame. soi_persistence_flag equal to 1 may specify that the scene object information SEI message persists for the current layer in output order until any of the following conditions are true:

A new CAS begins;

The bitstream ends.

An atlas frame aFrmB in the current layer in a coded atlas access unit containing a scene object information SEI message with the same value of soi_persistence_flag and applicable to the current layer is output for which AtlasFrmOrderCnt(aFrmB) is greater than AtlasFrmOrderCnt(aFrmA), where AtlasFrmOrderCnt(aFrmB) and AtlasFrmOrderCnt (aFrmA) are the AtlasFrmOrderCntVal values of aFrmB and aFrmA, respectively, immediately after the invocation of the decoding process for atlas frame order count for aFrmB.

soi_reset_flag indicates that the information corresponding to this scene object information SEI message is reset to its default values.

soi_num_object_updates indicates the number of objects that are to be updated by the current SEI. The value of soi_num_object_updates may be in the range from 0 to $2^{32}-1$. The default value of soi_num_object_updates is 0.

soi_simple_objects_flag equal to 1 indicates that no additional information for an updated or newly introduced object will be signaled. soi_simple_objects_flag equal to 0 indicates that additional information for an updated or newly introduced object may be signaled.

soi_object_label_present_flag equal to 1 indicates that object label information is present in the current scene object information SEI message. soi_object_label_present_flag equal to 0 indicates that object label information is not present.

soi_priority_present_flag equal to 1 indicates that priority information is present in the current scene object information SEI message. soi_priority_present_flag equal to 0 indicates that priority information is not present.

soi_object_hidden_present_flag equal to 1 indicates that hidden object information is present in the current scene object information SEI message. soi_object_hidden_present_flag equal to 0 indicates that hidden object information is not present.

soi_object_dependency_present_flag equal to 1 indicates that object dependency information is present in the current scene object information SEI message. soi_object_dependency_present_flag equal to 0 indicates that object dependency information is not present.

soi_visibility_cones_present_flag equal to 1 indicates that visibility cones information is present in the current scene object information SEI message. soi_visibility_cones_present_flag equal to 0 indicates that visibility cones information is not present.

soi_3d_bounding_box_present_flag equal to 1 indicates that 3D bounding box information is present in the current scene object information SEI message. soi_3d_bounding_box_present_flag equal to 0 indicates that 3D bounding box information is not present.

soi_collision_shape_present_flag equal to 1 indicates that collision information is present in the current scene object information SEI message.

soi_collision_shape_present_flag equal to 0 indicates that collision shape information is not present.

soi_point_style_present_flag equal to 1 indicates that point style information is present in the current scene object information SEI message. soi_point_style_present_flag equal to 0 indicates that point style information is not present.

soi_material_id_present_flag equal to 1 indicates that material ID information is present in the current scene object information SEI message. soi_material_id_present_flag equal to 0 indicates that material ID information is not present.

soi_extension_present_flag equal to 1 indicates that additional extension information shall be present in the current scene object information SEI message. soi_extension_present_flag equal to 0 indicates that additional extension information is not present. It is a requirement of bitstream conformance to this version of this document that soi_extension_present_flag shall be equal to 0.

soi_object_cameraview_present_flag equal to 1 indicates that camera viewpoint information for each object is present in the current scene object information SEI message. When the flag is equal to 0, the information is not present.

soi_3d_bounding_box_scale_log2 indicates the scale to be applied to the 3D bounding box parameters that may be specified for an object.

soi_3d_bounding_box_precision_minus8 plus 8 indicates the precision of the 3D bounding box parameters that may be specified for an object.

soi_log2_max_object_idx_updated_minus1 plus 1 specifies the number of bits used to signal the value of an object index in the current scene object information SEI message.

soi_log2_max_object_dependency_idx specifies the number of bits used to signal the value of a dependency object index in the current scene object information SEI message. The default value of soi_log2_max_object_dependency_idx is equal to 0.

soi_object_idx[i] indicates the object index of the i-th object to be updated. The number of bits used to represent soi_object_idx[i] is equal to soi_log2_max_object_idx_updated_minus1+1. When soi_object_idx[i] is not present in the bitstream, its value may be inferred to be equal to 0.

soi_object_cancel_flag[i] equal to 1 indicates that the object with index equal to i shall be canceled and that the variable ObjectTracked[i] shall be set to 0. Furthermore, the object label, 3D bounding box parameters, priority information, hidden flag, dependency information, visibility cones, collision shapes, point style, and material id will be reset to their default values. soi_object_cancel_flag equal to 0 indicates that the object with index equal to soi_object_idx[i] shall be updated with information that follows this element and that that the variable ObjectTracked[i] shall be set to 1.

soi_object_label_update_flag[i] equal to 1 indicates that object label update information is present for an object with object index i. soi_object_label_update_flag[i] equal to 0 indicates that object label update information is not present.

soi_object_label_idx[i] indicates the label index of an object with index i. The value of soi_object_label_idx[i] may be in the range from 0 to $2^{32}-1$.

soi_priority_update_flag[i] equal to 1 indicates that priority update information is present for an object with object index i. soi_priority_update_flag[i] equal to 0 indicates that object priority information is not present.

soi_priority_value[i] indicates the priority of an object with index i. The lower the priority value, the higher the priority. The default value of soi_priority_value[i] is 0.

soi_object_hidden_flag[i] equal to 1 indicates that the object with index i shall be hidden. soi_object_hidden_flag [i] equal to 0 indicates that the object with index i shall become present.

soi_object_dependency_update_flag[i] equal to 1 indicates that object dependency update information is present for an object with object index i. soi_object_dependency_update_flag[i] equal to 0 indicates that object dependency update information is not present.

soi_object_num_dependencies[i] indicates the number of dependencies of object with index i.

soi_object_dependency_idx[i][j] indicates the index of the j-th object that has a dependency with the object with object index i.

soi_visibility_cones_update_flag[i] equal to 1 indicates that visibility cones update information is present for an object with object index i. soi_visibility_cones_update_flag[i] equal to 0 indicates that visibility cones update information is not present.

soi_direction_x[i] indicates the normalized x-component value of the direction vector for the visibility cone of an object with object index i. The value of soi_direction_x[i], when not present, is inferred to be equal to 1.0. The default value of soi_direction_x[i] is equal to 1.0.

soi_direction_y[i] indicates the normalized y-component value of the direction vector for the visibility cone of an object with object index i. The value of soi_direction_y[i], when not present, is inferred to be equal to 1.0. The default value of soi_direction_y[i] is equal to 1.0.

soi_direction_z[i] indicates the normalized z-component value of the direction vector for the visibility cone of an object with object index i. The value of soi_direction_z[i], when not present, is inferred to be equal to 1.0. The default value of soi_direction_z[i] is equal to 1.0.

soi_angle[i] indicates the angle of the visibility cone along the direction vector in degrees. The value of soi_angle[i], when not present, is inferred to be equal to 180. The default value of soi_angle[i] is equal to 180.

soi_3d_bounding_box_update_flag[i] equal to 1 indicates that 3D bounding box information is present for an object with object index i. soi_3d_bounding_box_update_flag[i] equal to 0 indicates that 3D bounding box information is not present.

soi_3d_bounding_box_x[i] indicates the x coordinate value of the origin position of the 3D bounding box of an object with index i. The default value of soi_3d_bounding_box_x[i] is equal to 0.

soi_3d_bounding_box_y[i] indicates the y coordinate value of the origin position of the 3D bounding box of an object with index i. The default value of soi_3d_bounding_box_y[i] is equal to 0.

soi_3d_bounding_box_z[i] indicates the z coordinate value of the origin position of the 3D bounding box of an object with index i. The default value of soi_3d_bounding_box_z[i] is equal to 0.

soi_3d_bounding_box_delta_x[i] indicates the size of the bounding box on the x axis of an object with index i. The default value of soi_3d_bounding_box_delta_x[i] is equal to 0.

soi_3d_bounding_box_delta_y[i] indicates the size of the bounding box on the y axis of an object with index i. The default value of soi_3d_bounding_box_delta_y[i] is equal to 0.

soi_3d_bounding_box_delta_z[i] indicates the size of the bounding box on the z axis of an object with index i. The default value of soi_3d_bounding_box_delta_z[i] is equal to 0.

soi_collision_shape_update_flag[i] equal to 1 indicates that collision shape update information is present for an object with object index i. soi_collision_shape_update_flag[i] equal to 0 indicates that collision shape update information is not present.

soi_collision_shape_id[i] indicates the collision shape ID of an object with index i. The collision shape ID is identified through means outside this document. The default value of soi_collision_shape_id[i] is equal to 0.

soi_point_style_update_flag[i] equal to 1 indicates that point style update information is present for an object with object index i. soi_point_style_update_flag[i] equal to 0 indicates that point style update information is not present.

soi_point_shape_id[i] indicates the point shape ID of an object with index i. The default value of soi_point_shape_id[i] is equal to 0. The value of soi_point_shape_id[i] may be in the range of 0 to 2, inclusive in bitstreams conforming to this version of this document. Other values of soi_point_shape_id[i] may be reserved for future use by ISO/IEC. Decoders conforming to this version of this document may ignore reserved values of soi_point_shape_id[i].

Among the values of soi_point_shape_id[i], 0 may indicate circle, 1 may indicate square, and 2 may indicate diamond. 3 to 255 may be reserved.

soi_point_size[i] indicates the point size of an object with index i. The default value of soi_point_size[i] is equal to 1.

soi_material_id_update_flag[i] equal to 1 indicates that material ID update information is present for an object with object index i. soi_point_style_update_flag[i] equal to 0 indicates that point style update information is not present.

soi_material_id[i] indicates the material ID of an object with index i. The default value of soi_material_id[i] is equal to 0. The material ID is identified through means outside this document.

soi_object_cameraview_update_flag[i] equal to 1 indicates that camera viewpoint update information is present for the i-th object. soi_object_cameraview_update_flag[i] equal to 0 indicates that the information is not present.

soi_object_num_cameraviews[i] indicates the number of valid camera viewpoints for the i-th object.

soi_object_cameraview_idx[i][j] indicates the index of the j-th camera viewpoint among valid camera viewpoints for the i-th object. Alternatively, the index may be replaced with the value of other information capable of distinguishing the camera viewpoints.

A point cloud data transmission method/device according to embodiments may encode and transmit point cloud data as follows.

When there is no area where the current object is occluded by adjacent objects in generating an SLF data set, it is determined that the attribute of the object is obtainable through all existing camera viewpoints, and the corresponding camera viewpoint information is transmitted using the proposed SEI message. However, when the attribute information is not obtainable from the camera viewpoints directed in the corresponding direction due to an area occluded by adjacent objects (see FIG. 41), these camera viewpoints may be excluded, and then only the information about the remaining applicable camera viewpoints is transmitted by the SEI message of the object (see FIGS. 42 to 47).

Here, whether a camera viewpoint is occluded is determined by considering only the occlusion situation caused by another object, not the situation where the camera viewpoint is occluded due to the point area present in the same object.

A point cloud data transmission method/device according to embodiments may receive and decode point cloud data as follows.

Through the SEI message contained in the received bitstream, applicable camera viewpoint information for each object may be identified for an SLF sequence including multiple objects. Unlike the method of reconstructing attribute information based on all camera viewpoint information without differentiating objects, the camera viewpoint information that is applicable for each object may be identified through the method according to the embodiment, and attribute data is reconstructed based thereon. In the proposed method, processed information is excluded in data reconstruction, and therefor unnecessary degradation of image quality may be prevented.

In addition, based on the information contained in the received bitstream, camera viewpoints may be selectively utilized for each object according to the user's intention. For example, when a user intends to reconstruct data only for a specific side of a target object, camera viewpoints present within a specific area including the specific side may be determined, and information on camera viewpoints there are actually applicable among the camera viewpoints may be checked through the received SEI information and used for rendering. Alternatively, the user may check valid camera viewpoints from the received information, and may then select only specific camera viewpoints determined to be more significant than the other camera viewpoints and use the same for data reconstruction.

The method/device according to the embodiments provides a new camera viewpoint information processing method for an SLF point cloud data set including multiple objects, which has not been considered in the SLF sequence compression technology. When multiple objects are present in the same 3D space, each object may have camera viewpoints from which attribute information cannot be obtained due to interference between different objects. In this case, processed attribute information is transmitted due to the characteristics of SLF data. However, reconstructing attribute information about other points by the decoder based on the processed information may result in deterioration of the reconstructed image quality. In the embodiments, in order to address this issue, information on applicable camera viewpoints may be signaled and transmitted for each object such that only attribute information obtained from actual camera viewpoints may be used when the decoder reconstructs attributes. Applicable camera viewpoint information for each object may be transmitted and received in the SLF sequence by adding a new syntax to the scene object information SEI message, which allows different characteristic information to be transmitted for each object in V-PCC. When a point cloud is reconstructed based on multi-attribute information, the reception method/device may prevent unnecessary deterioration in image quality by reconstructing the point cloud based only on attribute information related to valid camera viewpoints for each object. In addition, by allowing necessary camera viewpoints to be selectively used for each object according to the user's intention, flexibility and accuracy of use of attribute information may be improved at the receiving side.

Figure 48:
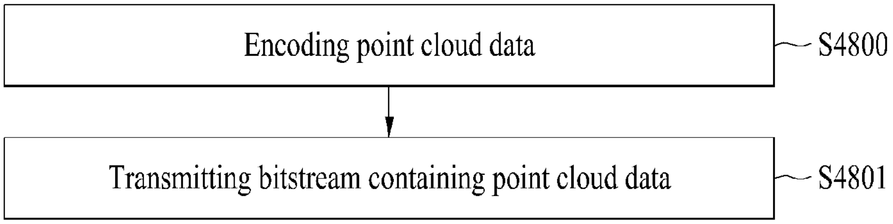
FIG. 48 illustrates a method of transmitting point cloud data according to embodiments.

FIG. 48 illustrates a method of transmitting point cloud data according to embodiments.

S4800: The method of transmitting point cloud data according to the embodiments may include encoding point cloud data.

The encoding operation according to the embodiments may include the operations of the transmission device 10000, the point cloud video encoder 10002, and the file/segment encapsulator 10003 in FIG. 1, the encoding processor in FIG. 4, the encoder in FIG. 15, the transmission device in FIG. 18, the XR device 2030 in FIG. 20, the object encoding including SLT data in FIGS. 21 to 25, the bitstream generation in FIG. 26, the parameter information generation in FIGS. 27 to 39, the transmission device in FIG. 40, the encoding of multiple objects in FIG. 41, and the generation of parameter information in FIGS. 42 to 47.

S4801: The point cloud data transmission method according to the embodiments may further include transmitting a bitstream containing the point cloud data.

The transmission operation according to the embodiments may include the operations of the transmission device 10000 and the transmitter 10004 in FIG. 1, the bitstream transmission in FIG. 4, the bitstream transmission in FIG. 15, the bitstream transmission of the transmission device in FIG. 18, the bitstream transmission of the XR device 2030 in FIG. 20, the transmission of a bitstream containing the encoded point cloud data in FIGS. 21 to 39, the point cloud data transmission of the transmission device in FIG. and the transmission of a bitstream containing the encoded point cloud data in FIGS. 41 to 47.

Figure 49:
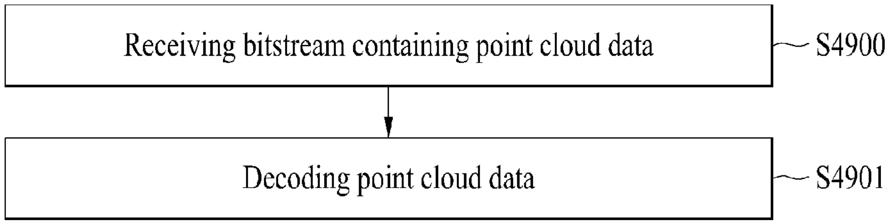
FIG. 49 illustrates a method of receiving point cloud data according to embodiments.

FIG. 49 illustrates a method of receiving point cloud data according to embodiments.

S4800: The method of receiving point cloud data according to the embodiments may include receiving a bitstream containing point cloud data.

The receiving operation according to the embodiments may include the operations of the reception device 10005, the receiver 10006, and the file/segment decapsulator 10007 in FIG. 1, the reception of a bitstream containing point cloud data in FIGS. 16, 17, and 19, the reception of point cloud data by the XR device 2030 in FIG. 20, the reception of point cloud data including a data set in FIGS. 21 to 25, the reception of data contained in the bitstream in FIGS. 26 to 39, the reception of point cloud data related to multiple objects in FIG. 41, and the reception of data contained in the bitstream in FIGS. 42 to 47.

S4801: The method of receiving point cloud data according to the embodiments may further include decoding the point cloud data.

The decoding operation according to the embodiments may include the operations of the point cloud video decoder 10008 in FIG. 1, the decoding in FIGS. 16 and 17, the reception device in FIG. 19, the decoding of the XR device 2030 in FIG. 20, the decoding of point cloud data including a data set in FIGS. 21 to 25, the decoding of data contained in the bitstream in FIGS. 26 to 39, the decoding of point cloud data related to multiple objects in FIG. 41, and the decoding of data contained in the bitstream in FIGS. 42 to 47.

A point cloud data transmission method according to embodiments may include encoding point cloud data, and transmitting a bitstream containing point cloud data.

The point cloud data according to the embodiments may include geometry data (a position value of a point of an object) and at least two attributes (e.g., a plurality of color values) obtained from cameras for viewpoints. The point cloud data transmission method may further include selecting a specific number of viewpoints from the viewpoints based on distances between an object and the viewpoints.

The point cloud data transmission method according to the embodiments may further include generating representative attribute information from the selected specific number of viewpoints and selecting the specific number of viewpoints based on the representative attribute information. This is because it is efficient to first compress attributes that differ greatly from the representative attribute information (e.g., a representative color value of a specific point).

In addition, based on based on an order (e.g., ascending order or descending order) of the distances, texture data may be generated from attribute information related to the selected specific number of viewpoints. The texture data may represent a texture (attribute) video or a texture (attribute) image.

The point cloud data transmission method may further include generating texture data from the specific number of viewpoints based on a difference between the representative attribute information and attribute information related to the specific number of viewpoints.

The point cloud data transmission method may further include generating one texture datum by merging the texture data including attribute information related to the selected specific number of viewpoints.

The bitstream generated and encoded according to the embodiments may contain parameter information related to the selection of the camera viewpoints.

The point cloud data according to the embodiments may include geometry data obtained from objects and at least two attributes, and the bitstream may contain valid camera viewpoint-related parameter information generated based on an occluded area between a first object and a second object among the objects. The occluded area may be unnecessary in reconstructing the point cloud data. Accordingly, accurate and efficient compression and reconstruction may be implemented by reducing the size of the bitstream by excluding the occluded area.

A device for receiving point cloud data according to embodiments may include a receiver configured to receive a bitstream containing point cloud data, and a decoder configured to decode the point cloud data.

The point cloud data according to the embodiments may include geometry data and at least two attributes obtained from cameras for viewpoints, and the decoder according to the embodiments may decode attribute data related to a specific number of viewpoints selected from the viewpoints based on distances between an object and the viewpoints.

The decoder may decode attribute data related to the specific number of viewpoints based on representative attribute information generated from the selected specific number of viewpoints.

Based on an order of the distances, the decoder may decode texture data generated from attribute information related to the selected specific number of viewpoints.

Based on a difference between the representative attribute information and attribute information related to the specific number of viewpoints, the decoder may decode texture data generated from the specific number of viewpoints.

The decoder may decode one texture datum generated by merging attribute information related to the selected specific number of viewpoints.

The bitstream according to the embodiments may include parameter information related to the selection of the camera viewpoints.

The point cloud data according to the embodiments may include geometry data and at least two attributes obtained from objects, and the bitstream according to the embodiments may contain valid camera viewpoint-related parameter information generated based on an occluded area between a first object and a second object.

Accordingly, the methods/devices according to the embodiments may implement efficient data compression and reconstruction without the need to compress and transmit all information related to a plurality of cameras for acquiring SLF data set to provide an accurate representation. Since only a specific number of SLF data with high similarity is efficiently selected and compressed among a plurality of SLF data, accuracy and compression performance may be increased. In addition, since the data is compressed by excluding the occluded area, data reconstruction may be accurate.

The embodiments have been described in terms of a method and/or a device. The description of the method and the description of the device may complement each other.

Although embodiments have been described with reference to each of the accompanying drawings for simplicity, it is possible to design new embodiments by merging the embodiments illustrated in the accompanying drawings. If a recording medium readable by a computer, in which programs for executing the embodiments mentioned in the foregoing description are recorded, is designed by those skilled in the art, it may also fall within the scope of the appended claims and their equivalents. The devices and methods may not be limited by the configurations and methods of the embodiments described above. The embodiments described above may be configured by being selectively combined with one another entirely or in part to enable various modifications. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this document, the term "I" and "," should be interpreted as indicating "and/or." For instance, the expression "A/B" may mean "A and/or B." Further, "A, B" may mean "A and/or B." Further, "A/B/C" may mean "at least one of A, B, and/or C." "A, B, C" may also mean "at least one of A, B, and/or C." Further, in the document, the term "or" should be interpreted as "and/or." For instance, the expression "A or B" may mean 1) only A, 2) only B, and/or 3) both A and B. In other words, the term "or" in this document should be interpreted as "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signal unless context clearly dictates otherwise.

The terminology used to describe the embodiments is used for the purpose of describing particular embodiments only and is not intended to be limiting of the embodiments. As used in the description of the embodiments and in the claims, the singular forms “a”, “an”, and “the” include plural referents unless the context clearly dictates otherwise. The expression “and/or” is used to include all possible combinations of terms. The terms such as “includes” or “has” are intended to indicate existence of figures, numbers, steps, elements, and/or components and should be understood as not precluding possibility of existence of additional existence of figures, numbers, steps, elements, and/or components. As used herein, conditional expressions such as “if” and “when” are not limited to an optional case and are intended to be interpreted, when a specific condition is satisfied, to perform the related operation or interpret the related definition according to the specific condition.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or combinations thereof. The firmware, software, and/or combinations thereof may be stored in the processor or the memory.

MODE FOR DISCLOSURE

As described above, related details have been described in the best mode for carrying out the embodiments.

INDUSTRIAL APPLICABILITY

As described above, the embodiments are fully or partially applicable to a point cloud data transmission/reception device and system.

Those skilled in the art may change or modify the embodiments in various ways within the scope of the embodiments.

Embodiments may include variations/modifications within the scope of the claims and their equivalents.

The invention claimed is:

1. A method of encoding point cloud data, the method comprising:

encoding atlas data of an atlas for point cloud data; and encoding a packed video frame for the atlas, and wherein the packed video frame includes regions for attributes for the point cloud data, and wherein the encoded atlas data and the encoded packed video frame are included in a bitstream, wherein the bitstream includes information for representing a number of the attributes for the atlas, information for a number of regions in the packed video frame for the atlas, information for a number of dimensions for the regions for the atlas, information for a number of partition groups for attribute channels of the regions for the atlas, information for a number of channels for the partition groups for the atlas, information for an identifying number for a viewport and information for representing whether the bitstream includes camera information for the viewport.

2. The method of claim 1, wherein the point cloud data comprises geometry data and data for the attributes obtained from cameras for viewpoints for the viewport, the method further comprising:

selecting a specific number of viewpoints from the viewpoints based on distances between an object and the viewpoints.

3. The method of claim 2, further comprising:

generating representative attribute information from the selected specific number of viewpoints; and selecting the specific number of viewpoints based on the representative attribute information.

4. The method of claim 2, further comprising:

based on an order of the distances, generating texture data from attribute information related to the selected specific number of viewpoints.

5. The method of claim 3, further comprising:

generating texture data for the attributes from the specific number of viewpoints based on a difference between the representative attribute information and attribute information related to the specific number of viewpoints.

6. The method of claim 4, further comprising:

generating the packed video frame by merging the texture data including attribute information related to the selected specific number of viewpoints.

7. The method of claim 1, wherein the point cloud data comprises geometry data and data for the attributes obtained from objects, wherein the camera information includes valid camera viewpoint-related parameter information generated based on an occluded area between a first object and a second object among the objects.

8. A method of decoding point cloud data, the method comprising:

decoding atlas data for an atlas in a bitstream for point cloud data; and decoding a packed video frame for the atlas in the bitstream, and wherein the packed video frame includes regions for attributes for the point cloud data, and wherein the bitstream includes information for representing a number of the attributes for the atlas, information for a number of regions in the packed video frame for the atlas, information for a number of dimensions for the regions, information for a number of partition groups for attribute channels of the regions for the atlas, information for a number of channels for the partition groups for the atlas, information for an identifying number for a viewport and information for representing whether the bitstream includes camera information for the viewport.

9. The method of claim 8, wherein the point cloud data comprises geometry data and data for the attributes obtained from cameras for viewpoints for the viewport, wherein the attributes are related to a specific number of viewpoints selected from the viewpoints based on distances between an object and the viewpoints.

10. The method of claim 9, wherein the attributes are related to the specific number of viewpoints based on representative attribute information generated from the selected specific number of viewpoints.

11. The method of claim 8, wherein the point cloud data comprises geometry data and data for the attributes obtained from objects, wherein the camera information includes valid camera viewpoint-related parameter information generated based on an occluded area between a first object and a second object among the objects.

12. A device for encoding point cloud data, the device comprising:

a memory; and at least one processor connected to the memory, wherein the at least one processor configured to:

encode atlas data of an atlas for point cloud data; and encode a packed video frame for the atlas, and wherein the packed video frame includes regions for attributes of the point cloud data, and wherein the encoded atlas data and the encoded packed video frame are included in a bitstream, wherein the bitstream includes information for representing a number of the attributes for the atlas, information for a number of regions in the packed video frame for the atlas, information for a number of dimensions for the regions for the atlas, information for a number of partition groups for attribute channels of the regions for the atlas, information for a number of channels for the partition groups for the atlas, information for an identifying number for a viewport and information for representing whether the bitstream includes camera information for the viewport.

13. The device of claim 12, wherein the point cloud data comprises geometry data and data for the attributes obtained from cameras for viewpoints for the viewport, wherein the at least one processor is configured to select a specific number of viewpoints from the viewpoints based on distances between an object and the viewpoints.

14. A device for decoding point cloud data, the device comprising a memory; and at least one processor connected to the memory, wherein the at least one processor configured to:

decode atlas data for an atlas in a bitstream for point cloud data; and decode a packed video frame for the atlas in the bitstream, and wherein the packed video frame includes regions for attributes of the point cloud data, and wherein the bitstream includes information for representing a number of the attributes for the atlas, information for a number of regions in the packed video frame for the atlas, information for a number of dimensions for the regions for the atlas, information for a number of partition groups for attribute channels of the regions for the atlas, information for a number of channels for the partition groups for the atlas, information for an identifying number for a viewport and information for representing whether the bitstream includes camera information for the viewport.

15. The device of claim 14, wherein the point cloud data comprises geometry data and data for the two attributes obtained from cameras for viewpoints for the viewport.

* * * * *